US011987717B2

(12) United States Patent
Zhong et al.

(10) Patent No.: US 11,987,717 B2
(45) Date of Patent: May 21, 2024

(54) AIR-STABLE CONDUCTIVE INK

(71) Applicant: The Research Foundation for The State University of new York, Binghamton, NY (US)

(72) Inventors: Chuan-Jian Zhong, Endwell, NY (US); Shan Yan, Medford, NY (US); Shiyao Shan, Vestal, NY (US); Ning He, Xiamen (CN); Ning Kang, Irvine, CA (US); Jin Luo, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 202 days.

(21) Appl. No.: 17/305,583

(22) Filed: Jul. 9, 2021

(65) Prior Publication Data

US 2022/0010160 A1 Jan. 13, 2022

Related U.S. Application Data

(60) Provisional application No. 63/050,523, filed on Jul. 10, 2020.

(51) Int. Cl.
*C09D 11/52* (2014.01)
*B41M 5/00* (2006.01)
*B41M 7/00* (2006.01)
*C09D 11/033* (2014.01)
*C09D 11/037* (2014.01)
(Continued)

(52) U.S. Cl.
CPC ........... *C09D 11/52* (2013.01); *B41M 5/0023* (2013.01); *B41M 7/009* (2013.01); *C09D 11/033* (2013.01); *C09D 11/037* (2013.01); *C09D 11/322* (2013.01); *C22C 9/00* (2013.01);
(Continued)

(58) Field of Classification Search
None
See application file for complete search history.

(56) References Cited

U.S. PATENT DOCUMENTS

2013/0342221 A1* 12/2013 Virkar ................. C09D 11/322
174/253
2015/0104936 A1* 4/2015 Markovich ............. H01B 1/02
428/221

(Continued)

FOREIGN PATENT DOCUMENTS

JP 2015040316 A * 3/2015
KR 2015027341 A * 3/2015

OTHER PUBLICATIONS

English text machine translation of Mizuno et al. (JP 2015-040316 A) accessed online from Espacenet; PDF pp. 1-31. (Year: 2015).*
(Continued)

*Primary Examiner* — Katie L. Hammer
(74) *Attorney, Agent, or Firm* — Hoffberg & Associates; Steven M. Hoffberg

(57) ABSTRACT

A low temperature sinterable copper nanoparticle or nanowire, comprising gold, zinc, nickel, tin, or aluminum as an alloying metal, and a capping agent. The nanoparticles or nanowires may be deposited on porous or fibrous substrates, the capping agent desorbed, and sintered at low temperature to form conductive traces or sensing elements. The nanoparticles or nanowires may be deposited by aerosol jet, inkjet or dispenser printers, for example.

20 Claims, 22 Drawing Sheets

(51) Int. Cl.
- C09D 11/322 (2014.01)
- C22C 9/00 (2006.01)
- D21H 19/02 (2006.01)
- D21H 19/06 (2006.01)
- D21H 19/66 (2006.01)

(52) U.S. Cl.
CPC ............ D21H 19/02 (2013.01); D21H 19/06 (2013.01); D21H 19/66 (2013.01)

(56) References Cited

U.S. PATENT DOCUMENTS

| | | | |
|---|---|---|---|
| 2016/0060474 A1* | 3/2016 | Oldenzijl | G06F 3/0412 29/829 |
| 2016/0189823 A1* | 6/2016 | Gao | H01B 1/20 252/514 |
| 2018/0002540 A1* | 1/2018 | Lee | C09D 5/24 |

OTHER PUBLICATIONS

Dexter et al. "Controlling processing temperatures and self-limiting behaviour in intense pulsed sintering by tailoring nanomaterial shape distribution" RSC Adv., 2017, 7, 56395-56405; open access article online. (Year: 2017).*

English machine translation of Kim et al. (KR 2015-0027341 A); PDF accessed online from Google Patents. (Year: 2015).*

* cited by examiner

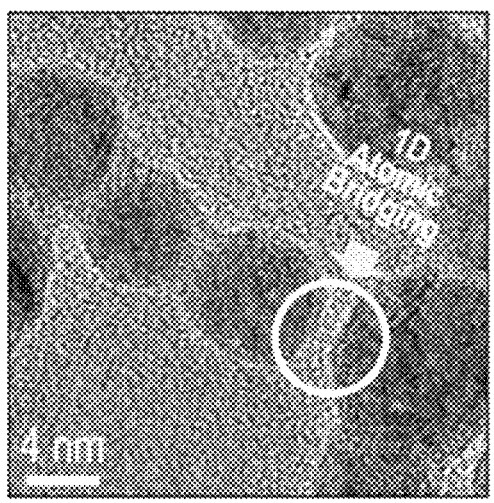
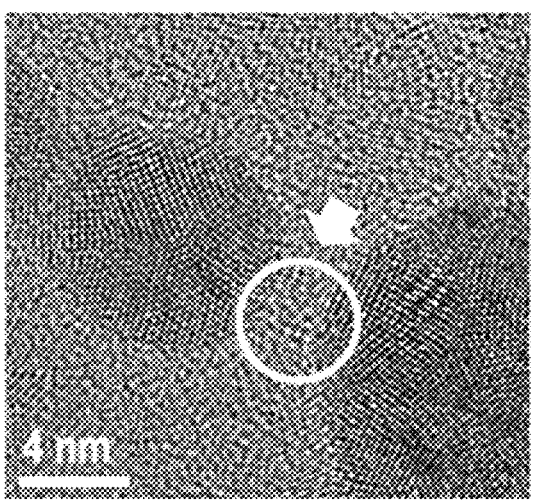
Fig. 4A                    Fig. 4B
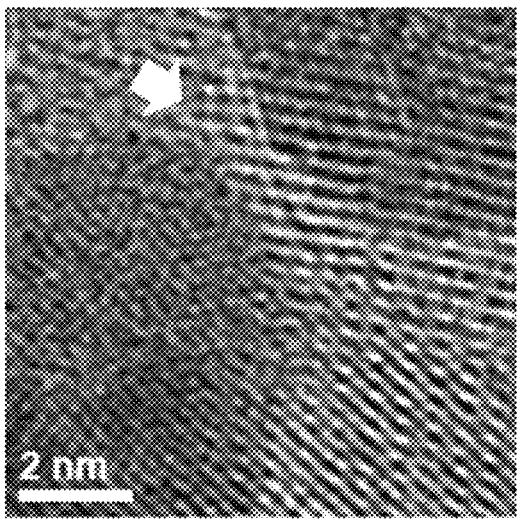
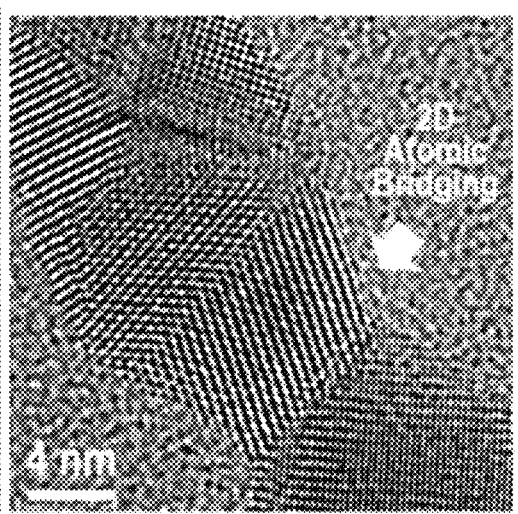
Fig. 4C                    Fig. 4D
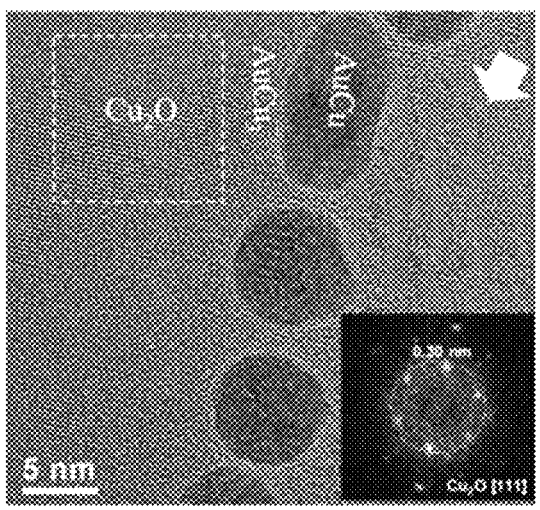
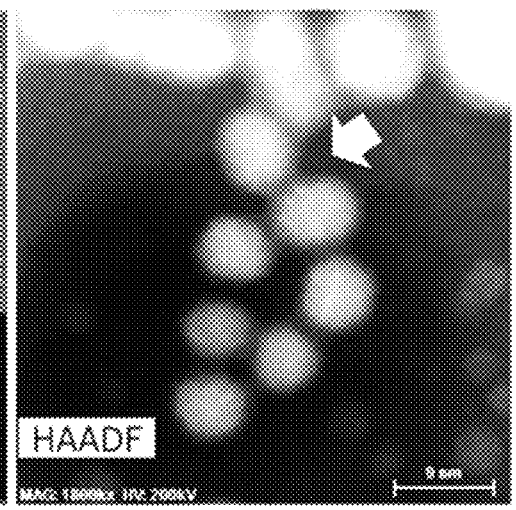
Fig. 4E                    Fig. 4F

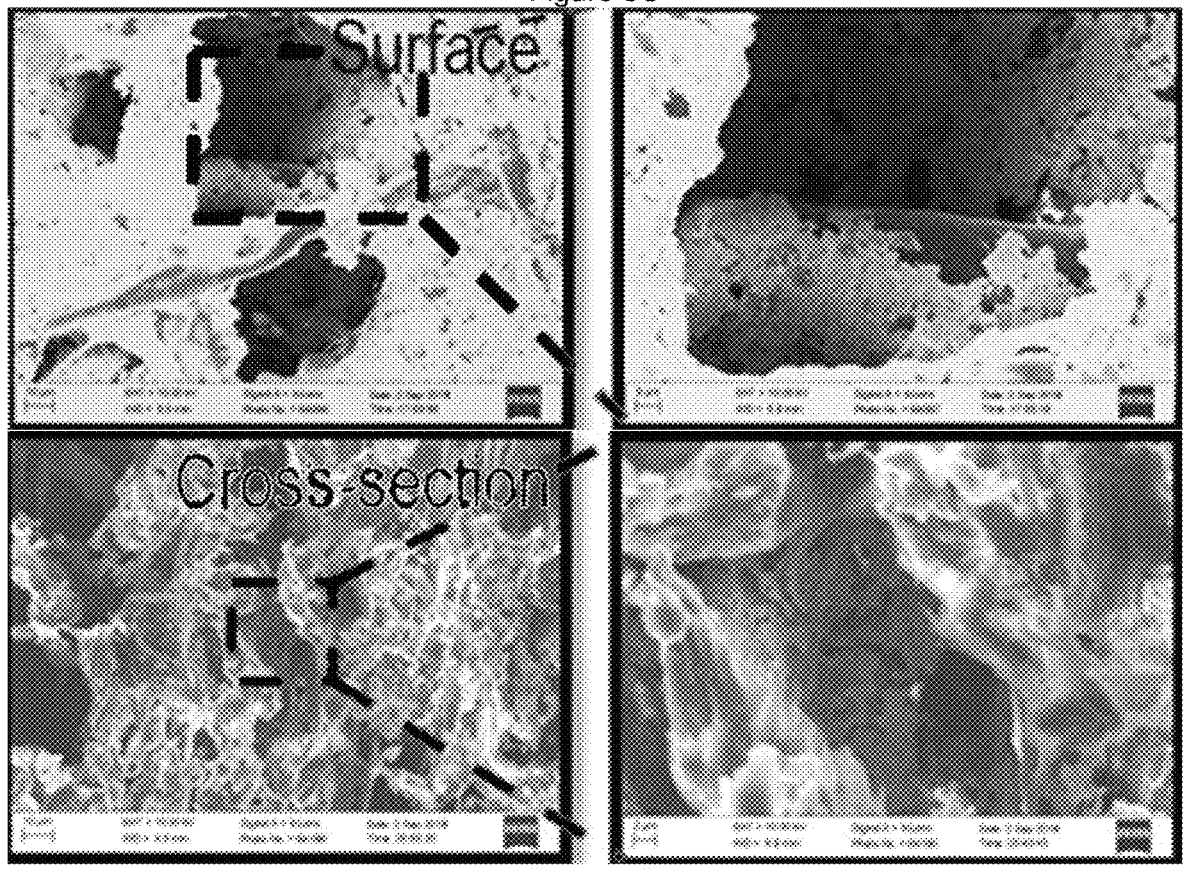
Figure 8C
Figure 9D
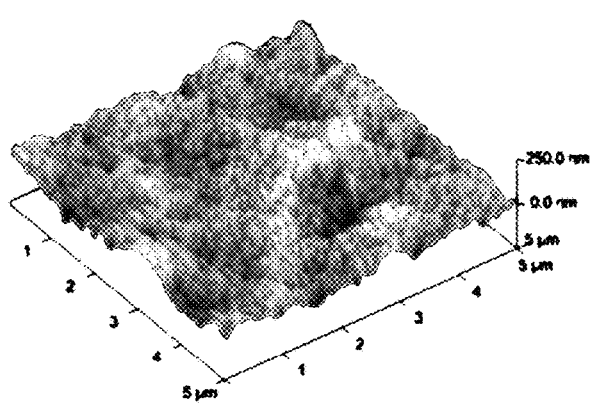
Figure 9E
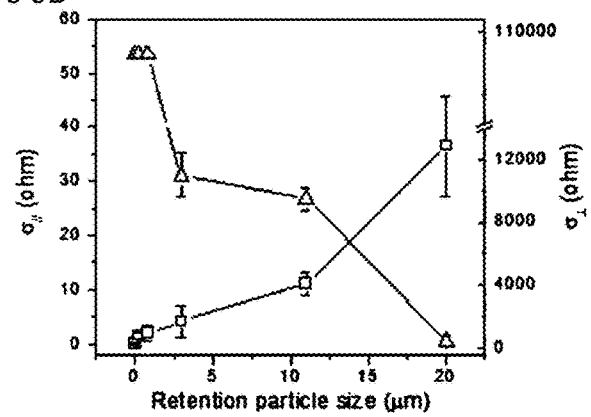
Figure 9F

Traditional interparticle neck connection

AIR-STABLE CONDUCTIVE INK

CROSS REFERENCE TO RELATED APPLICATIONS

The present application is a non-provisional of, and claims benefit of priority from, U.S. Provisional Patent Application No. 63/050,523, filed Jul. 10, 2020, the entirety of which is expressly incorporated herein by reference.

STATEMENT REGARDING FEDERALLY SPONSORED RESEARCH OR DEVELOPMENT

This invention was made with government support under IIP 1640669, CHE 1566283, and CMMI 1100736 awarded by the National Science Foundation. The government has certain rights in the invention.

FIELD OF THE INVENTION

The present invention relates to the field of air stable conductive inks, and more particularly to a copper-based nanowire ink.

INCORPORATION BY REFERENCE

Each patent, patent application, publication, or other reference cited herein is expressly incorporated herein by reference for all purposes. These references are included to the extent not inconsistent with the invention disclosed and claimed herein, and provide disclosure of background, enabling techniques and elements, as well as disclosure of written description of the invention.

NON-ABSTRACT SCOPE

The claims and phrases and terms within the claims herein are to be interpreted as being limited to patent eligible subject matter, and shall not include scope that extends to abstract concepts that are not integrated into a practical application.

BACKGROUND OF THE INVENTION

A sensor substrate is the basic element that interfaces with a sensing film and the transducing electronics. While most of commercial sensor substrates are fabricated using traditional substrate materials (e.g., silicon, glass, etc.) by conventional methods (e.g., standard chemical vapor deposition or photolithographic protocols), there are many new challenges in meeting the growing demands for flexible, foldable, stretchable, biodegradable, or disposable sensors and the rising desires for higher sensitivity, greater miniaturization, lower cost, and better wearability. Fabricating the sensor substrate using fibrous materials, e.g., celluloses or papers, serves as an intriguing pathway to addressing many of these challenges. However, making conductive traces or interconnects on or across this type of material is often difficult or too costly with the conventional methods largely due to high temperature sensitivity of the materials.[1-3] Printed electronics have demonstrated the viability for low-cost manufacturing of ever-smaller integrated electronic devices, especially using conductive nanomaterials.[4,5]

On the large-scale and high-volume printing potential, such printed electronics are expected to enable wearable and portable devices, with a wide range of applications ranging from sensors, displays, solar cells, and other electronic circuits.[6-9] On the small scales, there were some successful demonstrations of atomic/nanoscale creation of conductive traces that have been reported by use of scanning probe microscopes under extremely low temperature,[10,11] ultra-high vacuum conditions,[12] precision positioning of carbon nanotubes,[13] or physical or chemical atomic layer deposition.[14] All these approaches are however unlikely scalable for manufacturing sensor substrates using temperature-sensitive fibrous materials. A question of both fundamental and technological significance is how the creation of this class of sensor substrates can be achieved at ambient temperature in a process which is scalable for their manufacturing at extremes of miniaturization.

The use of plastics or paper as a substrate for wearable electronics that can be conformably incorporated on human body has rapidly emerged as human-friendly paper electronics with mechanical deformability and bio-benignancy and ecological friendliness, which has recently captured global interests both in the research labs and the electronics markets. Many paper-based sensors are largely microfluidic devices, which is a platform for lab-on-a-chip (LOC) devices as low-cost, portable and disposable analytical devices for health diagnostics, environmental monitoring and food quality control. Such devices potentially allow incorporation of electronic power sources to achieve completely integrated devices, connection to smartphones for real-time POC diagnostics and potential generation of medical database, which has contributed to the growth of the overall diagnostics market. \

While there is a growing demand of wearable electronic products for personal healthcare, entertainment, industrial and military purposes, a major limitation for paper electronics to step into the market lies in the fact that the current approaches for manufacturing paper electronics either require high-cost and bulky equipment or suffer from the disability to scale up for mass production. Fully integrated paper-based microfluidic devices in terms of sensing, signaling and power supply that are vital for electronics are yet to be released, which require the integration of assays with micro and nano technologies, and electrochemical/optical detection electronics.

There is a rising interest in wearable sensors for environmental monitoring of air quality (e.g., pollution by volatile organic compounds (VOCs)) and human health monitoring of diseases (e.g., lung cancer, diabetes, etc.). Wearable breath or sweat sensors have captured the interest in human performance monitoring under various environmental conditions to provide personalized health information. Wearable sweat or breath sensors are non-invasive, in contrast to the blood glucose monitors on the market, and can be easily adapted with today's wireless technology for point-of-care monitoring of human performance and health conditions, including perspiration, sweating, diabetes, blood pressure, and respiration. In these applications, various sensing elements are integrated onto a flexible electronic platform with physically wearable or structurally conformal features.

For example, a wearable device can be used for monitoring the glucose level of an individual by placing the device conformably on the skin. Monitoring of the moisture levels from perspiration provides useful information for assessing the physical conditions, especially for people exposing to elevated temperature or experiencing long time exercise who face the risk of dehydration. The fact that sweat contains abundant medical information which has been an important driving force for the increasing interests in developing wearable sweat sensors. In addition to moisture, sweat is also rich with ions such as sodium, potassium and chlorine ranging from 10 to 80 mM, and contains biomarkers related to metabolites of the human body, e.g., glucose, lactate, uric acid, etc. Wearable sweat sensors are non-invasive, and can be easily adapted with today's wireless technology for point-of-care monitoring of human performance and health conditions. Sweating primarily regulates body temperature by cooling the body down with secretion of water, but the inability of human body to sweat properly is potentially harmful, and a complete absence of sweating (anhidrosis) or sweating less than normal (hypohidrosis) is an abnormal lack of sweat in response to heat.

On the other hand, the idea that the smell from a person's breath may provide diagnosis of a disease, e.g., uncontrolled diabetes with acetone odor, liver failure with fish-like smell, renal failure with urine-like smell, has been fueling the search for the breath print that detects diseases at early stages. In contrast to existing screening methods (e.g., CT scans and chest X-rays) which are expensive, inconvenient and may add risk due to radiation exposure, breath detection of VOC biomarkers from cancer patients serves as a very convenient, safe and low-cost technique for point-of-care screening of cancer at early stages.

The use of paper as a substrate for wearable sensors that can be conformably and comfortably incorporated on human body has rapidly emerged as human-friendly paper sensors with deformability, biocompatibility and minimal effect on human skin, for wearable electronics, which has captured global interests both in the research labs and the electronics markets. While this has captured global interests both in the research labs and in the markets, a major challenge is the ability to fabricate electrically conductive patterns on paper under ambient condition because most paper substrates cannot survive elevated temperatures. Existing nanoinks require elevated temperature for metal sintering which is unacceptable for paper electronics. Since cellulose fibers are made of naturally renewable or abundant ingredients, attributes such as omnipresence, low cost, and simple fabrication constitute a major driver for paper sensors for continuous monitoring of physical signals and symptoms directly from human body, fitness tracking and chronic disease prediction in personalized healthcare and as smart wearable electronic devices.

The use of fibrous and/or paper substrates for conductive elements and sensors is in rapid development.

See,

Adkins, Jaclyn, Katherine Boehle, and Charles Henry. "Electrochemical paper-based microfluidic devices." Electrophoresis 36, no. 16 (2015): 1811-1824.

Al-Omari, M., K. Sel, A. Mueller, J. Edwards, T. Kaya, J. Appl. Phys., 2014, 115, 203107.

Arora, Arun, Giuseppina Simone, Georgette B. Salieb-Beugelaar, Jung Tae Kim, and Andreas Manz. "Latest developments in micro total analysis systems." Analytical chemistry 82, no. 12 (2010): 4830-4847.

Asano, Yosuke, Kei Nakaoka, Katsuyuki Murashiro, Toshiki Komatsu, and Katsuyoshi Hoshino. "Template-free electrochemical preparation of dendritic copper nanowire and its capacitor properties." Materials Letters 81 (2012): 162-164.

Balantrapu, K., M. McMurran, D. V. Goia, J. Mater. Res., 2010, 25, 821-827.

Bradley, J.-C.; Ma, Z. Contactless Electrodeposition of Palladium Catalysts. Angew. Chem., Int. Ed., 38, 1663 (1999).

Cao, W. M., W. Li, R. H. Yin, W. Zhou, Colloids Surf. A: 2014, 453, 37.

Carrilho, E.; Martinez, A. W.; Whitesides, G. M. Understanding Wax Printing: A Simple Micropatterning Process for Paper-Based Microfluidics. Anal. Chem., 81, 7091 (2009).

Carrilho, Emanuel, Andres W. Martinez, and George M. Whitesides. "Understanding wax printing: a simple micropatterning process for paper-based microfluidics." Analytical chemistry 81, no. 16 (2009): 7091-7095.

Cate, David M., Jaclyn A. Adkins, Jaruwan Mettakoonpitak, and Charles S. Henry. "Recent developments in paper-based microfluidic devices." Analytical chemistry 87, no. 1 (2014): 19-41.

Chaiyo, Sudkate, Amara Apiluk, Weena Siangproh, and Orawon Chailapakul. "High sensitivity and specificity simultaneous determination of lead, cadmium and copper using μPAD with dual electrochemical and colorimetric detection." Sensors and Actuators B: Chemical 233 (2016): 540-549.

Chikkaveeraiah, Bhaskara V., Ashwinkumar A. Bhirde, Nicole Y. Morgan, Henry S. Eden, and Xiaoyuan Chen. "Electrochemical immunosensors for detection of cancer protein biomarkers." ACS nano 6, no. 8 (2012): 6546-6561.

Cho, Soohee, Tu San Park, Tigran G. Nahapetian, and Jeong-Yeol Yoon. "Smartphone-based, sensitive μPAD detection of urinary tract infection and gonorrhea." Biosensors and Bioelectronics 74 (2015): 601-611.

Chow, K.-F.; Chang, B.-Y.; Zaccheo, B. A.; Mavré, F.; Crooks, R. M. A Sensing Platform Based on Electrodissolution of a Ag Bipolar Electrode. J. Am. Chem. Soc., 132, 9228 (2010).

Chow, K.-F.; Mavré, F.; Crooks, J. A.; Chang, B.-Y.; 152 Christophe Renault, Karen Scida, Kyle N. Knust, Stephen E. Fosdick, and Richard M. Crooks Crooks, R. M. A Large-Scale, Wireless Electrochemical Bipolar Electrode Microarray. J. Am. Chem. Soc., 131, 8364 (2009).

Chow, K.-F.; Mavré, F.; Crooks, R. M. Wireless Electrochemical DNA Microarray Sensor. J. Am. Chem. Soc., 130, 7544 (2008).

Cinti, Stefano, Daria Talarico, Giuseppe Palleschi, Danila Moscone, and Fabiana Arduini. "Novel reagentless paper-based screen-printed electrochemical sensor to detect phosphate." Analytica chimica acta 919 (2016): 78-84.

Coltro, Wendell Karlos Tomazelli, Dosil Pereira de Jesus, Jose Alberto Fracassi da Silva, Claudimir Lucio do Lago, and Emanuel Carrilho. "Toner and paper-based fabrication techniques for microfluidic applications." Electrophoresis 31, no. 15 (2010): 2487-2498.

De Araujo, W. R., and T. R. L. C. Paixao. "Fabrication of disposable electrochemical devices using silver ink and office paper." Analyst 139, no. 11 (2014): 2742-2747.

Deiss, F. d. r.; LaFratta, C. N.; Symer, M.; Blicharz, T. M.; Sojic, N.; Walt, D. R. Multiplexed Sandwich Immunoassays Using Electrochemiluminescence Imaging Resolved at the Single Bead Level. J. Am. Chem. Soc., 131, 6088 (2009).

Delaney, J. L.; Hogan, C. F.; Tian, J.; Shen, W. Electrogenerated Chemiluminescence Detection in Paper Based Microfluidic Sensors. Anal. Chem., 83, 1300 (2011).

Dharmadasa, Ruvini, Menaka Jha, Delaina A. Amos, and Thad Druffel. "Room temperature synthesis of a copper ink for the intense pulsed light sintering of conductive copper films." ACS applied materials & interfaces 5, no. 24 (2013): 13227-13234.

Ding, Su, Jinting Jiu, Yanhong Tian, Tohru Sugahara, Shijo Nagao, and Katsuaki Suganuma. "Fast fabrication of copper nanowire transparent electrodes by a high intensity pulsed light sintering technique in air." Physical Chemistry Chemical Physics 17, no. 46 (2015): 31110-31116.

Dong, T.-Y., H. H. Wu, C. Huang, J. M. Song, I. G. Chen, T. H. Kao, *Appl. Surface Science,* 2009, 255, 3891-3896.

Dong, Yue, Zhijie Lin, Xiaodong Li, Qi Zhu, Ji-Guang Li, and Xudong Sun. "A low temperature and air-sinterable copper-diamine complex-based metal organic decomposition ink for printed electronics." Journal of Materials Chemistry C 6, no. 24 (2018): 6406-6415.

Dungchai, Wijitar, Orawon Chailapakul, and Charles S. Henry. "Electrochemical detection for paper-based microfluidics." Analytical chemistry 81, no. 14 (2009): 5821-5826.

Feng, Bin, Daozhi Shen, Wengan Wang, Zhongyang Deng, Luchan Lin, Hui Ren, Aiping Wu, Guisheng Zou, Lei Liu, and Y. Norman Zhou. "Cooperative bilayer of lattice-disordered nanoparticles as room-temperature sinterable nanoarchitecture for device integrations." ACS applied materials & interfaces 11, no. 18 (2019): 16972-16980.

Feng, J., C.-P. Zhang, *J. Colloid Interface Sci.,* 2006, 293, 414.

Feng, Qiu-Mei, Jian-Bin Pan, Huai-Rong Zhang, Jing-Juan Xu, and Hong-Yuan Chen. "Disposable paper-based bipolar electrode for sensitive electrochemiluminescence detection of a cancer biomarker." Chemical Communications 50, no. 75 (2014): 10949-10951.

Fosdick, S. E.; Berglund, S. P.; Mullins, C. B.; Crooks, R. M. Parallel Screening of Electrocatalyst Candidates Using Bipolar Electrochemistry. Anal. Chem., 85, 2493 (2013).

Fosdick, S. E.; Crooks, R. M. Bipolar Electrodes for Rapid Screening of Electrocatalysts. J. Am. Chem. Soc., 134, 863 (2011).

Fosdick, S. E.; Knust, K. N.; Scida, K.; Crooks, R. M. Bipolar Electrochemistry. Angew. Chem., Int. Ed., 52, 10438 (2013).

Fukuda, Kenjiro, Tomohito Sekine, Yu Kobayashi, Daisuke Kumaki, Mitsunori Itoh, Minami Nagaoka, Takami Toda et al. "Stable organic thin-film transistors using full solution-processing and low-temperature sintering silver nanoparticle inks." Organic Electronics 13, no. 9 (2012): 1660-1664.

Gao, W., S. Emaminejad, H. Y. Nyein, S. Challa, K. Chen, A. Peck, H. M. Fahad, H. Ota, H. Shiraki, D. Kiriya, D. H. Lien, G. A. Brooks, R. W. Davis, A. Javey, *Nature* 2016, 529, 509-514.

Ge, Shenguang, Lei Ge, Mei Yan, Xianrang Song, Jinghua Yu, and Jiadong Huang. "A disposable paper-based electrochemical sensor with an addressable electrode array for cancer screening." Chemical Communications 48, no. 75 (2012): 9397-9399.

Ge, Xiaoxiao, Abdullah Mohamed Asiri, Dan Du, Wei Wen, Shengfu Wang, and Yuehe Lin. "Nanomaterial-enhanced paper-based biosensors." TrAC Trends in Analytical Chemistry 58 (2014): 31-39.

Geng, L., X. Peng, C. Zhan, A. Naderi, P. R. Sharma, Y. Mao, B. S. Hsiao, *Cellulose,* 2017, 24, 5417-5429.

Glatzel, S.; Schnepp, Z.; Giordano, C. From Paper to Structured Carbon Electrodes by Inkjet Printing. Angew. Chem., Int. Ed., 52, 2355 (2013).

Grouchko, Michael, Alexander Kamyshny, Cristina Florentina Mihailescu, Dan Florin Anghel, and Shlomo Magdassi. "Conductive inks with a "built-in" mechanism that enables sintering at room temperature." ACS nano 5, no. 4 (2011): 3354-3359.

Guo, Huizhang, Na Lin, Yuanzhi Chen, Zhenwei Wang, Qingshui Xie, Tongchang Zheng, Na Gao et al. "Copper nanowires as fully transparent conductive electrodes." Scientific reports 3 (2013): 2323.

Haas, Iris, Sangaraju Shanmugam, and Aharon Gedanken. "Synthesis of copper dendrite nanostructures by a sonoelectrochemical method." Chemistry—A European Journal 14, no. 15 (2008): 4696-4703.

He, X., Y. Zi, H. Yu, S. L. Zhang, J. Wang, W. Ding, H. Zou, W. Zhang, C. Lu, Z. L. Wang, *Nano Energy,* 2017, 39, 328-336.

Hong, Sukjoon, Junyeob Yeo, Gunho Kim, Dongkyu Kim, Habeom Lee, Jinhyeong Kwon, Hyungman Lee, Phillip Lee, and Seung Hwan Ko. "Nonvacuum, maskless fabrication of a flexible metal grid transparent conductor by low-temperature selective laser sintering of nanoparticle ink." ACS nano 7, no. 6 (2013): 5024-5031.

Hu, Jinbo, Kieu T. Ho, Xu U. Zou, William H. Smyrl, Andreas Stein, and Philippe Bühlmann. "All-solid-state reference electrodes based on colloid-imprinted mesoporous carbon and their application in disposable paper-based potentiometric sensing devices." Analytical chemistry 87, no. 5 (2015): 2981-2987.

Hu, Liangbing, Jang Wook Choi, Yuan Yang, Sangmoo Jeong, Fabio La Mantia, Li-Feng Cui, and Yi Cui. "Highly conductive paper for energy-storage devices." Proceedings of the National Academy of Sciences 106, no. 51 (2009): 21490-21494.

Huaman, J. L. C., K. Sato, S. Kurita, T. Matsumoto, B. Jeyadevan, *J. Mater. Chem.,* 2011, 21, 7062-7069.

Im, Hyeon-Gyun, Soo-Ho Jung, Jungho Jin, Dasom Lee, Jaemin Lee, Daewon Lee, Jung-Yong Lee, Il-Doo Kim, and Byeong-Soo Bae. "Flexible transparent conducting hybrid film using a surface-embedded copper nanowire network: a highly oxidation-resistant copper nanowire electrode for flexible optoelectronics." ACS nano 8, no. 10 (2014): 10973-10979.

Jason, N. N., W. Shen, W. Cheng, *ACS Appl. Mater. Interfaces* 2015, 7, 16760-16766.

Jason, Naveen Noah, Wei Shen, and Wenlong Cheng. "Copper nanowires as conductive ink for low-cost draw-on electronics." ACS applied materials & interfaces 7, no. 30 (2015): 16760-16766.

Joo, Sung-Jun, Hyun-Jun Hwang, and Hak-Sung Kim. "Highly conductive copper nano/microparticles ink via flash light sintering for printed electronics." Nanotechnology 25, no. 26 (2014): 265601.

Joo, Sung-Jun, Sung-Hyeon Park, Chang-Jin Moon, and Hak-Sung Kim. "A highly reliable copper nanowire/nanoparticle ink pattern with high conductivity on flexible substrate prepared via a flash light-sintering technique." ACS applied materials & interfaces 7, no. 10 (2015): 5674-5684.

Kang, N., F. Lin, W. Zhao, J. P. Lombardi, M. Almihdhar, K. Liu, S. Yan, J. Kim, J. Luo, B. S. Hsiao, M. Poliks, C. J. Zhong, *ACS Sens.* 2016, 1, 1060-1069.

Kanzaki, Mai, Yuki Kawaguchi, and Hideya Kawasaki. "Fabrication of conductive copper films on flexible polymer substrates by low-temperature sintering of composite Cu ink in air." ACS applied materials & interfaces 9, no. 24 (2017): 20852-20858.

Kim, I., J. Kim, *J. Appl. Phys.,* 2010, 108, 102807.

Kim, Na Rae, Yung Jong Lee, Changsoo Lee, Jahyun Koo, and Hyuck Mo Lee. "Surface modification of oleylamine-capped Ag—Cu nanoparticles to fabricate low-temperature-sinterable Ag—Cu nanoink." Nanotechnology 27, no. 34 (2016): 345706.

Klett, O.; Nyholm, L. Separation High Voltage Field Driven On-Chip Amperometric Detection in Capillary Electrophoresis. Anal. Chem., 75, 1245 (2003).

Ko, Seung H., Heng Pan, Costas P. Grigoropoulos, Christine K. Luscombe, Jean M J Fréchet, and Dimos Poulikakos "All-inkjet-printed flexible electronics fabrication on a polymer substrate by low-temperature high-resolution selective laser sintering of metal nanoparticles." Nanotechnology 18, no. 34 (2007): 345202.

Lan, Wen-Jie, Xu U. Zou, Mahiar M. Hamedi, Jinbo Hu, Claudio Parolo, E. Jane Maxwell, Philippe Büllmann, and George M. Whitesides. "based potentiometric ion sensing." Analytical chemistry 86, no. 19 (2014): 9548-9553.

Lee, H.-H., K.-S. Choul, K.-C. Huang, *Nanotechnology*, 2005, 16, 2436-2441.

Lee, Jangmi, Insik In, Soyeon Kim, "Room-temperature Sinterable Silver Nanoparticle Ink with Oligomeric Poly (N-vinylpyrrolidone) Ligand." Korean Polymer Society Conference, Fall 2013 (10/11~10/12, Changwon Convention Center), Volume 38 No. (2013): 126-126. UCI (KEPA): I410-ECN-0101-2016-578-001185513 (A highly conductive silver (Ag) film or pattern was prepared on poly(ethylene terephthalate) (PET) substrate by using room-temperature sinterable silver nanoparticle (AgNP) ink without any thermal treatment. The most critical factor in the room-temperature sintering of the AgNP ink was the molecular weight of the poly(N-vinylpyrrolidone) (PVP) ligand. AgNP ink having a PVP ligand with low molecular weight less than 10000 Da produced a conductive Ag film with the high conductivity without any post-treatment such as heating.)

Lee, Mi Yeon, et al. "Room-temperature sinterable silver nanoparticle ink with low-molecular-weight poly (N-vinylpyrrolidone) ligand." Chemistry letters 42.3 (2013): 232-234.

Lee, Mi Yeon, Jung Yup Lee, Won Jin Lee, So Yeon Kim, Young Ho Park, Tamim Mosaiab, Sung Young Park, and Insik In. "Photocatalytic Effect of $TiO_2$ Nanoparticles on Room-temperature Sinterable Silver Nanoparticle Ink with Poly (N-vinylpyrrolidone) Ligand." Chemistry letters 42, no. 6 (2013): 649-650.

Lee, S. H.; Rasaiah, J. C. *J. Chem. Phys.*, 1994, 101, 6964-6974.

Lee, Yung Jong, Na Rae Kim, Changsoo Lee, and Hyuck Mo Lee. "Uniform thin film electrode made of low-temperature-sinterable silver nanoparticles: optimized extent of ligand exchange from oleylamine to acrylic acid." Journal of Nanoparticle Research 19, no. 2 (2017): 1-11.

Lewis, G. G.; DiTucci, M. J.; Phillips, S. T. Quantifying Analytes in Paper-Based Microfluidic Devices Without Using External Electronic Readers. Angew. Chem., Int. Ed., 51, 12707 (2012).

Li, Haiyu, Wan Wang, Qing Lv, Guangcheng Xi, Hua Bai, and Qing Zhang. "Disposable paper-based electrochemical sensor based on stacked gold nanoparticles supported carbon nanotubes for the determination of bisphenol A." Electrochemistry Communications 68 (2016): 104-107.

Li, Wanli, Dawei Hu, Lingying Li, Cai-Fu Li, Jinting Jiu, Chuantong Chen, Toshiyuki Ishina, Tohru Sugahara, and Katsuaki Suganuma. "Printable and flexible copper-silver alloy electrodes with high conductivity and ultrahigh oxidation resistance." ACS applied materials & interfaces 9, no. 29 (2017): 24711-24721.

Li, Xu, David R. Ballerini, and Wei Shen. "A perspective on paper-based microfluidics: current status and future trends." Biomicrofluidics 6, no. 1 (2012): 011301.

Li, Xu, Junfei Tian, Gil Garnier, and Wei Shen. "Fabrication of paper-based microfluidic sensors by printing." Colloids and Surfaces B: Biointerfaces 76, no. 2 (2010): 564-570.

Liana, Devi D., Burkhard Raguse, J. Justin Gooding, and Edith Chow. "Recent advances in paper-based sensors." Sensors 12, no. 9 (2012): 11505-11526.

Lin, J.-L., H.-Y. Hsu, *Sensors* 2010, 10, 1798-1809.

Lisowski, Piotr, and Pawel K. Zarzycki. "Microfluidic paper-based analytical devices (µPADs) and micro total analysis systems (µtTAS): development, applications and future trends." Chromatographia 76, no. 19-20 (2013): 1201-1214.

Liu, H., H. Qing, Z. Li, Y. L. Han, M. Lin, H. Yang, A. Li, T. J. Lu, F. Li, F. Xu, *Mater. Sci. Eng. R,* 2017, 112, 1-22.

Liu, Hong, and Richard M. Crooks. "Paper-based electrochemical sensing platform with integral battery and electrochromic read-out." Analytical chemistry 84, no. 5 (2012): 2528-2532.

Liu, Hong, Yu Xiang, Yi Lu, and Richard M. Crooks. "Aptamer-based origami paper analytical device for electrochemical detection of adenosine." Angewandte Chemie International Edition 51, no. 28 (2012): 6925-6928.

Liu, Rui, Chunsun Zhang, and Min Liu. "Open bipolar electrode-electrochemiluminescence imaging sensing using paper-based microfluidics." Sensors and Actuators B: Chemical 216 (2015): 255-262.

Lombardi, J., M. D. Poliks, W. Zhao, S. Yan, N. Kang, J. Li, J. Luo, C. J. Zhong, Z. Pan, M. Almihdhar, B. S. Hsiao, 2017 IEEE 67th Electronic Components and Technology Conference, 2017 *IEEE,* 764-771.

López-Marzo, A. M., A. Merkoçi, Lab Chip, 2016, 16, 3150.

Lu, Y.; Shi, W.; Jiang, L.; Qin, J.; Lin, B. Rapid prototyping of paper-based microfluidics with wax for low-cost, portable bioassay. Electrophoresis, 30, 1497 (2009).

Luo, J.; Kariuki, N. N.; Han, L.; Maye, M. M.; Moussa, L. W.; Kowaleski, S. R.; Kirk, F. L.; Hepel, M.; Zhong, C. J. *J. Phys. Chem. B* 2002, 106, 9313.

Ma, H., C. Burger, B. S. Hsiao, B. Chu, *J. Membrane Sci.,* 2014, 454, 272-282.

Ma, H., K. Yoon, L. Rong, Y. Mao, Z. Mo, D. Fang, Z. Hollander, J. Gaiteri, B. S. Hsiao, B. Chu, *J. Mater. Chem.,* 2010, 20, 4692-4704.

Mallikarjuna, K., Hyun-Jun Hwang, Wan-Ho Chung, and Hak-Sung Kim. "Photonic welding of ultra-long copper nanowire network for flexible transparent electrodes using white flash light sintering." RSC Advances 6, no. 6 (2016): 4770-4779.

Martinez, A. W.; Phillips, S. T.; Butte, M. J.; Whitesides, G. M. Patterned Paper as a Platform for Inexpensive, LowVolume, Portable Bioassays. Angew. Chem., Int. Ed., 46, 1318 (2007).

Martinez, A. W.; Phillips, S. T.; Whitesides, G. M.; Carrilho, E. Diagnostics for the Developing World: Microfluidic Paper-Based Analytical Devices. Anal. Chem., 82, 3-10 (2010)

Martinez, Andres W., Scott T. Phillips, and George M. Whitesides. "Three-dimensional microfluidic devices fabricated in layered paper and tape." Proceedings of the National Academy of Sciences 105, no. 50 (2008): 19606-19611.

Martinez, Andres W., Scott T. Phillips, Benjamin J. Wiley, Malancha Gupta, and George M. Whitesides. "FLASH: a rapid method for prototyping paper-based microfluidic devices." Lab on a Chip 8, no. 12 (2008): 2146-2150.

Martinez, Andres W., Scott T. Phillips, Zhihong Nie, Chao-Min Cheng, Emanuel Carrilho, Benjamin J. Wiley, and George M. Whitesides. "Programmable diagnostic devices made from paper and tape." Lab on a Chip 10, no. 19 (2010): 2499-2504.

Matei, Elena, Ionut Enculescu, Maria Eugenia Toimil-Molares, Aurel Leca, Corneliu Ghica, and Victor Kuncser. "Magnetic configurations of Ni—Cu alloy nanowires obtained by the template method." Journal of nanoparticle research 15, no. 8 (2013): 1863.

Mavré, F.; Anand, R. K.; Laws, D. R.; Chow, K.-F.; Chang, B.-Y.; Crooks, J. A.; Crooks, R. M. Bipolar Electrodes: A Useful Tool for Concentration, Separation, and Detection of Analytes in Microelectrochemical Systems. Anal. Chem., 82, 8766 (2010).

Mavré, F.; Chow, K.-F.; Sheridan, E.; Chang, B.-Y.; Crooks, J. A.; Crooks, R. M. A Theoretical and Experimental Framework for Understanding Electrogenerated Chemiluminescence (ECL) Emission at Bipolar Electrodes. Anal. Chem., 81, 6218 (2009).

Maxwell, J. E.; Mazzeo, A. D.; Whitesides, G. M. Paper-based electroanalytical devices for accessible diagnostic testing. MRS Bull., 38, 309 (2013).

Morbioli, Giorgio Gianini, Thiago Mazzu-Nascimento, Amanda M. Stockton, and Emanuel Carrilho. "Technical aspects and challenges of colorimetric detection with microfluidic paper-based analytical devices (µPADs)—A review." Analytica chimica acta 970 (2017): 1-22.

Mott, D., J. Yin, M. Engelhard, R. Loukrakpam, P. Chang, G. Miller, I.-T. Bae, N. Chandra Das, C. Wang, J. Luo, C. J. Zhong, Chem. Mater., 2010, 22, 261-271.

Nantaphol, Siriwan, Orawon Chailapakul, and Weena Siangproh. "A novel paper-based device coupled with a silver nanoparticle-modified boron-doped diamond electrode for cholesterol detection." Analytica chimica acta 891 (2015): 136-143.

Nery, Emilia W., and Lauro T. Kubota. "Sensing approaches on paper-based devices: a review." Analytical and bioanalytical chemistry 405, no. 24 (2013): 7573-7595.

Nge, Pamela N., Chad I. Rogers, and Adam T. Woolley. "Advances in microfluidic materials, functions, integration, and applications." Chemical reviews 113, no. 4 (2013): 2550-2583.

Nie, Zhihong, Christian A. Nijhuis, Jinlong Gong, Xin Chen, Alexander Kumachev, Andres W. Martinez, Max Narovlyansky, and George M. Whitesides. "Electrochemical sensing in paper-based microfluidic devices." Lab on a Chip 10, no. 4 (2010): 477-483.

Nie, Zhihong, Frédérique Deiss, Xinyu Liu, Ozge Akbulut, and George M. Whitesides. "Integration of paper-based microfluidic devices with commercial electrochemical readers." Lab on a Chip 10, no. 22 (2010): 3163-3169.

Noiphung, Julaluk, Temsiri Songjaroen, Wijitar Dungchai, Charles S. Henry, Orawon Chailapakul, and Wanida Laiwattanapaisal. "Electrochemical detection of glucose from whole blood using paper-based microfluidic devices." Analytica chimica acta 788 (2013): 39-45.

Ordeig, O.; Godino, N.; del Campo, J.; Muñoz, F. X.; Nikolajeff, F.; Nyholm, L. On-Chip Electric Field Driven Electrochemical Detection Using a Poly(dimethylsiloxane) Microchannel with Gold Microband Electrodes. Anal. Chem., 80, 3622 (2008).

Parolo, C.; Merkoci, A. Paper-based nanobiosensors for diagnostics. Chem. Soc. Rev., 42, 450 (2013).

Pelton, Robert. "Bioactive paper provides a low-cost platform for diagnostics." TrAC Trends in Analytical Chemistry 28, no. 8 (2009): 925-942.

Peters, Kelley L., Inge Corbin, Lindsay M. Kaufman, Kyle Zreibe, Lucas Blanes, and Bruce R. McCord. "Simultaneous colorimetric detection of improvised explosive compounds using microfluidic paper-based analytical devices (µRADs)." Analytical methods 7, no. 1 (2015): 63-70.

Qiu, Ri, Hyun Gil Cha, Hui Bog Noh, Yoon Bo Shim, Xiao Li Zhang, Ru Qiao, Dun Zhang, Yeong Il Kim, Umapada Pal, and Young Soo Kang. "Preparation of dendritic copper nanostructures and their characterization for electroreduction." The Journal of Physical Chemistry C 113, no. 36 (2009): 15891-15896.

Qiu, Ri, Xiao Li Zhang, Ru Qiao, Yan Li, Yeong Il Kim, and Young Soo Kang. "CuNi dendritic material: synthesis, mechanism discussion, and application as glucose sensor." Chemistry of materials 19, no. 17 (2007): 4174-4180.

Rathmell, A. R., M. Nguyen, M. Chi, B. J. Wiley, Nano Lett. 2012, 12,3193-3199.

Rathmell, Aaron R., and Benjamin J. Wiley. "The synthesis and coating of long, thin copper nanowires to make flexible, transparent conducting films on plastic substrates." Advanced Materials 23, no. 41 (2011): 4798-4803.

Rathmell, Aaron R., Minh Nguyen, Miaofang Chi, and Benjamin J. Wiley. "Synthesis of oxidation-resistant cupronickel nanowires for transparent conducting nanowire networks." Nano letters 12, no. 6 (2012): 3193-3199.

Renault, Christophe, Karen Scida, Kyle N. Knust, Stephen E. Fosdick, and Richard M. Crooks. "Paper-based bipolar electrochemistry." Journal of Electrochemical Science and Technology 4, no. 4 (2013): 146-152.

Rungsawang, Tipawan, Eakkasit Punrat, Jaclyn Adkins, Charles Henry, and Orawon Chailapakul. "Development of Electrochemical Paper-based Glucose Sensor Using Cellulose-4-aminophenylboronic Acid-modified Screen-printed Carbon Electrode." Electroanalysis 28, no. 3 (2016): 462-468.

Russo, Analisa, Bok Yeop Ahn, Jacob J. Adams, Eric B. Duoss, Jennifer T. Bernhard, and Jennifer A. Lewis. "Pen-on-paper flexible electronics." Advanced materials 23, no. 30 (2011): 3426-3430.

Sackmann, Eric K., Anna L. Fulton, and David J. Beebe. "The present and future role of microfluidics in biomedical research." Nature 507, no. 7491 (2014): 181.

Sameenoi, Yupaporn, Piyaporn Na Nongkai, Souksanh Nouanthavong, Charles S. Henry, and Duangjai Nacapricha. "One-step polymer screen-printing for microfluidic paper-based analytical device (µPAD) fabrication." Analyst 139, no. 24 (2014): 6580-6588.

Santhiago, M.; Wydallis, J. B.; Kubota, L. T.; Henry, C. S. Construction and Electrochemical Characterization of Microelectrodes for Improved Sensitivity in Paper-Based Analytical Devices. Anal. Chem., 85, 5233 (2013).

Santhiago, Murilo, and Lauro T. Kubota. "A new approach for paper-based analytical devices with electrochemical detection based on graphite pencil electrodes." Sensors and Actuators B: Chemical 177 (2013): 224-230.

Savastano, D., "Conductive Inks Drive Growth in Flexible and Printed Electronics", www.printedelectronicsnow.com/issues/2015-03-01/view_features/conductive-inks-drive-growth-in-flexible-and-printed-electronics/ (03.09.15).

Schazmann, B., D. Morris, C. Slater, S. Beirne, C. Fay, R. Reuveny, N. Moyna, D. Diamond, Anal. Methods, 2010, 2, 342-348

Scida, K.; Li, B.; Ellington, A. D.; Crooks, R. M. DNA Detection Using Origami Paper Analytical Devices. Anal. Chem., 85, 9713 (2013).

Sharma, M. K., D. Qi, R. D. Buchner, W. J. Scharmach, V. Papavassiliou, M. T. Swihart, *ACS Appl. Mater. Interfaces,* 2014, 6, 13542.

Shin, Dong-Youn, and Sangki Chun. "Exothermic and Recursive Reaction of Self-Sinterable Silver Ink for Flexible Electronics." MRS Online Proceedings Library Archive 1567 (2013).

Shin, Sangwoo, Beom Seok Kim, Kyung Min Kim, Bo Hyun Kong, Hyung Koun Cho, and Hyung Hee Cho. "Tuning the morphology of copper nanowires by controlling the growth processes in electrodeposition." Journal of Materials Chemistry 21, no. 44 (2011): 17967-17971.

Siegel, Adam C., Scott T. Phillips, Michael D. Dickey, Nanshu Lu, Zhigang Suo, and George M. Whitesides. "Foldable printed circuit boards on paper substrates." Advanced Functional Materials 20, no. 1 (2010): 28-35.

Song, Jizhong, Jianhai Li, Jiayue Xu, and Haibo Zeng. "Superstable transparent conductive Cu@ Cu4Ni nanowire elastomer composites against oxidation, bending, stretching, and twisting for flexible and stretchable optoelectronics." Nano letters 14, no. 11 (2014): 6298-6305.

Stewart, Ian E., Aaron R. Rathmell, Liang Yan, Shengrong Ye, Patrick F. Flowers, Wei You, and Benjamin J. Wiley. "Solution-processed copper-nickel nanowire anodes for organic solar cells." Nanoscale 6, no. 11 (2014): 5980-5988.

Sun, Guoqiang, Panpan Wang, Shenguang Ge, Lei Ge, Jinghua Yu, and Mei Yan. "Photoelectrochemical sensor for pentachlorophenol on microfluidic paper-based analytical device based on the molecular imprinting technique." Biosensors and Bioelectronics 56 (2014): 97-103.

Sun, S.; Yang, Y.; Liu, F.; Pang, Y.; Fan, J.; Sun, L.; Peng, X. Study of Highly Efficient Bimetallic Ruthenium Trisbipyridyl ECL Labels for Coreactant System. Anal. Chem., 81, 10227 (2009).

Tan, Swee Ngin, Liya Ge, and Wei Wang. "Paper disk on screen printed electrode for one-step sensing with an internal standard." Analytical chemistry 82, no. 21 (2010): 8844-8847.

Taudte, Regina Verena, Alison Beavis, Linzi Wilson-Wilde, Claude Roux, Philip Doble, and Lucas Blanes. "A portable explosive detector based on fluorescence quenching of pyrene deposited on coloured wax-printed µPADs." Lab on a Chip 13, no. 21 (2013): 4164-4172.

Tobjork, Daniel, and Ronald Osterbacka. "Paper electronics." Advanced Materials 23, no. 17 (2011): 1935-1961.

Vinogradov, A. V., A. A. Levshanov, M. A. Kashirin, A. V. Agafonov, V. V. Vinogradov, *J. Phys. Chem. C,* 2015, 119, 1500.

Wakuda, Daisuke, Mariko Hatamura, and Katsuaki Suganuma. "Novel method for room temperature sintering of Ag nanoparticle paste in air." Chemical Physics Letters 441, no. 4-6 (2007): 305-308.

Wang, J. Luo, M. J. Schadt, C. J. Zhong, *Langmuir,* 2010, 26, 618-632.

Wang, Li, Yaolin Zheng, Xingping Lu, Zhuang Li, Lanlan Sun, and Yonghai Song. "Dendritic copper-cobalt nanostructures/reduced graphene oxide-chitosan modified glassy carbon electrode for glucose sensing." Sensors and Actuators B: Chemical 195 (2014): 1-7.

Wang, P.; Ge, L.; Yan, M.; Song, X.; Ge, S.; Yu, J. Paper-based three-dimensional electrochemical immunodevice based on multi-walled carbon nanotubes functionalized paper for sensitive point-of-care testing. Biosens. Bioelectron., 32, 238 (2012).

Wang, Peng, Dun Zhang, and Ri Qiu. "Extreme wettability due to dendritic copper nanostructure via electrodeposition." Applied Surface Science 257, no. 20 (2011): 8438-8442.

Wang, X., D. Fang, B. S. Hsiao, B. Chu, *J. Membrane Science,* 2014, 469, 188-197.

Wu, Y.; Xue, P.; Kang, Y.; Hui, K. M. Paper-Based Microfluidic Electrochemical Immunodevice Integrated with Nanobioprobes onto Graphene Film for Ultrasensitive Multiplexed Detection of Cancer Biomarkers. Anal. Chem., 85, 8661 (2013).

Wunscher, S., R. Abbel, J. Perelaer, U. S. Schubert, *J. Mater. Chem. C,* 2014, 2, 10232-10261.

Yan, S., X. Liu, Z. Skeete, N. He, Z. H. Xie, W. Zhao, J. P. Lombardi, K. Liu, N. Kang, J. Luo, B. S. Hsiao, M. Poliks, I. Gitsov, C. J. Zhong, *Adv. Mater. Interfaces,* 2017, 4, 1700380.

Yetisen, Ali Kemal, Muhammad Safwan Akram, and Christopher R. Lowe. "based microfluidic point-of-care diagnostic devices." Lab on a Chip 13, no. 12 (2013): 2210-2251.

Yin, J., S. Shan, L. Yang, D. Mott, O. Malis, V. Petkov, F. Cai, M. S. Ng, J. Luo, B. H. Chen, M. Engelhard, C. J. Zhong, *Chem. Mater.,* 2012, 24, 4662-4674.

Yin, Z., C. Lee, S. Cho, J. Yoo, Y. Piao, Y. S. Kim, *Small,* 2014, 10, 5047-5052.

Yu, W., Z. Chen, H. Ye, P. Liu, Z. Li, Y. Wang, Q. Li, S. Yan, C. J. Zhong, N. He. *Microbial Cell Factories* 2017, 16, 22-32.

Zhan, W.; Crooks, R. M. Microelectrochemical Logic Circuits. J. Am. Chem. Soc., 125, 9934 (2003).

Zhang, Dieqing, Ranran Wang, Meicheng Wen, Ding Weng, Xia Cui, Jing Sun, Hexing Li, and Yunfeng Lu. "Synthesis of ultralong copper nanowires for high-performance transparent electrodes." Journal of the American Chemical Society 134, no. 35 (2012): 14283-14286.

Zhang, Yan, Lei Ge, Meng Li, Mei Yan, Shenguang Ge, Jinghua Yu, Xianrang Song, and Bingqiang Cao. "Flexible paper-based ZnO nanorod light-emitting diodes induced multiplexed photoelectrochemical immunoassay." Chemical Communications 50, no. 12 (2014): 1417-1419.

Zhao, W., J. Luo, S. Shan, J. P. Lombardi, Y. Xu, K. Cartwright, S. Lu, M. Poliks, C. J. Zhong, *Small,* 2015, 35, 4509-4516.

Zhao, W., T. Rovere, D. Weerawarne, G. Osterhoudt, N. Kang, P. Joseph, J. Luo, B. Shim, M. Poliks, C. J. Zhong, *ACS Nano,* 2015, 9, 6168-6177.

See, U.S. Published Patent Application and U.S. Pat. Nos. 5,820,881; 5,949,595; 6,116,516; 6,554,202; 6,573,039; 6,595,202; 6,620,591; 6,902,883; 6,960,454; 7,033,781; 7,060,445; 7,075,703; 7,109,033; 7,118,910; 7,217,321; 7,235,373; 7,244,402; 7,279,146; 7,291,512; 7,306,672; 7,371,719; 7,390,526; 7,413,712; 7,435,362; 7,452,679; 7,459,022; 7,465,842; 7,476,363; 7,479,186; 7,485,419; 7,491,690; 7,534,560; 7,534,761; 7,544,661; 7,546,210; 7,554,021; 7,612,185; 7,666,361; 7,683,025; 7,691,333; 7,692,065; 7,704,322; 7,745,708; 7,749,737; 7,785,780; 7,799,554; 7,820,427; 7,833,708; 7,837,946; 7,838,491; 7,851,445; 7,853,409; 7,867,454; 7,892,734; 7,927,422; 7,931,683; 7,938,855; 7,942,926; 7,949,474; 7,960,184; 7,964,139; 7,976,915; 7,981,150; 8,002,823; 8,002,933; 8,007,746; 8,017,739; 8,021,480; 8,039,690; 8,052,792; 8,058,415; 8,062,893; 8,063,014; 8,066,763; 8,067,054; 8,068,991; 8,070,797; 8,071,156; 8,076,295; 8,104,515; 8,124,583; 8,138,140; 8,148,130; 8,163,492; 8,163,896; 8,187,620; 8,206,992; 8,207,316; 8,216,632; 8,220,487;

8,221,822; 8,231,980; 8,247,178; 8,273,610; 8,287,850; 8,287,937; 8,343,442; 8,353,949; 8,367,035; 8,377,710; 8,382,896; 8,409,800; 8,420,017; 8,431,149; 8,440,093; 8,449,603; 8,450,271; 8,466,277; 8,470,532; 8,475,765; 8,486,636; 8,492,333; 8,507,200; 8,548,745; 8,568,315; 8,568,690; 8,574,615; 8,575,276; 8,580,923; 8,586,348; 8,603,832; 8,618,266; 8,628,729; 8,633,164; 8,653,642; 8,666,471; 8,691,010; 8,692,002; 8,695,640; 8,703,494; 8,704,167; 8,709,152; 8,709,153; 8,709,354; 8,710,437; 8,771,343; 8,815,273; 8,815,275; 8,816,275; 8,821,810; 8,828,663; 8,840,879; 8,845,914; 8,852,526; 8,859,956; 8,859,958; 8,859,959; 8,859,986; 8,871,446; 8,889,829; 8,890,063; 8,895,918; 8,900,292; 8,912,128; 8,916,518; 8,920,491; 8,920,682; 8,921,118; 8,932,346; 8,933,398; 8,937,288; 9,011,798; 9,035,239; 9,067,272; 9,103,761; 9,115,081; 9,116,146; 9,116,154; 9,127,035; 9,136,153; 9,150,913; 9,157,109; 9,157,921; 9,184,036; 9,184,038; 9,187,524; 9,192,933; 9,193,988; 9,205,423; 9,230,792; 9,255,843; 9,266,105; 9,284,409; 9,320,826; 9,332,937; 9,346,048; 9,354,181; 9,365,019; 9,376,612; 9,376,690; 9,415,392; 9,415,610; 9,428,685; 9,447,461; 9,452,431; 9,459,262; 9,463,244; 9,464,319; 9,464,642; 9,480,980; 9,481,861; 9,488,613; 9,493,826; 9,494,865; 9,498,914; 9,500,572; 9,500,623; 9,500,630; 9,506,855; 9,513,743; 9,528,987; 9,546,979; 9,548,192; 9,551,706; 9,555,644; 9,557,274; 9,563,833; 9,579,650; 9,586,899; 9,594,051; 9,594,056; 9,599,613; 9,616,425; 9,620,344; 9,636,677; 9,643,136; 9,643,152; 9,643,178; 9,664,679; 9,669,638; 9,675,358; 9,686,540; 9,687,362; 9,691,873; 9,702,839; 9,702,886; 9,714,443; 9,715,155; 9,733,228; 9,739,718; 9,744,245; 9,757,475; 9,761,426; 9,791,434; 9,797,415; 9,797,872; 9,810,623; 9,810,658; 9,817,094; 9,823,247; 9,823,249; 9,829,488; 9,837,181; 9,889,209; 9,890,427; 9,921,233; 9,932,360; 9,932,687; 9,941,105; 9,962,832; 9,964,501; 9,981,377; 9,986,924; 9,993,921; 9,996,195; 10,000,790; 10,004,434; 10,006,911; 10,008,375; 10,014,169; 10,029,451; 10,073,102; 10,078,442; 10,088,461; 10,119,981; 10,131,934; 10,150,986; 10,151,649; 10,153,519; 10,157,340; 10,161,876; 10,175,162; 10,175,199; 10,175,550; 10,175,879; 10,185,491; 10,195,294; 10,196,700; 10,197,547; 10,204,772; 10,207,006; 10,214,564; 10,220,069; 10,232,374; 20020102635; 20020160378; 20040009476; 20040077090; 20040109853; 20040115709; 20040175407; 20040265230; 20050124010; 20050227071; 20060046287; 20060183137; 20080026953; 20080067068; 20080274533; 20090036315; 20090142649; 20090238811; 20090298191; 20090325262; 20100096327; 20100152464; 20100210745; 20100233146; 20100248334; 20100267049; 20100279278; 20100287671; 20100298170; 20100304357; 20110059441; 20110070658; 20110105360; 20110111517; 20110123398; 20110209999; 20110240064; 20110250626; 20110318227; 20120009662; 20120021934; 20120028342; 20120070833; 20120087949; 20120097194; 20120119079; 20120129301; 20120135437; 20120171702; 20120181184; 20120192952; 20120198684; 20120238008; 20120248595; 20120302456; 20130034869; 20130034908; 20130065240; 20130071839; 20130095506; 20130098835; 20130102791; 20130109837; 20130112017; 20130112866; 20130112867; 20130128036; 20130140649; 20130181010; 20130228520; 20130267433; 20130273560; 20130280819; 20130281360; 20130317130; 20130330714; 20130330754; 20140001058; 20140008529; 20140008532; 20140038914; 20140048697; 20140051173; 20140051180; 20140109560; 20140141466; 20140154788; 20140183351; 20140186862; 20140193889; 20140196631; 20140234881; 20140246334; 20140302486; 20140308754; 20140349279; 20140363833; 20150010461; 20150017712; 20150032137; 20150041638; 20150045286; 20150050708; 20150056719; 20150070904; 20150087935; 20150107998; 20150111760; 20150116093; 20150122987; 20150132742; 20150136964; 20150141470; 20150147776; 20150148247; 20150160245; 20150191607; 20150260616; 20150260713; 20150283699; 20150309001; 20150323461; 20150325423; 20150328490; 20150336887; 20160008809; 20160008812; 20160024589; 20160033383; 20160040172; 20160052131; 20160054310; 20160060511; 20160061741; 20160067345; 20160118236; 20160123971; 20160124062; 20160131621; 20160132759; 20160146755; 20160155622; 20160166712; 20160201051; 20160254131; 20160256870; 20160274105; 20160281145; 20160288121; 20160297851; 20160313306; 20160351381; 20160370356; 20160370389; 20160376631; 20170037082; 20170043341; 20170067881; 20170082604; 20170084438; 20170097021; 20170106367; 20170168032; 20170168044; 20170173186; 20170184546; 20170219523; 20170224257; 20170224280; 20170231571; 20170239821; 20170248607; 20170287690; 20170309462; 20170340254; 20170343526; 20170364785; 20180008696; 20180012746; 20180017535; 20180021439; 20180031551; 20180040464; 20180050101; 20180064377; 20180107909; 20180120312; 20180136160; 20180155714; 20180175158; 20180204712; 20180224443; 20180250671; 20180285711; 20180313765; 20180330934; 20180372699; 20190006222; 20190017078; 20190024148; 20190030710; 20190038190; and 20190038826.

See also, U.S. Published Patent Application and Patent Nos. 20080143906; 20080278181; 20120097059; 20120168684; 20130008690; 20130270121; 20140120359; 20170140846; 20180134909; 20210109027; 20210102265; 20210045640; 20200041319; 20190154550; 20190118175; 20180313765; 20170102380; 20160054310; 20140295533; 20140147346; 20130337579; 20130330754; 20120135437; 20110286896; 8,764,878; 8,834,597; 9,150,746; 10,900,818; 10,859,473; 10,695,762; 10,690,653; 10,598,625; 10,596,572; 10,576,426; 10,464,067; 10,421,072; 9,687,846; 9,528,987; 9,157,109; 8,790,594; and WO2014063769; WO2015120960; WO2016197234; CN105514406; CN106029261.

The integration of sensors with smartphone systems is well established. See, U.S. Published Patent Application and Patent Nos. 20210199627; 20210190750; 20210188541; 20210181118; 20210142645; 20210139040; 20210123921; 20210120193; 20210117642; 20210116449; 20210116384; 20210116378; 20210116377; 20210116376; 20210116371; 20210104229; 20210104228; 20210104227; 20210015955; 20210014122; 20210012641; 20200402099; 20200394485; 20200387793; 20200372456; 20200359955; 20200349328; 20200313924; 20200304334; 20200304333; 20200304332; 20200304331; 20200300851; 20200285953; 20200284743; 20200245694; 20200226524; 20200226191; 20200167761; 20200143795; 20200143316; 20200133963; 20200133213; 20200125765; 20200111342; 20200104530; 20200092127; 20200088703; 20200064323; 20200020165; 20200019364; 20190369040; 20190361412; 20190361411; 20190340480; 20190257829; 20190243352; 20190234896; 20190213612; 20190158309; 20190156079; 20190095644; 20190095519; 20190095518; 20190095480; 20190090547; 20190090546; 20190060602; 20190051135; 20190035159; 20190026359; 20190011288; 20180285711; 20180249735; 20180224443; 20180107909; 20180082566; 20170364785; 20170353530; 20170340254; 20170332702; 20170325494; 20170323481; 20170312614; 20170309091; 20170308889; 20170303594; 20170303593; 20170303592; 20170303591; 20170303590; 20170303589; 20170303580; 20170215787; 20170173262; 20170164878; 20170100105; 20170093981; 20170079627; 20170023509; 20170016876; 20160363550; 20160300240;

20160178606; 20160140870; 20160073886; 20150313496; 20150276656; 20150276648; 20150276644; 20150276643; 20150276635; 20150276516; 20150148705; 20150148686; 20150148685; 20150148265; 20150132857; 20150116093; 20150087935; 20150079697; 20130244336; 20130236980; 20130217598; 20130171733; 20130110064; 20110010107; 11,048,247; 11,038,709; 11,037,032; 11,024,292; 11,020,042; 11,018,891; 11,018,890; 11,018,889; 11,016,998; 11,010,713; 11,002,725; 10,983,102; 10,977,607; 10,942,629; 10,942,140; 10,914,644; 10,909,499; 10,904,012; 10,854,194; 10,846,649; 10,845,213; 10,839,339; 10,794,850; 10,788,485; 10,788,439; 10,788,437; 10,782,261; 10,776,695; 10,762,466; 10,762,465; 10,748,111; 10,747,968; 10,740,717; 10,739,305; 10,719,755; 10,712,337; 10,685,488; 10,667,741; 10,663,420; 10,579,954; 10,575,834; 10,521,759; 10,515,098; 10,505,756; 10,501,770; 10,492,981; 10,467,880; 10,455,410; 10,453,023; 10,451,598; 10,417,451; 10,412,997; 10,335,572; 10,334,888; 10,314,492; 10,292,427; 10,274,487; 10,229,382; 10,212,971; 10,176,642; 10,157,363; 10,157,340; 10,149,958; 10,127,741; 10,102,494; 10,078,811; 10,074,069; 10,046,229; 9,984,350; 9,984,349; 9,984,348; 9,930,635; 9,913,240; 9,904,902; 9,854,556; 9,814,426; 9,788,297; 9,775,126; 9,769,786; 9,769,785; 9,674,812; 9,610,037; 9,591,607; 9,563,833; 9,549,703; 9,526,450; 9,510,316; 9,465,023; 9,402,242; 9,234,757; 9,186,278; 9,182,232; 9,182,231; 8,989,053; 8,816,149; 8,268,630.

SUMMARY OF THE INVENTION

Conductive inks play a critical role in printed electronics. This builds upon gold- and copper-based nanoparticle (NP) and nanowire (NW) inks that are sinterable under pulsed lasers or self-sinterable at room temperature (RT), and address a fundamental gap between nanoink formulating and printing on paper substrates with highly nanofibrous and porous structures for the fabrication of sensors such as sweat sensors.

There is an increasing need for conductive inks, especially metal nanoparticle inks, in the market of flexible electronics and sensors. The pain for most existing metal nanoparticle inks is the requirement of high temperature sintering, which is not suitable for many flexible substrates such as plastics and papers. The technology addresses this problem by providing room-temperature sinterable copper-gold alloy nanoparticle inks which is applicable for printed, flexible electronics and sensors.

The nanoinks are formulated for aerosol-jet, inkjet and dispenser printers to print conductive patterns onto on the paper substrates. Technically, this gap is linked to two specific challenges: (1) the traditional silver or copper inks can no longer meet the device manufacturing requirements in terms of stability, scalability, conductivity, adhesion, etc., and (2) the traditional thermal sintering can no longer meet the demand for more common flexible manufacturing processes.

Fibrous materials serve as an intriguing class of 3D materials to meet the growing demands for flexible, foldable, biocompatible, biodegradable, disposable, inexpensive, and wearable sensors and the rising desires for higher sensitivity, greater miniaturization, lower cost, and better wearability. The use of such materials for the creation of a fibrous sensor substrate that interfaces with a sensing film in a 3D dimension with the transducing electronics is however difficult by conventional photolithographic methods. Here, a highly effective pathway featuring surface-mediated interconnection (SMI) of metal nanoclusters (NCs) and nanoparticles (NPs) in fibrous materials at ambient conditions is demonstrated for fabricating the fibrous sensor substrates or platforms. Bimodal-distributed gold-copper alloy NCs and NPs are used as a model system to demonstrate the semi-conductive-to-metallic conductivity transition, quantized capacitive charging, and anisotropic conductivity characteristics. Upon coupling SMI of NCs/NPs as electrically conductive microelectrodes and surface-mediated assembly (SMA) of the NCs/NPs as chemically sensitive interfaces, the resulting fibrous chemiresistors function as sensitive and selective sensors for gaseous and vaporous analytes. This new SMI-SMA strategy has significant implications for manufacturing high-performance fibrous platforms to meet the growing demands of the advanced multifunctional sensors and biosensors.

The present technology provides, according to one aspect, room-temperature sinterable metal alloy nanoalloy inks for low-cost and scalable manufacturing of paper sensors. Advantageously, the metal alloy is a copper alloy.

This technology preferably provides an air-stable and low-cost copper-based nanowire ink formulation for manufacturing wearable electronics and sensors on flexible polymer or paper substrates under ambient conditions. The air stability of the technology is in contrast to the many existing inks which suffer from the mobility of metal ions under humid environment and the propensity of metal oxidation degrading or damaging the electronics. The ambient condition manufacturing capability of the technology is in contrast to the traditional high-temperature thermal sintering which are not suitable for many common flexible substrates.

The metal composition of the preferred metal alloy ink also features low cost in materials and manufacturing in comparison with most of the existing ink technologies. For wearable electronics and sensors manufacturers which suffer from the pain of high-temperature and high-cost manufacturing with a high failure rate, the ink technology provides air stability and low temperature operating capability to help reduce the manufacturing cost at a higher production speed and lower failure rate, unlike the current inks which are either high cost or require high operating temperature not viable for flexible or wearable materials.

The targeted applications of the preferred metal inks include wearable electronics and sensors which depend heavily on printable and conductive inks in scalable manufacturing of the electronic circuits or sensitive thin films on flexible materials. Wearable electronics and sensors have found increasing applications in today's society, especially for monitoring human health and point-of-care diagnostics via wireless interfaces with smartphones. However, the biggest challenge for manufacturing wearable electronics and sensors is the high-temperature and high-cost manufacturing with a high failure rate due to poor air stability of the printable inks. The technology features formulations of air stable metal inks that enable low temperature and low-cost manufacturing of printable electronics and wearable sensors.

The low-temperature, air-stable metal nanoinks are usable in wearable electronics such as low-cost wearable human performance monitors for health/wellness and medical uses as well as high-performance conformal antennas for both aircraft integration and body-wearable concepts. Point-of-care diagnostics and potential generation of medical database have contributed to the growth of the overall screening and diagnostics types of sensor market. The growing demand of wearable electronics and sensor products for personal healthcare, entertainment, industrial and military purposes is currently hampered by a major limitation or pain that the current approaches for manufacturing paper electronics either require high-cost and bulky equipment or suffer from the inabilities to operate at ambient condition and scale up for mass production.

A preferred embodiment of the technology features a copper-gold (CuAu) alloy nanoparticle ink technology in which the CuAu alloy nanoparticle ink can be printed on a substrate and become electrically conductive at room temperature without the need of any external triggering actions. In comparison with existing room-temperature sinterable Ag nanoink technology or thermally/optically-sinterable Cu nanoink technology, the CuAu nanoparticles feature not only adjustable compositions, but also can be used for the same applications but with a major advantage: high stability, which is a major drawback for existing Ag nanoinks or Cu nanoinks. This advantage is highly desired for printable electronics and device applications.

The nanoink is useful for printed electronics, especially for printing conductive patterns on plastic or paper substrates that cannot survive high temperature treatment. Currently in the market of metal nanoinks, the sintering of most inks require external triggering actions such as thermal, photo, laser, or chemical triggering in order to make the printed nanoink to sinter and become conductive. An example of room temperature sinterable inks is certain silver nanoink. Testing of the silver nanoink has demonstrated the viability of room temperature sintering in the presence of additives, most of which are not known to the public. Room temperature sinterable CuAu alloy nanoparticle ink is not reported, except for laser-sintering of CuAu alloy nanoparticle ink.

The technology of room-temperature sinterable gold nanoparticle ink includes the following key features: 1) Average size of the CuAu alloy nanoparticles ranges from 2 to 20 nm in diameter; 2) Adjustable compositions featuring $Cu_nAu_{100-n}$ where n=2 to 99; 3) Synthesis of the CuAu alloy nanoparticles is large-scale, green (in water) and low cost. 4) This ink features water as the dispersing solvent. 5) The ink can be printed on any substrates by screen printing and inkjet printing, etc. 6) Sheet resistance of the printed nanoink is a few Ohms/square and below, or a resistivity as low as $\sim 10^{-7}$ Ohms·m. While the CuAu nanoparticle ink appears more expensive than Cu nanoink in terms of the materials cost, the large-scale and low-cost synthesis, and the high stability of the ink, provide net advantages for, e.g., high-performance printed electronics and device applications.

A copper nanowire paste technology is provided which, for example, can avoid use of silver inks that require high processing temperatures in photovoltaic cell manufacture and other applications. Similarly, the paste may also be used in applications where thermal conductivity is desired.

Conductive and transparent electrode materials are a key element for the realization of thin-film solar cells. Manufacturing of silicon-based solar cells involves screen printing of conductive silver pastes as front electrodes to provide good contact and efficient electrical performance. In addition, silver nanowires have recently emerged as an alternative to silver nanoparticles because of their high transparency and conductivity due to the percolated random network nature of the nanowires. Currently, silver-based materials account for a substantial part of the total production cost of solar cells. Considering that bulk copper is ~100 times cheaper than bulk silver, there has been an increasing interest in replacing silver with copper. The use of existing copper inks, however, has been hindered by the cost structure associated with high-cost, high-temperature, and non-scalable sintering processes. The present technology overcomes these barriers by employing copper nanowire inks that are self-sinterable at room temperature and can be used for manufacturing highly conductive and transparent electrodes on solar panels.

Pure copper NP inks address the migration problem with an attractive low-cost feature but also suffers from the propensity of oxidation. Based on the increased stability of Cu upon alloying it with Au, Cu alloying with selected stability-enhancing transition metals (e.g., Ni, Sn, etc.) offers new opportunities. In comparison with Cu, CuM alloys may be grouped into those that can maintain a higher percentage of Cu conductivity (~80%, M=Ag, Zn, Au, etc.), and those with a medium percentage (~40%, M=Ni, Al, Sn, etc.), which have sufficient conductivity for the targeted paper sensor application. There is convincing evidence of the increased stability of Cu by alloying Au, and alloying several other stability-enhancing transition metals (M=Ni, Au, Sn, Al, etc.). CuNi alloy has an oxidation resistance in comparison with pure copper.

The RT self-sinterable nanoinks feature copper-based alloy nanoparticles (NPs) and nanowires (NWs). In comparison with the NPs, the NWs feature greatly-enhanced percolation conductivity but also lower consumption of materials. Metal nanowire networks deposited on elastomers have demonstrated excellent conductivity, flexibility, and stretchability.

Au, Cu and Cu-alloy NPs and NWs have been synthesized using wet-chemical methods by controlling metal-precursor compositions. Au and CuAu nanoink-printed flexible PET is sinterable by pulsed laser. Pure Au and CuAu NPs have been demonstrated as printable nanoinks. These may be used to produce Au and CuAu sintered NPs formed as conductive traces or interdigitated microelectrode patterns.

FIGS. 1A-1B illustrate roll-to-roll (R2R) printing NPs or NWs in the context of manufacturing flexible electronics (FIG. 1A), and printing (e.g., aerosol jet) NPs and NWs on paper for fabricating wearable sweat sensors (FIG. 1B). The CuAu nanoinks were printed and RT-sintered on paper substrate in an interdigitated microelectrode pattern (CN/PAN/PET), resulting in Roughness: $R_a$=24 nm, $R_q$=32 nm. For CuAu NPs sintered on paper substrate, the CuAu-sintered film on the CN/PAN/PET paper showed that the surface roughness was largely comparable to that of paper, $R_a$=42 nm, $R_q$=56 nm, for CN/PAN/PET, demonstrating sintering in a conformal fashion over the paper surface. CuNi alloy NWs with >90% Cu (10~40 nm) printed on the paper were sintered at RT as conductive trace. The four-probe method showed reasonably good electrical conductivities (Table 1).

The technology is thus useful in forming gauge sensors using laser sintered CuAu nanoink on PET substrate coated with MUA-linked Au nanoparticle sensing thin films.

FIGS. 2A-2C show plots of 1/|Z| vs. conc. of K+ (a) Na+ (b) for MUA-AuNPs with graphite on PET side and the CN side, and for PDA-AuNPs with graphite on the PET side (FIG. 2C). FIG. 2D shows a proof-of-concept demo of a sweat sensor, collecting data before and after exercise.

Carbon ink-printed paper devices were thus shown to function as a sweat sensor. For example, in testing AuNPs/CN/PAN/PET sensor for detection of K+, Na+, and Li+ in aqueous solutions in a flow channel (FIG. 2A-2B), plots of 1/|Z| values vs. ionic concentration showed a linear dependence with subtle differences in the slope: $K^+$ $(1.3\times10^{-7})$ >Na+ $(1.2\times10^{-7})$, which is consistent with the higher ionic mobility of $K^+$ For PDA-Au NPs/CN/PAN/PET with positively-charged polymer (PDA: polydiallyl ammonium), the overall 1/|Z| value for K+ is greater than that for Na+ (FIG. 2C), suggesting the viability of tuning the sensitivity.

While sweat contains different chemical constituents, preliminary work focused on the salt and moisture detections to demonstrate the sensing properties with volunteers. In comparison with the control experiment (by measuring before and after placing a drop of pure water onto the sensor), the difference between "before" and "after" exercise is much greater (FIG. 2D) than that in control experiment.

Interparticle spatial properties may also be used for ion detection. Using electrochemical quartz crystal nanobalance (EQCN), immobilizing redox ions into the nanostructure was shown to allow manipulation of interfacial mass fluxes. For example, Cu(II)-loaded MUA-Au 2-nm film was shown to be reversible to the flux of cations (Li+, K+, etc.), displaying a linear relationship between detected mass change and atomic weight.

Different types of printers (e.g., aerosol jet, inkjet, and dispenser) may be employed to achieve fabrication of paper-based sweat sensors. The different types of printers vary in terms of the control of particle-substrate interaction and the structural impact of the porous architecture with the cellulose fibers on sintering. In addition, different types of nanofibrous substrates may be used for the nanoink printing. For example, a cellulose nanofiber (CN) layer may be deposited on a polyacrylonitrile (PAN) nanofibrous layer electrospun on a nonwoven polethyleneterephthalate (PET) fibrous support is one example. These approaches differ from traditional approaches using commercial ionophores and also traditional potentiometric measurement (e.g., ion-selective membrane prepared using 2-Nitrophenyl octyl ether, PVC, 1 4-tert-Butylcalix arenetetraacetic acid tetraethyl ester (calixarene ionophore) and potassium tetrakis(4-chlorophenyl) borate).

Au NPs, CuNi NPs and NWs with controlled sizes, compositions, nanoink formulations are used for printing traces on paper substrates, which can then be sintered at room temperature. A number of different printers are available, e.g., Optomec Aerosol Jet 300; Optomec Aerosol Jet 5X; Dimatix Ink-Jet Materials Printer DMP-2850; and Nordson EFD Pro 4 L dispenser.

The surface structure of the paper substrate may be modified at the cellulose layer by functionalization through controllable binding chemistry to create structures to the —$CO_2H/CO_2^-$ groups, including covalent amide or electrostatic binding with hydrophobic/hydrophilic groups. Both aerosol jet and ultrasonic ink-jet printers may be used to print the nanoinks on the paper substrate, and on other substrates (PET, polyimide, flexible glass).

Paper sensor arrays of chemiresistors may be fabricated by printing pairs of serpentine lines of the nanostructured conductive ink particles on the porous paper substrate. Once Au, CuAu, or CuNi chemiresistors on paper are prepared, molecularly-mediated thin film assemblies of nanoparticles are coated onto the device, which may be used as sensors. Different methods may be used to introduce sensing materials, including physical absorption, chemical coupling, and molecularly-mediated assembly via aerosol or inkjet printing.

For example, moisture-dominated sweat sensing devices are fabricated. The nanoparticle-nanofibrous sensing architectures feature decorations of the porous structures with dendronized nanoparticles that are structurally tunable and exhibit both positive and negative-going responses to breathing and sweating processes. Dendron-coated Au NPs may be incorporated into the fibrous paper with the nanoink printed microelectrodes. The changes in interparticle distances and dielectric properties upon exposure to ionic species translate to changes in electrical conductivity with its sensitivity and selectivity depending on molecular interactions in sensing film. The sensor devices are usable in highly-moisturized environment including the presence of salts dissolved in water (K+, Na+, Cl-, etc.) relevant to sweat sensing application.

For example, for sweat testing, the fabricated paper device may be attached inside of regular bandage tape, with electrical leads to the electrical measurement device to monitor resistance or impedance changes. The sensor may be used with a microcontroller, which may include a microprocessor and Bluetooth radio chip for ECG and contact points for testing and programming. That is, the sensor may be integrated into a wearable or implantable sensing device. The sensor may be persistent, disposable, biodegradable, or bioabsorbable. For example, the amount of copper and silver present may be at a sufficiently low level to avoid systemic toxicity, and perhaps be advantageous due to antibacterial properties.

The dendritic NWs may be decorated with nanodots, and therefore are not traditionally branched structures. The NWs decorated with nanodots help NWs room temperature sintering, which result from inter-wire connection or bridging which is distinctly different those NWs with branches.

There are two major differences in methods used for decorating the NWs with dendrites and/or nanodots, which were synthesized by a wet chemical method. Compared with the traditional synthesis of NWs by wet chemical methods, the present method includes, for example, a reaction solution aging and annealing procedure.

The decoration process appears important, and has a promoting effect for room temperature self-sintering. It helps the connection between different NWs. Without such decoration, it needs the presence of light or laser to help for sintering[36], which could not achieve room temperature self-sintering, The NWs room temperature self-sintering proceeds dependent on (1) Structure: NWs decorated with dendrites/nanodots, within a range of NW diameters; (2) Nanoink composition: capping agent, pH, solvents, additives; (3) Properties of nanoink: viscosity, organic/aqueous ration, thickness, flowability.

The technology is not limited to CuAu alloys, and room temperature sintering also occurs with other copper-based alloys, which show similar conductivity, but different flexibility characteristics. Other examples involved CuZn, CuSn NWs.

The technology therefore provides a method of forming a conductive coating on a porous substrate, comprising: decorating nanowires with nanoparticles comprising an alloy of at least 5% copper, capped with a capping agent, by a reaction solution aging and annealing procedure; printing the decorated nanowires on the porous substrate; and allowing the decorated nanowires to sinter at a temperature below 150° C., to form the conductive coating.

The nanoparticles may have a diameter between 2 to 20 nm. The nanoparticles may comprise at least 50% copper and at least 1% gold, nickel, aluminum, zinc or tin.

The printing may comprise digitally defining a deposition pattern on the porous substrate; electronically selectively forming regions of the decorated nanowires on the porous substrate corresponding to the defined deposition pattern by printing; and desorbing the capping agent from the nanoparticles or nanowires. Other means of deposition are available, such as xerography, electrostatic spraying, abrasive transfer, transfer lithography, etc.

The nanoparticles, for example, comprise copper-gold alloy nanoparticles comprising at least 50% copper, having a bimodal distribution of diameter having a first peak between 1-2 nanometers and a second peak between 5-10 nanometers.

The decorated nanowires are typically allowed to sinter at a temperature below 150° C., 140° C., 130° C., 120° C., 110° C., of 100° C.

The porous substrate may be a cellulosic paper, or a CN/PAN/PET trilayer, for example.

The conductive coating preferably has a conductivity which reversibly varies by at least 2% in dependence on an external condition, such as a chemical analyte (alcohols, sweat, pH, cations, organic compounds, etc.) or a mechanical stress.

The decorated nanowires typically sinter by surface-mediated Ostwald ripening. Ostwald ripening or coarsening is a process where the total energy of a two-phase system is decreased with an increase in the size scale. Ostwald ripening consists of a diffusive transfer of a dispersed phase from smaller to larger droplets. Ostwald ripening is characterized by either a constant volume rate (diffusion-controlled ripening), or a constant surface rate (surface-controlled ripening) depending on the origin of the transfer mechanism.

It is also an object to provide a sinterable composition adapted to form a conductive layer of sintered overlapping nanowires at a sintering temperature below 150° C., the composition comprising: a plurality of nanowires decorated with nanoparticles comprising an alloy of at least 1% copper and at least 1% of gold, zinc, nickel, aluminum, or tin, having a diameter between 2 to 20 nm, the nanoparticles being capped with a capping agent; and a buffer solution in which the nanowires are suspended and free to move.

The nanowires may comprise at least 50% copper, e.g., 50%, 75%, 80%, 85%, 90%, 95%, 99%, 99.5%, 99.9% Cu. The nanowires may be e.g., 0-10% Ni, 1%, 2%, 3%, 4%, 5%, 6%, 7%, 8%, 9%, 10% Ni, with various allow metals, such as Cu, Ag, Au, Pt, etc. Higher amounts of Ni may also be used. The nanowires should be compatible with the decoration nanoparticles, during decoration, storage and deposition, and sintering. Given the low cost of copper, this is preferred for the bulk of the nanowires.

The nanoparticles may comprise a copper-gold alloy, e.g., 1-99% copper. Alternately or in addition to gold, the nanoparticles may also include zinc, nickel, aluminum, or tin, e.g., 1% or more. As noted above, the capped nanoparticles are stabilized in suspension, and decorate the nanowires. After removal or partial removal of the capping agent, or other disruption, the nanoparticles are subject to surface mediated sintering at room temperature, and for example process temperatures may be limited below 150° C. or lower.

The nanoparticle decoration of the nanowires may be dendritic.

The capping agent may comprise at least one of an amine, a thiolate and an acrylate.

A further object provides a conductive coating, comprising: nanowires in an overlapping array; a sintered coating bridging the overlapping array of nanowires, comprising at least 1% metallic copper and 1% of metallic gold, zinc, nickel, aluminum, or tin, forming a conductive path between overlapping nanowires; and a residual capping agent, wherein the capping agent is adapted to maintain nanowires decorated with nanoparticles comprising the at least 1% metallic copper and 1% of metallic gold, zinc, nickel, aluminum, or tin in a freely suspended state in a buffer before deposition on a substrate, and to permit sintering of the nanoparticles at a temperature of less than 150° C. after deposition on the substrate and formation of the overlapping array of nanoparticles. The sintered coating may result from surface-mediated Ostwald ripening.

The nanowires may comprise at least 50% copper and have a diameter between 2 to 20 nm, and the sintered coating may comprise at least 50% copper.

The sintered coating has a conductivity which reversibly varies by at least 2% in dependence on an external condition, e.g., 2%, 5%, 10%, 15%, 20%, 25%, 30%, 35%, 40%. The external condition may be a mechanical stress or deformation, an ion, an organic ligand, or the like.

The residual capping agent may comprise at least one of an amine, a thiolate and an acrylate.

The nanowires may comprise at least one of copper and a copper-nickel alloy, and the nanoparticles comprise a copper-gold alloy. The nanowires may be homogeneous, or inhomogeneous, e.g., having a layered structure, for example a copper or high copper core and a copper-nickel containing shell.

The overlapping array may be configured to form a conductive path on a fibrous substrate, wherein a resistance of the conductive path is reversibly responsive to at least one of a chemical and a mechanical condition.

It is therefore an object to provide a method of forming a conductive coating on a porous substrate, comprising: decorating nanowires with nanoparticles comprising an alloy of at least 1% copper, e.g., 50% copper, and at least 1% of gold, zinc, tin, nickel, or aluminum, having a diameter between 2 to 20 nm, capped with a capping agent, by a reaction solution aging and annealing procedure, printing the decorated nanowires into a porous substrate; and allowing the decorated nanowires to sinter at a temperature below 150° C.

It is also an object to provide a room-temperature sintered conductive coating, comprising a plurality of nanowires on a substrate, forming an overlapping network, and a sintered layer bridging the nanowires derived from a decoration of the nanowires with nanoparticles comprising an alloy of at least 1%, e.g., 50% copper and at least 1% of gold, zinc, nickel, aluminum, or tin, having a diameter between 2 to 20 nm, capped with a capping agent.

It is a further object to provide a non-thermally sintered coating composition, comprising: nanoparticles or nanowires comprising at least 1%, e.g., 50% metallic copper capped with a capping agent, adapted to coalesce under pressure to form a conductive path; and a buffer solution in which the nanoparticles or nanowires are suspended and free to move. The non-thermally sintered coating composition may be adapted to form the conductive path on a fibrous substrate after deposition of the buffer solution containing the nanoparticles or nanowires on the fibrous substrate and compression. The fibrous substrate may be paper, non-woven polyester fiber or a polymer foam. The fibrous substrate may be formed of a material selected from the group consisting of at least one of bacterial cellulose, graphene, carbon microfibers and carbon nanotubes The fibrous substrate may be biocompatible for implant in a mammal or human.

The conductive path may have a conductivity which varies by at least 2% in dependence on an external condition, e.g., a mechanical change or chemical exposure. The conductivity of the conductive path may be dependent on temperature, ionic concentration of a solute, a concentration of a ligand in a solution surrounding which wets the substrate, illumination, an electric potential, pH, carbon dioxide concentration, a carbon monoxide concentration, acoustic waves, pressure, flexion, stress, strain, or an enzymatic reaction of an enzyme.

The conductivity of the conductive path may be dependent on a glucose concentration of a solution in which the substrate is wet, a concentration of a volatile organic compound, a concentration of a sodium ions, presence of sweat adjacent to the substrate, a concentration of lactate, a concentration of uric acid, a concentration of acetone, or a biomarker in a breath sample from a human. The conductive path may be formed on the substrate into selectively conductive paths separated by selectively insulating gaps. The non-thermally sintered coating composition may be formed into a pattern having at least one hydrophobic region of the substrate and at least one hydrophilic region of the substrate. The substrate may be configured to define a fluid flow path from an intake. The conductive path on the substrate may be configured as a radio frequency antenna.

It is a further object to provide a sensor, comprising: a substrate of paper or having at least one of a glass transition temperature or decomposition temperature below 150° C.; a conductive path formed on the substrate by deposited and room temperature sintered capped copper-alloy nanoparticles or nanowires, the conductive pathway having a conductivity responsive to an analyte to which it is exposed; and a set of electrodes, configures to supply an electric potential to the conductive pathway. The copper-alloy nanoparticles or nanowires may comprise a copper nickel alloy, a copper-tin alloy, a copper-aluminum alloy, or a copper gold alloy. The copper copper-alloy nanoparticles or nanowires may comprise nanowires with $Cu_4Ni$ alloying shells, having a diameter of ~35 nm and an aspect ratio >1000.

By room temperature, it is understood that the sintering process will occur at a temperature dependent rate at temperatures between ~0° C. and ~30° C., with increasing rate with increasing temperature. A maximum temperature is typically imposed by a limit of the substrate and not the nanowires, nanoparticles, or capping agent, though at very high temperatures the capping agent may decompose, or the nanowires lose their structural integrity before the coating is formed. Typically, neither of these occurs at temperatures below 150° C. At low temperatures, e.g., below 20° C., the sintering rate may be very low, such that macroscopic observation may indicate stability. Therefore, addition of heat during the sintering is preferred to increase rate, to the extent that a heat sensitive substrate remains intact. The heat-sensitive substrate may, for example, be subject to melting, deformation, decomposition, or other effects, at elevated temperatures.

The sensor may be formed by a process comprising: digitally defining a deposition pattern on the substrate; electronically selectively forming regions of the nanoparticles or nanowires on the substrate corresponding to the defined deposition pattern by inkjet printing, the nanoparticles or nanowires being capped with a capping agent; desorbing the capping agent from the nanoparticles or nanowires; and sintering the nanoparticles or nanowires to form the conductive path at a process temperature below 150° C. The nanoparticles or nanowires may comprise particles formed by microemulsion of nanoparticle precursors, and flame-driven aerosol synthesis. The nanoparticles or nanowires may have a melting point below 150° C., e.g., a melting point between 100° C. and 130° C. Typically, it is desired that the nanowires maintain structural integrity during the sintering, and so have a melting temperature above the maximum process temperature. On the other hand, the nanoparticles may sinter without melting, for example by surface mediated Ostwalt ripening. Therefore, while the melting temperature may be within the process temperatures, it is not critical that the nanoparticles melt during the process, and in the preferred embodiment sinter by a different process.

It is a further object to provide a three-layered porous paper substrate, comprising: a cellulose nanofiber (CN) top layer (e.g., fiber diameter 5 nm, and thickness <2 µm), an electrospun polyacrylonitrile (PAN) nanofibrous mid-layer (e.g., fiber diameter 150 nm, thickness ~40 µm), and a nonwoven polethyleneterephthalate (PET) fibrous support (e.g., fiber diameter 20 µm, thickness ~100 µm). The paper substrate may further comprise a conductive path formed by deposited nanowires, the nanowires comprising hexane-dispersible $Cu_{90}Ni_{10}$ nanowires synthesized in an oleylamine solution of $CuCl_2$ and $Ni(acac)_2$ printed on the substrate.

It is another object to provide an aqueous dispersible nanoparticle, comprising, $Cu_nAu_{100-n}$, wherein n>75%), having a diameter of 3-10 nm, formed in a solution from AuCl— and $Cu^{2+}$ salt using acrylates or thiols as reducing and capping agents.

It is another object to provide an aqueous suspension of dispersible nanoparticles, comprising copper-gold alloy nanoparticles comprising at least 1% copper, e.g., 50%, having a bimodal distribution of diameter having a first peak between 1-2 nanometers and a second peak between 5-10 nanometers. The nanoparticles may be configured to spontaneously react with an organic fiber comprising heteroatoms, to self-sinter at room temperature.

BRIEF DESCRIPTION OF THE DRAWINGS

FIG. 3A illustrates the atomic "flowing skirt"-like and 1D atomic bridging structures of AuCu NPs on the substrate by SMAB. FIG. 3B shows an HRTEM image showing the 1D atomic bridging between NPs at room temperature. FIGS. 3C-3D show HRTEM images revealing $AuCu_3$ surrounding AuCu NP in the skirt and $Cu_2O$ further down to the edge of the skirt. FIG. 3E shows EDS mapping of the NPs and surroundings. FIG. 3F shows line profiles showing the composition distribution of Au and Cu along the cross line in FIG. 3E with spots x, y and z being indicated, and FIG. 3G illustrates the atomic distributions of AuCu, $AuCu_3$, and $Cu_2O$, in the "flowing skirt"-like structure.

FIGS. 4A-4H show 1D and 2D Atomic bridging of NPs on amorphous carbon film at room temperature. FIG. 4A shows HRTEM of 1D atomic bridging between partially sintered NPs. FIGS. 4B-4D show HR-TEM of 2D atomic bridging between partially sintered NPs. FIG. 4E shows HAADF-STEM image of the partially sintered NPs with connection by the flowing skirts. FIGS. 4F-4G show EDS mapping of AuCu NPs, and line profiles of Au and Cu along the white cross line. FIG. 4H shows alloy distribution and FIG. 4I illustrates the topology of the "flowing skirt" feature on carbon film.

FIG. 5A Illustrates the atomic "flowing skirt"-like and 2D atomic bridging structures of AuCu NPs on the substrate by SMAB. FIG. 5B-5C show HRTEM images showing the 2D atomic bridging between NPs at room temperature; only lattice fringes corresponding to AuCu$_3$ were detected in the skirt surrounding the NPs. FIG. 5D shows EDS mapping of the NPs and surroundings.

FIG. 5E shows line profiles showing the composition distribution of Au and Cu along the cross line of FIG. 5D with spots x and y being indicated, and FIG. 5F illustrates the atomic distributions of AuCu and AuCu$_3$, in the "flowing skirt"-like structure.

FIG. 6A shows a TEM of a drop of NPs on NC substrate. FIGS. 6B-6C show an HRTEM of NPs showing "skirt" as an 2D atomic bridging between NPs. FIGS. 6D-6E show a HAADF-STEM and a EDS mapping image of a drop of NPs on NC substrate with connection by the flowing skirts. FIG. 6F shows an alloy distribution and FIG. 6G illustrates the "flowing skirt" feature on NC substrate. FIGS. 6H-6I show SEM images of the NC substrate, formed by casting NC film on PAN/PET: top view (FIG. 6H) and cross-section view (FIG. 6I).

FIGS. 8A, 8B TEM images of AuCu NPs. FIG. 8C, size distribution (1.4±0.5 nm and 7.0±1.2 nm in diameter).

FIGS. 9A-9F show AuCu NPs on the porous and fibrous substrates with different porosities. FIG. 9A shows the sintering thin film along the surface of substrate. FIG. 9B shows surface and cross-section of NC fibrous substrate for sintering along the surface. FIG. 9C shows the drill-less interconnection with cross sintering process. FIG. 9D shows surface and cross-section of fibrous substrate for drill less interconnection. FIG. 9E shows an AFM image of thin film on the surface of NC. FIG. 9F shows a graph of retention particle size (nm) vs. impedance along the surface and through the substrate.

FIGS. 11A-1D show in-situ monitoring of resistance changes during sintering process of NPs on NC substrate at room temperature. FIG. 11A shows in-situ monitoring of the resistance changes in the sintering process of AuCu (a, pH=5), along with video snapshots (inserts) during the sintering process.

FIG. 15A shows the conventional pathway of interparticle neck connection. FIG. 15B shows an illustration of the model corresponding to resistance change vs. sintering time. FIG. 15C shows the pathway of metallic thin film formation by vacuum evaporation.

FIG. 16A shows size evolutions based on GT-MBA model simulation of surface-mediated Ostwald ripening for disappearance of small-sized NPs at RT ("S") on the cellulose surface with bulk $E_{tot}$ of Au (310.2 kJ/mol) and Cu (290.7 kJ/mol). FIG. 16B shows size evolutions based G-T MBA model simulation of surface-mediated Ostwald ripening for growth of large-sized NPs at RT ("L") with bulk $E_{tot}$ of Au (310.2 kJ/mol) and Cu (290.7 kJ/mol).

FIG. 17A shows total energies for clusters with n atoms and clusters with n−1 plus the detached atom 1. FIG. 17B shows the energy difference between n and (n−1)+1. FIG. 17C shows adsorption energies for clusters with n atoms and clusters with n−1 plus the detached atom 1. FIG. 17D show the adsorption energy difference between n and (n−1)+1.

FIG. 30A shows the response sensitivity of the chemiresistor for alcohols as a function of chain lengths (for n-alcohols using empty bars and iso-alcohols using filled bars). FIG. 30B shows responses of the chemiresistor for CO and $CO_2$ of different concentrations, exhibiting very different sensitivities ($6.4 \times 10^{-5}$ ppm $(V)^{-1}$ for CO and $3.5 \times 10^{-7}$ ppm $(V^{-1}$ for $CO_2$).

DETAILED DESCRIPTION OF THE PREFERRED EMBODIMENTS

Example 1

Figure 1A:
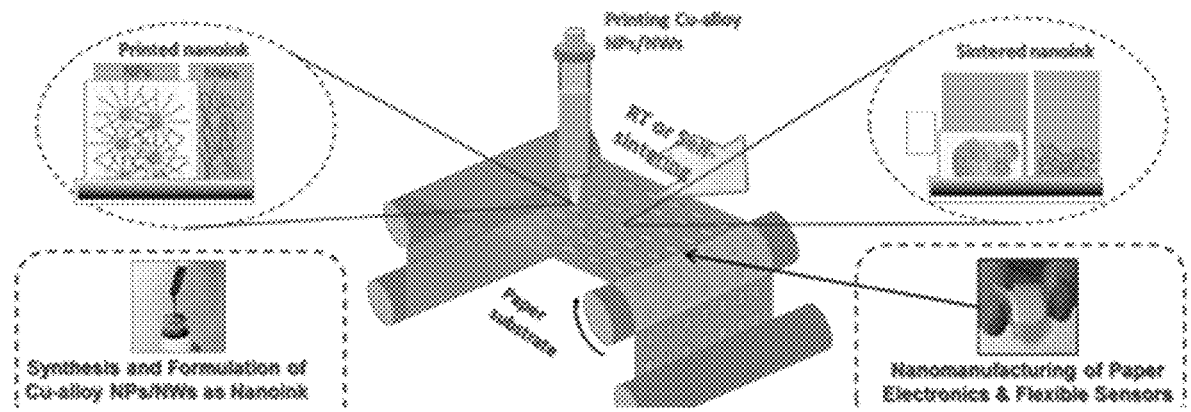
FIG. 1A illustrates Roll-to-roll printing of NPs or NWs towards manufacturing flexible electronics.
Figure 1B:
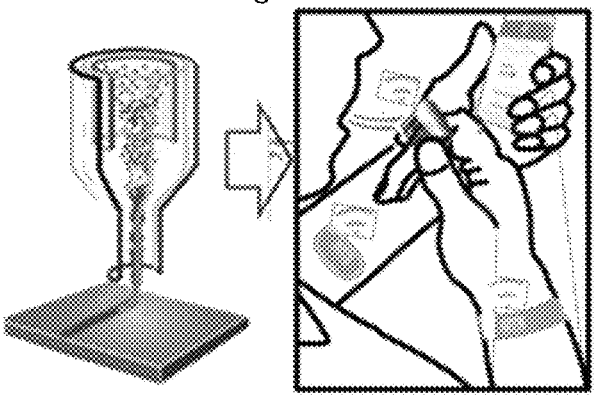
FIG. 1B illustrates printing (e.g., aerosol jet) NPs and NWs on paper for fabricating wearable sweat sensors.
Figure 2A:
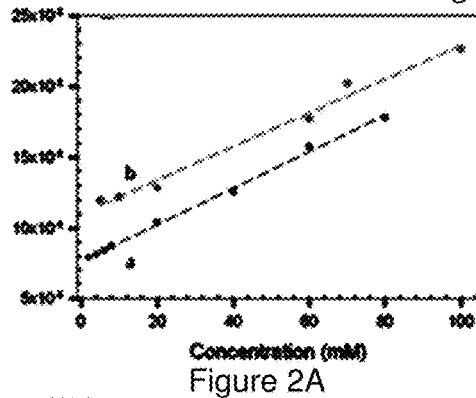
FIGS. 2A-2C show plots of 1/|Z| vs. conc. of K+ (a) Na+ (b) for MUA-AuNPs with graphite on PET side (FIG. 2A) and the CN side (FIG. 2B), and for PDA-AuNPs with graphite on the PET side (FIG. 2C).
Figure 2B:
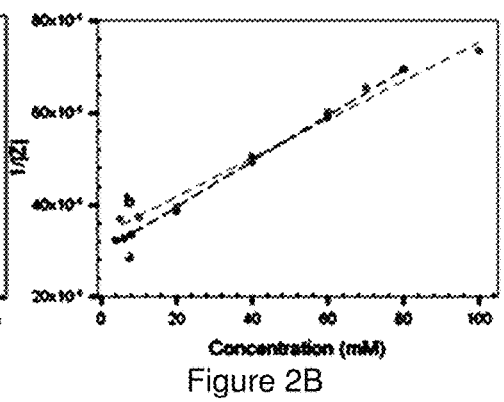
Figure 2C:
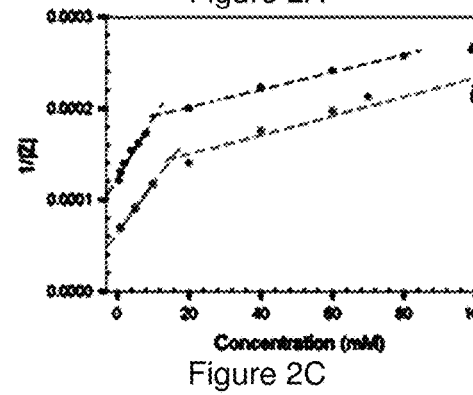
Figure 2D:
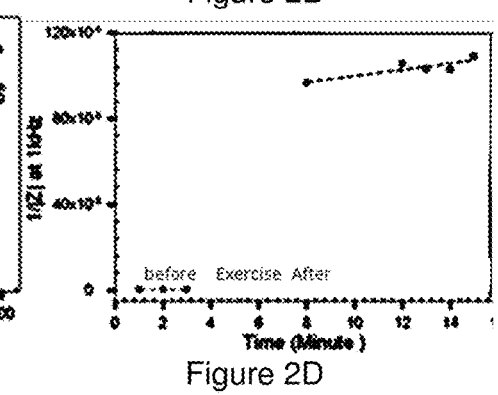
FIG. 2D shows proof-of-concept demo of A as a sweat sensor, collecting data before and after exercise.

From manufacturing perspective, it is desirable to provide a process for fabricating paper-based flexible electronics using a fully printable technology. A key challenge for printable electronics is the formulation of effective conductive inks in meeting the desired manufacturing and performance specifications. Except for graphene and carbon nanotube inks, silver nanoparticle inks have dominated the printed electronics largely due to facile synthesis of the nanoparticles. In fact, most of the silver nanoparticles commercially available for conductive inks are sphere or sphere-like shapes, with which percolation is often ineffective during a thermal sintering process.

Copper-based nanowire (NW) inks are provided herein that are self-sinterable at room temperature (RT) on both rigid and flexible substrates. The sintering on flexible substrates is useful for printed and flexible electronics, enabling digital printing with conformal and faster processing under low temperatures.

In comparison with the NPs, the NWs feature greatly enhanced percolation conductivity and also lower consumption of materials. Indeed, metal nanowire networks deposited on elastomers have demonstrated excellent conductivity, flexibility, and stretchability.

There are two major problems for state-of-the-art silver NP based inks, the propensity of surface oxidation and the mobility of silver ions under humid environment, both of which degrade the printed electronics. Copper NP based inks address the migration problem with an attractive low-cost feature but suffers from the propensity of oxidation under room temperature conditions which reduces the electrical conductivity. Traditional high-temperature (>150° C.) thermal sintering for silver or copper NP inks has the propensity of forming non-conductive oxides, and damaging polymer substrates. Although inert (e.g., $N_2$) or reductive (e.g., $H_2$) atmosphere could prevent oxidation from occurring, the cost and other constraints associated with it poses a major problem for manufacturing. Further, oxidation also occurs after manufacturing.

Alloying Cu with another metal offers the potential of increasing stability and processability, and other advantages. Based on the increased stability of Cu upon alloying it with Au, Cu alloying with selected stability-enhancing transition metals (e.g., Ni, Sn, etc.) offers new opportunities. For example, CuNi alloy increases oxidation resistance in comparison with pure copper, as evidenced by the high stability of coinage U.S. nickel (3:1 Cu:Ni alloy).

CuNi NPs were previously synthesized by microemulsion and flame-driven aerosol methods. In comparison with NPs, nanowires (NWs) have the potential to allow printed conductive patterns to withstand repeated bending and strain with minimal degradation of the electrical properties. In addition to increasing the mechanical strength and wear resistance, Cu-alloy's the electrical conductivity is tunable by composition. In comparison with Cu, Cu-alloys may be grouped into those that can maintain a higher percentage of copper conductivity (~80% M=Ag, Zn, Au, etc.), those with a medium percentage (~40% M=Ni, Al, Sn, etc.), and those with a lower percentage.

NWs may be synthesized with the higher- and medium-percentage groups with more than sufficient conductivity for the targeted plastics or paper sensor application. Cu and Ag NW films double in sheet resistance after months at RT, but the sheet resistance of Cu@Cu—Ni NWs (length >20 μm, diameter <60 nm) is estimated to double in about 400 years, suggesting a greatly increased resistance to oxidation.

The elastomer composite of Cu NWs with $Cu_4Ni$ alloying shells (diameter ~35 nm and aspect ratio >1,000) favors high conductivity due to the long and smooth transport channels for electrons. The coating serves as an effective way to improve oxidation-resistant stability, as demonstrated by the high stability and stretchability of the conductive NW composite. Since the reported NWs were subjected to ~200° C. treatment before use, the ability to overcome core-shell inter-diffusion, especially under elevated temperatures, remains a very challenging issue for practical applications. In view of the similar fcc lattice parameters (Ni: 0.3499 nm; Cu: 0.3597 nm), Cu and Ni exhibit solid solubility across the entire composition range.

The alloying degree of Cu and Ni may be controlled in the formation of fully-alloyed or partially-alloyed NWs with a low percentage of Ni. While alloying may reduce the electrical conductivity of copper depending on the composition, it does not significantly affect the sensor performance. It is the control over room temperature sintering in relation to alloying degree and composition that may be important for exploiting Cu alloy-enhanced properties, including corrosion resistance and mechanical strength for the wearable sensor applications.

One embodiment focuses on controlling the alloying degree of Cu and Ni in the formation of fully-alloyed or partially-alloyed NWs with a low percentage of Ni. While alloying may reduce the electrical conductivity of copper depending on the composition, it does not significantly affect the sensor performance. Control over room temperature sintering in relation to alloying degree and composition exploits Cu alloy-enhanced properties, including corrosion resistance and mechanical strength for the wearable sensor applications.

The synthesis and preparation of dendrite-decorated NPs and NWs has been demonstrated with increased stability and processability by alloying copper with different low-cost metals (e.g., CuNi, CuSn, CuAl, etc.) or metals with reduced cost in the case of noble metal being part of the alloy (e.g., CuAu) as printable nanoinks and their sintering at RT to conductive traces/patterns on different substrates, including flexible polymer, plastic, and paper substrates.

Different capping agents or additives have been used to address the propensity of surface oxidation and ion mobility, including organic polymers, amines, acids, and thiols. Oxidation of copper is one of the major obstacles for Cu-nanoink printable electronics manufactured by thermal sintering. RT- or self-sintering was enabled by chemical triggering or substrate-nanoink interactions.

CuAu alloy with a low level of Au offers an increased stability against oxidation or migration for fabricating high-stability and high-precision electronic devices and also presents an ideal model system for fundamental studies of sintering. Small sized CuAu NPs (1-4 nm) have been synthesized with high stability, and there is convincing evidence of the increased stability of Cu by alloying, and alloying several other stability-enhancing transition metals (M=Ni, Au, Sn, Al, etc.). CuNi alloy has a high oxidation resistance in comparison with pure copper, e.g., CuNi NPs (7~30 nm) of varying compositions synthesized by microemulsion and flame-driven aerosol synthesis. The high stability and printability of Cu-alloy NPs and NWs based nanoinks on many different substrates to form conductive traces or patterns is an aspect of the present technology. Even from cost consideration, the cost can be reduced significantly when the percentage of Au or Ag in the Cu-alloy is controlled at a very low level.

Another example involves alloying Cu with Sn as low-melting point component (100-130° C. for 3~6 nm Sn). Binary/ternary combinations of Sn with Cu have been applied in the electronic packaging industry due to its good physical and mechanical properties.

In addition to the increased stability and processability of NPs and NWs by alloying (e.g., CuNi, CuSn, CuAl, etc.) or reduced cost in the case of noble metal being part of the alloy (e.g., CuAu), the ability of sintering at RT is useful to produce conductive traces/patterns on a thermally-sensitive flexible substrate. The coupling of alloy NP/NW structure and paper substrate structure enables RT sintering. Fully "digital" maskless and room temperature fast printing on a flexible substrate for flexible electronics depends on scalable metal nanoinks and an effective sintering process. While different capping agents or additives have been used to address the propensity of surface oxidation and ion mobility, including organic polymers, amines, acids, and thiols, oxidation is still a major obstacle for printable electronics manufactured by thermal sintering. RT- or self-sintering is thus increasingly useful.

For a paper substrate, the structural impact of amorphous or porous architecture on sintering, which is linked to the interconnected cellulose network with increased contact area and binding sites of the desired functionality. Paper substrates are thin, lightweight and flexible depending on its pulp processing. The cellulose fibers allow liquid to penetrate within its hydrophilic fiber matrix via capillary effect, surface functionalization to manipulate hydrophilicity and permeability, and accommodation of a large concentration of chemical species in the porous fiber structure.

Examples include commercially-available papers including Whatman® filter paper which is a standard grade filter paper with medium retention and flow rate, ion-exchange cellulose papers which are chemically modified cellulose fibers, glossy paper which involves of cellulose fiber blended with an inorganic filler. The hydrophilicity and porosity of the cellulose network could allow maneuvering of molecular species involved in the sintering process. Acrylate-modified paper has strong capability to adsorb conductive ink and to facilitate diffusion, and the roughness of paper surface has an impact on the conductivity of the sintered traces.

A three-layered porous paper substrate was studied which consists of a cellulose nanofiber (CN) top layer (fiber diameter 5 nm, and thickness <2 µm), an electrospun polyacrylonitrile (PAN) nanofibrous mid-layer (fiber diameter 150 nm, thickness ~40 µm) and a nonwoven polethyleneterephthalate (PET) fibrous support (fiber diameter 20 µm, thickness ~100 µm). The unique porous structure of the CN/PAN/PET paper and the viability of the surface modification at the carboxylate groups converted from the hydroxyl groups at the $C_6$ position of cellulose chains provides a platform for testing. Different paper substrates were utilized for testing the printing and sintering.

Fu, Qingjin, Chen Cui, Lei Meng, Sanwei Hao, Rengang Dai, and Jun Yang. "Emerging cellulose-derived materials: a promising platform for the design of flexible wearable sensors toward health and environment monitoring." Materials Chemistry Frontiers 5, no. 5 (2021): 2051-2091.

Kang, Ning, Fang Lin, Wei Zhao, Jack P. Lombardi, Mihdhar Almihdhar, Kai Liu, Shan Yan et al. "Nanoparticle-nanofibrous membranes as scaffolds for flexible sweat sensors." ACS Sensors 1, no. 8 (2016): 1060-1069.

Kang, Ning. "Design, Synthesis, and Characterization of Nanostructured Materials for Energy Storage Devices and Flexible Chemical Sensors." PhD diss., State University of New York at Binghamton, 2017.

Wang, Xiao. "Thin-film Nanofibrous Composite Membranes by Interfacial Polymerization for Water Purification." PhD diss., The Graduate School, Stony Brook University: Stony Brook, NY., 2015.

Yan, Shan, Xin Liu, Zakiya Skeete, Ning He, Zhi-Hui Xie, Wei Zhao, Jack P. Lombardi III et al. "Decoration of Nanofibrous Paper Chemiresistors with Dendronized Nanoparticles toward Structurally Tunable Negative-Going Response Characteristics to Human Breathing and Sweating." Advanced Materials Interfaces 4, no. 22 (2017): 1700380.

Crafting structures with surface atoms in defined states can be used to create microscopic or macroscopic functionalities on a substrate material. This is known for the formation of one or two-dimensional (1D/2D) structures via physical or chemical atomic layer deposition (ALD) on crystalline, atomic-flat or condensed (CAC) materials (e.g., silicon), "graphene"-like 2D materials via complex fabrication routes, or free-standing ultrathin or atomic-thick metal layers by template method. However, it is generally unknown whether atomic-scale 1D/2D structures can be formed on amorphous, fibrous, or porous (AFP) substrates, which are usually low-cost materials (e.g., paper) for rapidly-emerging applications in wearable electronics.

A simple route to achieve 1D/2D atomic-scale bridging of metal nanoparticles on AFP substrates is provided. By placing a drop of bimetallic gold-copper nanoparticles on an AFP substrate, the nanoparticles, in combination with the interaction with the substrate, enable a surface-mediated 1D/2D atomic bridging under ambient conditions. In addition to the formation of atomic 1D/2D bridging/layering structures on the surface, an electrical oscillatory behavior is observed before reaching an eventual metallic conductivity with a substrate porosity-dependent anisotropy. The findings parallel the quantum size phenomena for atomic layers on CAC substrates, shining new insight into how atomic detachment, diffusion and re-attachment are operational for forming the atomic-scale structures on the AFP surfaces at room temperature. This finding serves as new starting point for advancing manufacturing of functional components on earth-abundant and low-cost materials such as papers for flexible displays, solar cells, quantum computers, energy harvesting, internet of things, smart sensors and supported catalysts. It also allows miniaturizing devices via placement of nanoclusters with atomic precision or real-time tracking of nanoparticle growth and transformation.

Figure 3A:
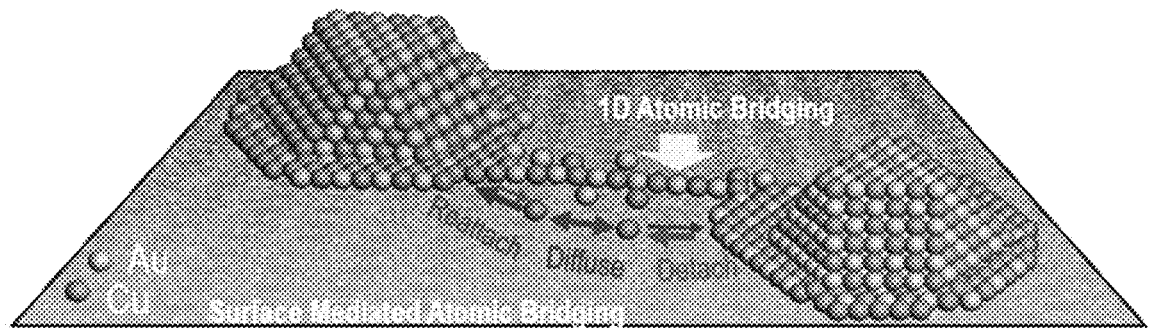
FIGS. 3A-3G show the 1D/2D atomic bridging of AuCu NPs on a carbon film substrate.
Figure 3B:
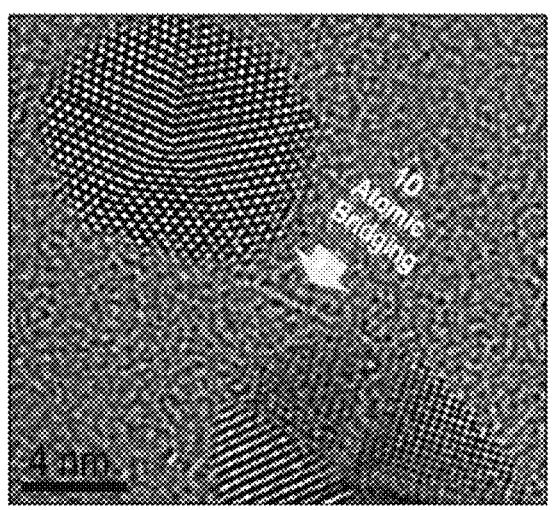
Figure 3C:
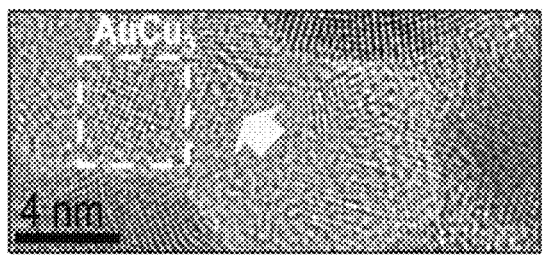
Figure 3D:
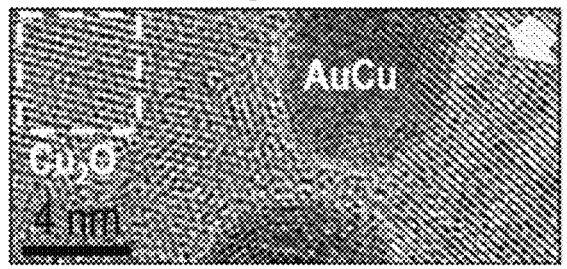
Figure 3E:
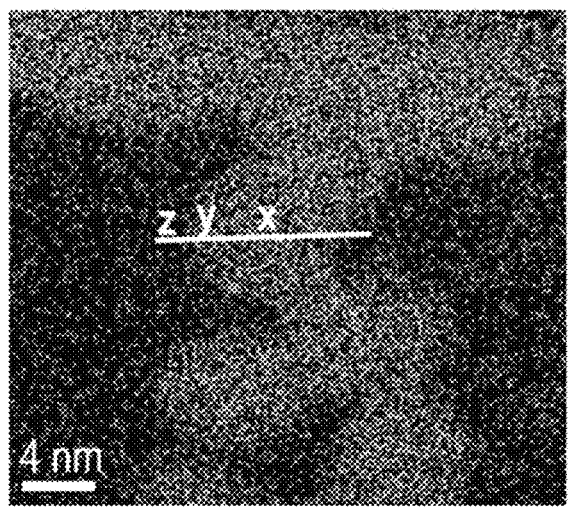
Figure 3F:
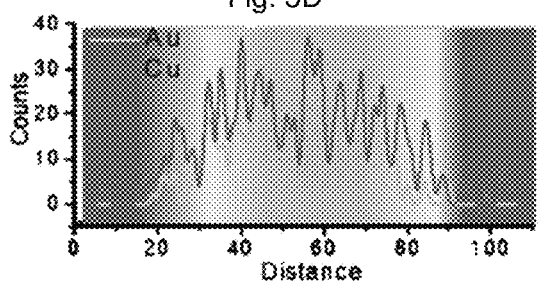
Figure 3G:
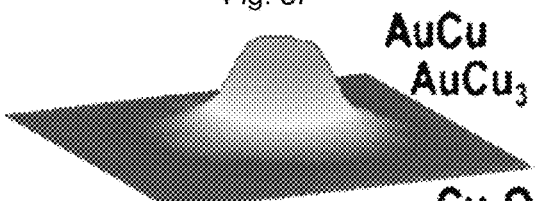

FIGS. 3A-3G show the 1D/2D atomic bridging of AuCu NPs on a carbon film substrate. FIG. 3A illustrates the atomic "flowing skirt"-like and 1D atomic bridging structures of AuCu NPs on the substrate by SMAB. FIG. 3B shows an HRTEM image showing the 1D atomic bridging between NPs at room temperature. FIGS. 3C-3D show HRTEM images revealing $AuCu_3$ surrounding AuCu NP in the skirt and $Cu_2O$ further down to the edge of the skirt. FIG. 3E shows EDS mapping of the NPs and surroundings. FIG. 3F shows line profiles showing the composition distribution of Au and Cu along the cross line in FIG. 3E with spots x, y and z being indicated, and FIG. 3G shows an illustration of the atomic distributions of AuCu, $AuCu_3$, and $Cu_2O$, in the "flowing skirt"-like structure.

A simple combination of bimetallic gold-copper nanoparticles with a few nanometers in size (AuCu NPs) and amorphous carbon or cellulose papers with a fibrous structure is used to create of atomic structures on the surface. In contrast to atomic layers (e.g., ALD) on CAC materials, the ability to produce atomic-scale 1D/2D structures on AFP surfaces is difficult because of the lack of atomic ordering on the substrate. The formation of atomic layers on an AFP substrate is possible if the mobility of the metal atoms is energetically favorable, similar to ALD on CAC substrates. The particle-substrate interaction is exploited to facilitate a surface-mediated atomic bridging (SMAB) process in a 1D/2D fashion. As illustrated for 1D atomic bridging in FIG. 3A, the choice of AuCu NPs highlights that Au atoms exhibit larger atomic binding strength than Cu atoms in atomic chain formation, and alloying Cu in Au NPs maneuvers the atomic bridging process. This may be expanded to many different types of bimetallic nanoparticles as long as the atomic detachment, diffusion, reattachment between the nanoparticles on the surface can be harnessed effectively, which is entirely different from the traditional perception of interparticle necking.

The high-resolution transmission electron microscopy (HRTEM) observation of 1D atomic bridging between two NPs on carbon film under ambient condition (FIG. 3B) evidences the viability of SMAB. This was followed by observing 2D atomic bridging of the NPs surrounded with atomic layers of $AuCu_3$ and $Cu_2O$ (FIG. 3C-3D), resembling a "flowing skirt" with the skirt spreading out on the floor. While the bimetallic composition in the NP remains unchanged, the composition along the skirt features a higher percentage of Cu than that of Au, characteristic of $AuCu_3$. An atomic layer is also observed further down to edge of the skirt with a lattice spacing of 0.30 Å, characteristic of $Cu_2O$. This was substantiated by EDS mapping and line profiling (FIG. 3E-3F), showing Au rich in the NP (spot x), Cu rich along the skirt (spot y), and Cu only down to the skit edge (spot z), which is consistent with HRTEM data. The skit-edge layer shows a clear propensity of air oxidation of Cu atoms on the carbon surface.

Figure 4G:
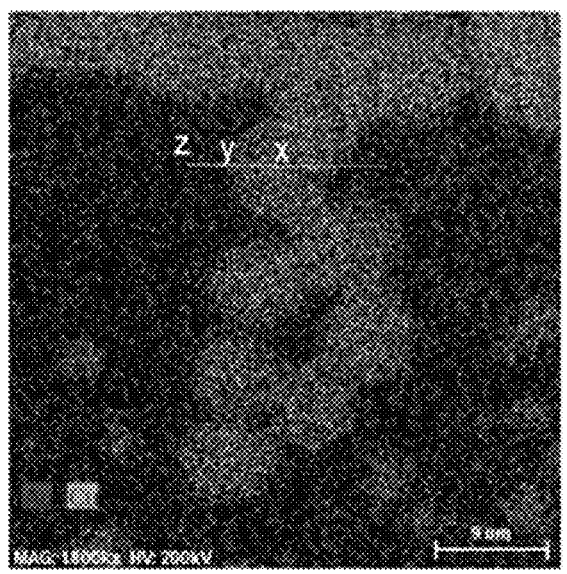
Figure 4H:
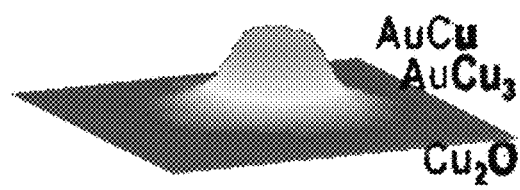
Figure 4I:
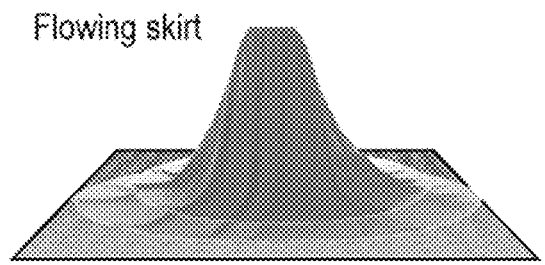

FIGS. 4A-4H show 1D and 2D Atomic bridging of NPs on amorphous carbon film at room temperature. FIG. 4A shows HRTEM of 1D atomic bridging between partially sintered NPs. FIGS. 4B-4D show HR-TEM of 2D atomic bridging between partially sintered NPs. FIG. 4E shows HAADF-STEM image of the partially sintered NPs with connection by the flowing skirts. FIGS. 4F-4G show EDS mapping of AuCu NPs, and line profiles of Au and Cu along the white cross line. FIG. 4H shows alloy distribution and FIG. 4I illustrates the topology of the "flowing skirt" feature on carbon film.

Figure 5A:
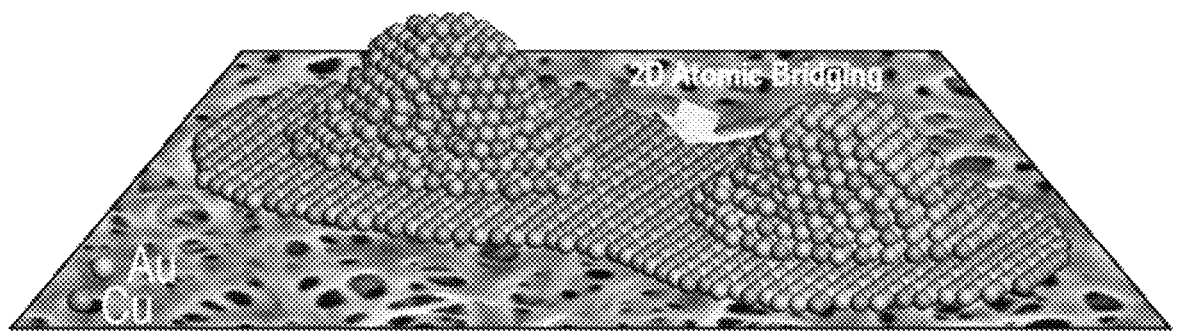
FIGS. 5A-5F show 2D atomic bridging of NPs on a paper substrate.
Figure 5B:
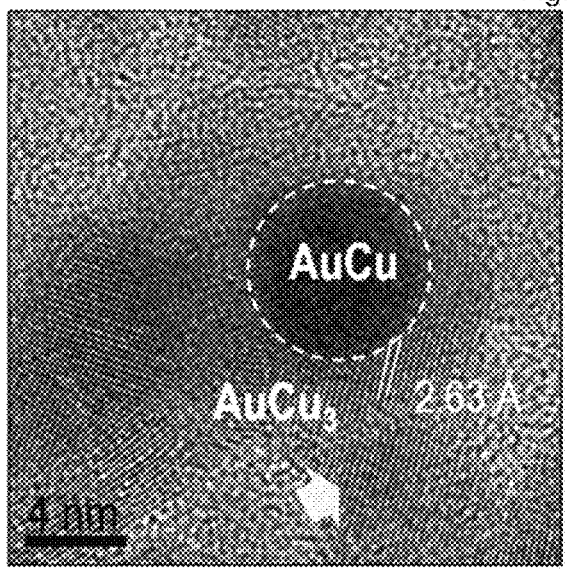
Figure 5C:
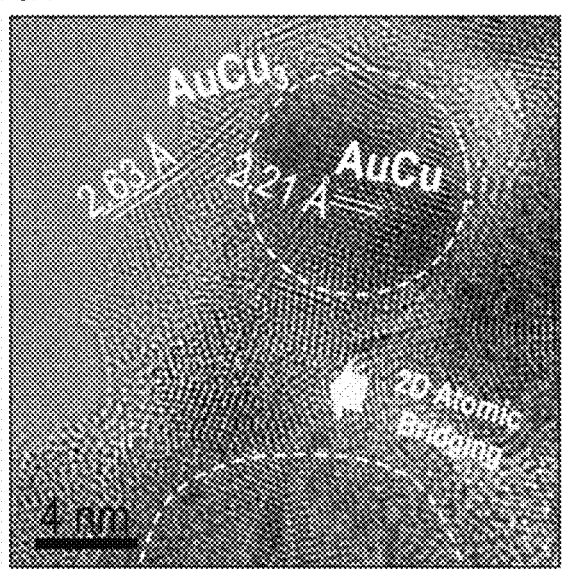
Figure 5D:
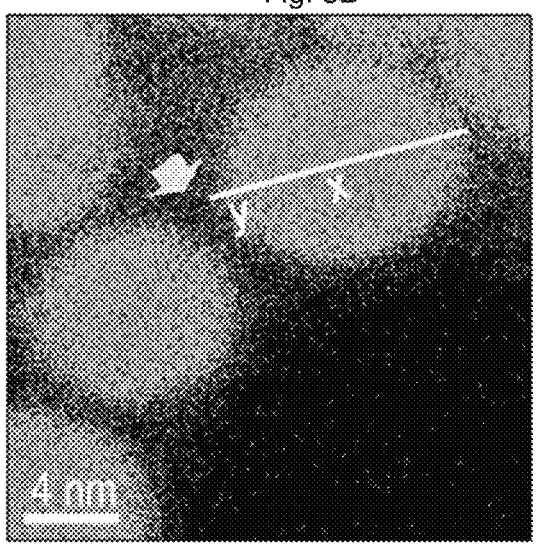
Figure 5E:
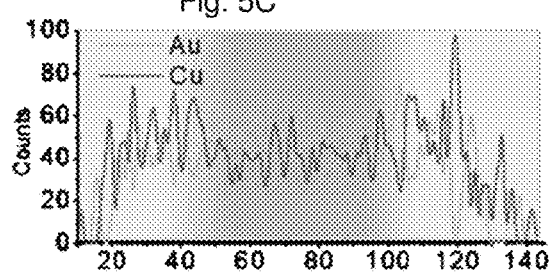
Figure 5F:
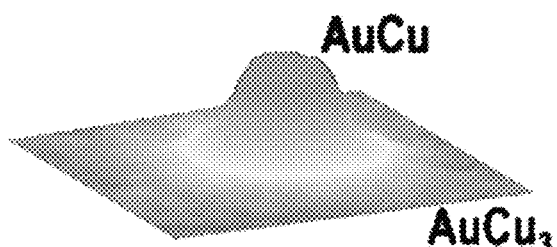

FIGS. 5A-5F show the 2D atomic bridging of NPs on a paper substrate. FIG. 5A illustrates the atomic "flowing skirt"-like and 2D atomic bridging structures of AuCu NPs on the substrate by SMAB. FIGS. 5B-5C show HRTEM images showing the 2D atomic bridging between NPs at room temperature; only lattice fringes corresponding to $AuCu_3$ were detected in the skirt surrounding the NPs. FIG. 5D shows EDS mapping of the NPs and surroundings. FIG. 5E shows line profiles showing the composition distribution of Au and Cu along the cross line with spots x and y in FIG. 5D being indicated, and FIG. 5F shows the atomic distributions of AuCu and $AuCu_3$, in the "flowing skirt"-like structure.

The surroundings of AuCu NPs on a paper-based AFP substrate (FIG. 5A) were investigated. Such a substrate could be commercially-available Whatman, Millipore, Fisherbrand papers or a multi-layered nanofibrous cellulose (NC) paper, which differ from the previous carbon film in the fibrous and porous characteristics along with rich functional groups from cellulose (e.g., —OH) allowing an anti-oxidation capability. The —OH groups on NC surface appear to prevent the oxidation of the Cu atoms. This is substantiated by HRTEM analysis of AuCu NPs on NC substrate prepared by placing a drop of the NPs solution under ambient condition (FIGS. 5B-5C). The NPs are clearly surrounded by an atomically-ordered layer of $AuCu_3$. The "flowing skirt"-like feature in the 2D atomic bridging is evident by the ordered atoms between and around the NPs. The lattice spacing of 2.21 Å in NPs matches with the (111) spacing of AuCu, while the lattice spacing of 2.63 Å for the "flowing skirt" atomic bridging corresponds to $AuCu_3$. This finding is confirmed by dark-field imaging, EDS mapping and line profile analysis (FIGS. 5D-5F), indicating Au rich in the NP (spot x) and Cu rich along the skirt with a composition gradient (spot y). The absence of $Cu_2O$ confirms the ability of —OH groups of cellulose in preventing Cu atoms from oxidation in air, which is in sharp contrast to the NPs on carbon film. Both Cu and Au atoms detach from bimetallic NPs to the substrate surface where Cu atoms diffuse faster than Au, creating a Cu-rich "flowing skirt" bridging pathway to facilitate the effective sintering.

Metallic conductivity can be achieved by taking advantage of the solvent-filled porous structure of the paper with liquid penetration and molecular or ionic diffusion to facilitate the SMAB process towards NPs sintering. This type of sintering process differs from conventional sintering of metal NPs (e.g., Ag) which is often kinetically sluggish under low temperature and does not produce ultrathin conductive layers, and also from traditional photolithographic patterning which bears high cost and limited materials options. Moreover, this new route is anticipated to lead to a metallic conductivity on the surface or through the thickness of the paper depending on its porosity.

Figure 6A:
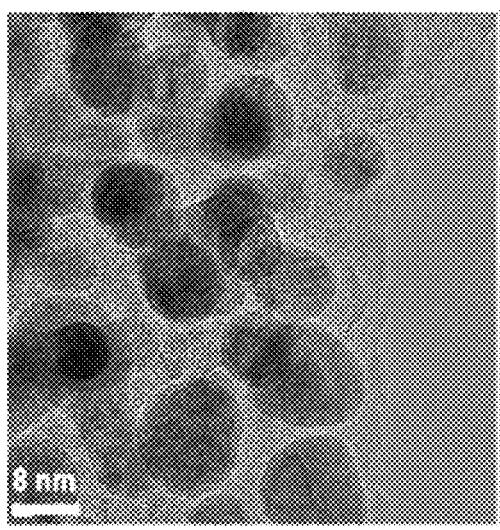
FIGS. 6A-6I show 2D atomic bridging of AuCu NPs sintered on NC substrate at room temperature.
Figure 6B:
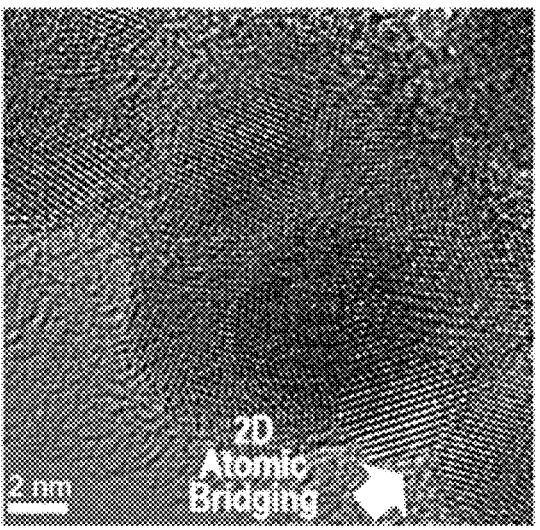
Figure 6C:
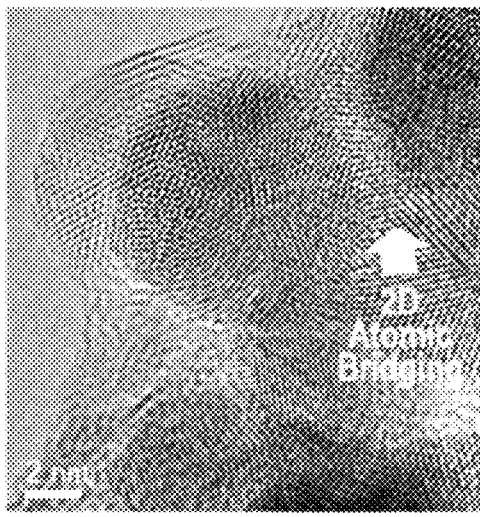
Figure 6D:
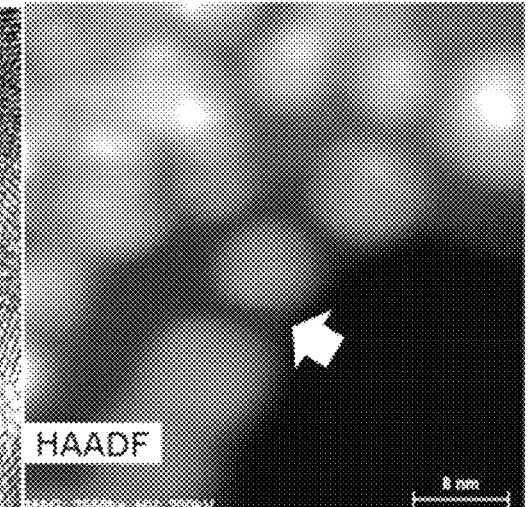
Figure 6E:
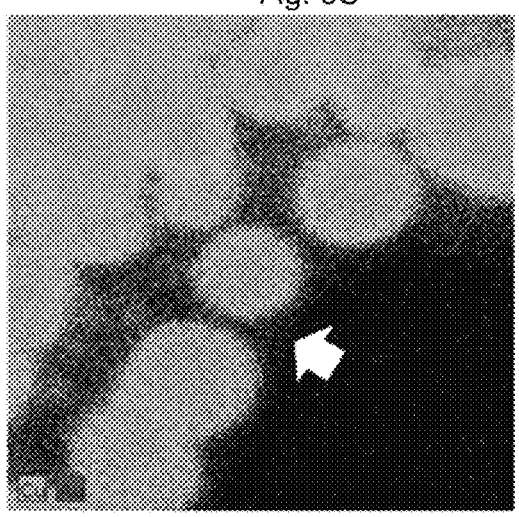
Figure 6F:
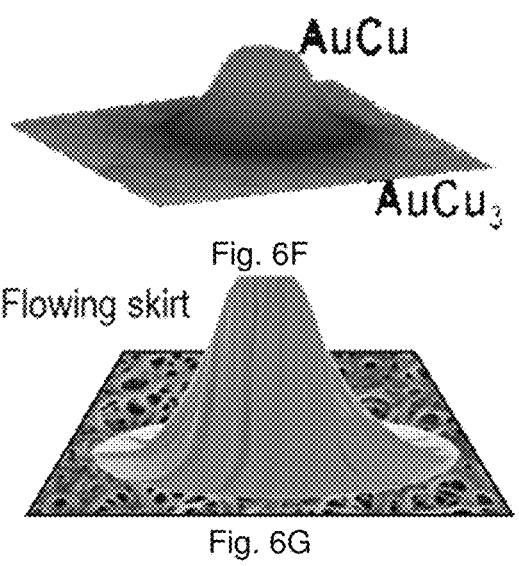
Figure 6G:
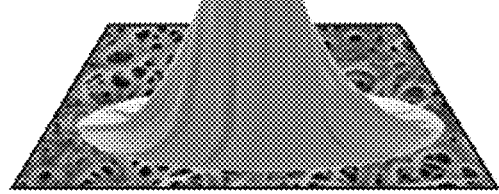
Figure 6H:
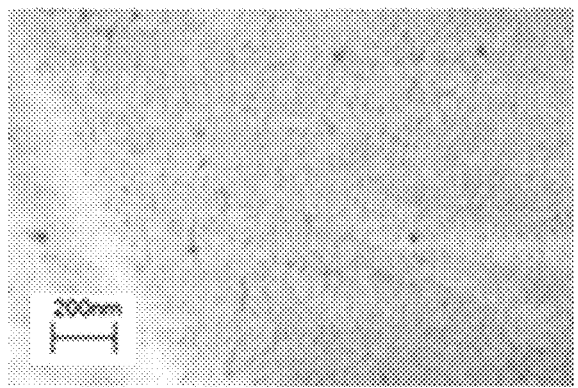
Figure 6I:
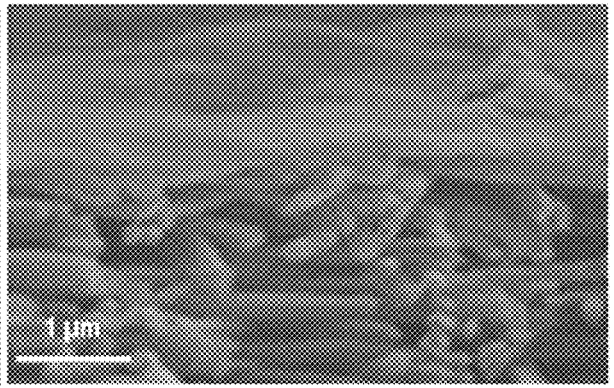

FIGS. 6A-6I show 2D atomic bridging of AuCu NPs sintered on NC substrate at room temperature. FIG. 6A shows a TEM of a drop of NPs on NC substrate. FIGS. 6B-6D show HRTEM of NPs showing "skirt" as an 2D atomic bridging between NPs. FIGS. 6D-6E show HAADF-STEM and EDS mapping image of a drop of NPs on NC substrate with connection by the flowing skirts. FIG. 6F shows an alloy distribution and FIG. 6G illustrates the "flowing skirt" feature on NC substrate. FIGS. 6H-6I show SEM images of the NC substrate, formed by casting NC film on PAN/PET: top view (FIG. 6G) and cross-section view (FIG. 6H).

Figure 7:
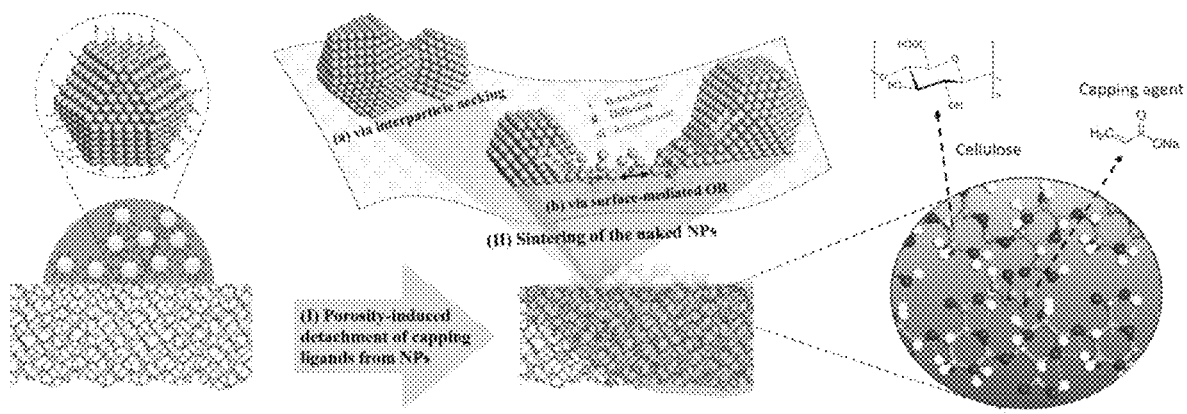
FIG. 7 shows an illustration of the sintering pathways via traditional interparticle necking and surface-mediated sintering processes on the paper substrate.

FIG. 7 illustrates the sintering pathways via traditional interparticle necking and surface-mediated sintering processes on the paper substrate. For stable nanoparticles on which the organic stabilizing or capping molecules are desorbed from the surface to initiate the sintering process.

Room-temperature self-sintering involves a surface-induced initiation of the sintering process where the interacting capping molecules (adsorbed or desorbed) on the nanomaterial surfaces, act as a quasi-liquid in which NPs move or intercalate towards contact or coalescing, and the solvent-filled porous structure of the paper substrate acts as a buffer in which the solvent and the desorbed molecules can move away from the sintering areas. The coupling of the self-sinterable copper-alloy nanoinks with a multi-layered, porous and nanofibrous paper substrate with controllable surface modification can provide a low-cost and scalable manufacturing process.

In contrast to traditional sintering pathway, i.e., interparticle neck formation, the strong particle-substrate interaction controls the mobility or diffusion of the atoms on the substrate, leading to surface-mediated sintering. The sintering kinetics of most metal nanoparticles are rather sluggish under low temperature and often need additives that destabilize the capping molecules. Note that acrylate-modified paper adsorbs conductive ink to facilitate diffusion.

The use of paper as a substrate for wearable electronics that can be conformably incorporated on human body has rapidly emerged as human-friendly paper electronics with mechanical deformability and bio-benignancy and ecological friendliness, capturing global interests in both research labs and electronics markets. With cellulose fibers, made of naturally renewable or naturally abundant ingredients, bacterial cellulose, graphene, carbon microfibers and carbon nanotubes, attributes such as omnipresence, low cost, and simple fabrication of paper as a substrate material constitute a major attraction for paper electronics or sensors. Wearable sensors enable continuous monitoring of physical signals and symptoms directly from human body, fitness tracking, and prediction of chronic disease in personalized healthcare. Many paper-based sensors are largely microfluidic devices, which is a platform for lab-on-a-chip (LOC) devices for low-cost, portable and disposable use in health diagnostics, environmental monitoring and food quality control.

Such devices potentially allow incorporation of electronic power sources to achieve a complete integration and connection to smartphones for real-time POC diagnostics to generate medical database, which has contributed to the growth of the overall diagnostics market. While there is a growing demand of wearable electronic products for personal healthcare, entertainment, industrial and military purposes, a major limitation for paper electronics to step into the market lies in the fact that the current approaches for manufacturing paper electronics either require high-cost and bulky equipment or suffer from the inability to scale up for mass production. Fully integrated paper-based microfluidic devices in terms of sensing, signaling and power supply that are vital for electronics are yet to be released, which require the integration of assays with micro and nano-technologies, and electrochemical/optical detection electronics. The research and development in addressing this challenging task represent a convergence of various knowledge areas, highlighting the parallelism of the technological transfer from academia to industry, and the vision of the internet of things (IOT).

Conductive inks play a critical role in printed and flexible electronics, enabling digital printing with conformal and faster processing. There is however a fundamental gap between establishing conductive nanoink RT sintering and achieving the desired performances at the scalable nanomanufacturing level. Pulsed lasers can be used to sinter nanoinks at RT ambient conditions, but these limit choice of substrates because of their low glass transition or decomposition temperature.

Figure 8A:
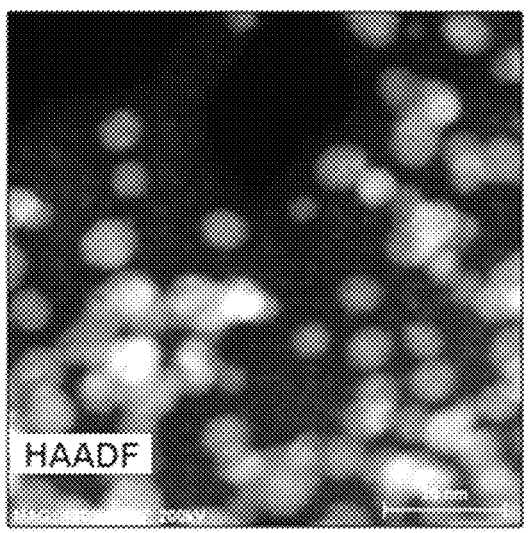
FIGS. 8A-8C show TEM images of AuCu NPs and size distributions.
Figure 8B:
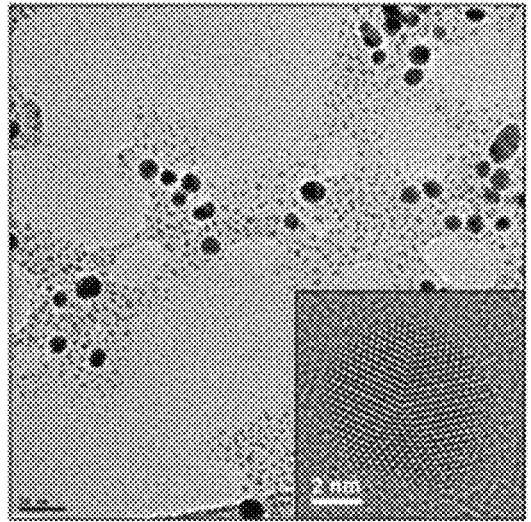
Figure 8C:
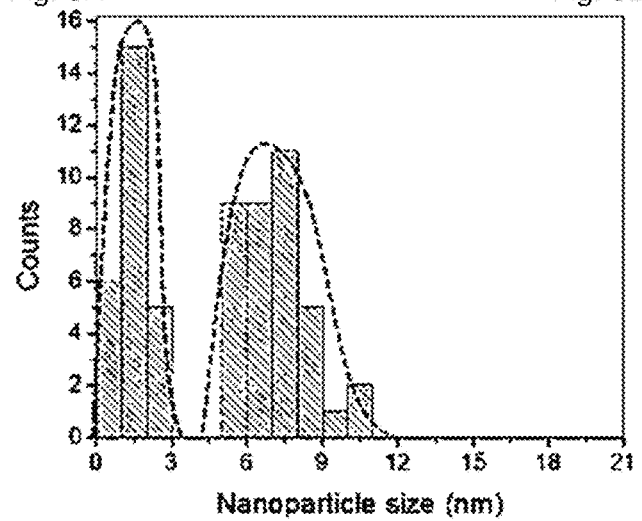

With a low porosity, the sintering process would be favored by atomic bridging on the cellulose surface due to little penetration of NPs through the paper. By increasing the porosity to a critical point where NP penetration occurs, sintering through the paper would happen, leading to porosity-dependent anisotropy of electrical conductivity on or through the paper. Indeed, with a very low-porosity NC substrate (particle retention <55 nm), a high electrical connectivity was achieved on the surface ($\sigma_{on}$, or $\sigma_\parallel$) upon casting a drop of AuCu nanoparticles (0.7 and 3.5 nm in radius, FIGS. 8A-8C), showing an electrical conductivity of $3.2\times10^7$ S/m (100 nm of thickness) which is 53% of bulk Cu conductivity. In contrast, with a high-porosity paper (e.g., Whatman filtration paper of Grade 41 with a particle retention of 20 µm), an electrical connectivity through the paper ($\sigma_{through}$, or $\sigma_\perp$) was achieved, with $\sigma_\perp$ being smaller than $\sigma_\parallel$ by a factor of 5~10 depending on its porosity. This is promising for constructing multilayer paper electronics with partial or full electrical anisotropy as confirmed by testing papers with different porosity. FIGS. 8A and 8B show TEM images of AuCu NPs. FIG. 8C shows size distribution of the NPs (1.4±0.5 nm and 7.0±1.2 nm in diameter).

Figure 9A:
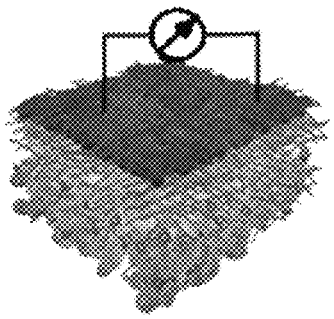
Figure 9B:
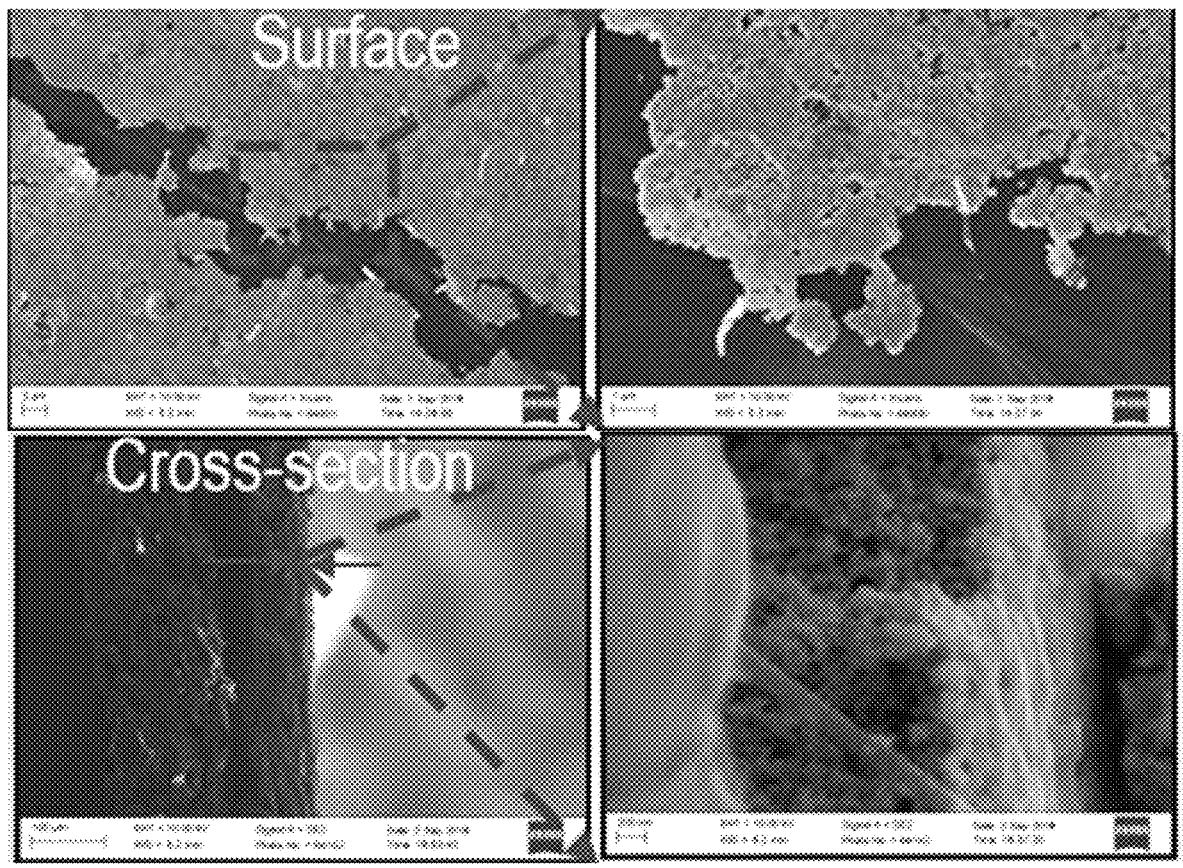
Figure 9C:
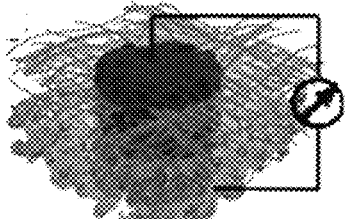

FIGS. 9A-9F show AuCu NPs on the porous and fibrous substrates with different porosities. FIG. 9A shows sintering thin film along the surface of substrate. FIG. 9B shows surface and cross-section of NC fibrous substrate for sintering along the surface. FIG. 9C shows drill-less interconnection with a cross sintering process. FIG. 9D shows surface and Cross-section of fibrous substrate for drill less interconnection. FIG. 9E shows AFM image of thin film on the surface of NC. The measured surface roughness of the sintered metals ($R_a$=24 and $R_q$=32 nm) was found to be comparable to that of the CN substrate ($R_a$=42, $R_q$=56 nm). FIG. 9F shows anisotropic electrical properties as a function of the retention particle size. The retention particle size of NC membrane paper <0.055 µm, Whatman membrane filters (cellulose acetate) is 0.2 µm, Millipore black grid paper is 0.8 µm, Millipore paper (sswp 02500) is 3 µm, Whatman filter paper Grade 1 is 11 µm, and Whatman filter paper Grade 41 is 20 µm.

Figure 10A:
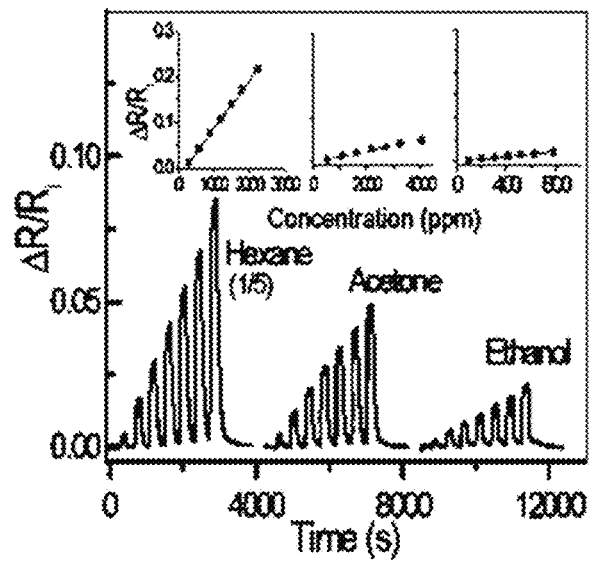
FIGS. 10A-10C show chemiresistive responses profiles and sensitivities for hexane, acetone and ethanol (FIG. 10A), alcohols with different chain lengths and isomer structures (FIG. 10B), and CO and CO$_2$ (FIG. 10C). (vapor/gas concentrations in ppm (M)).
Figure 10B:
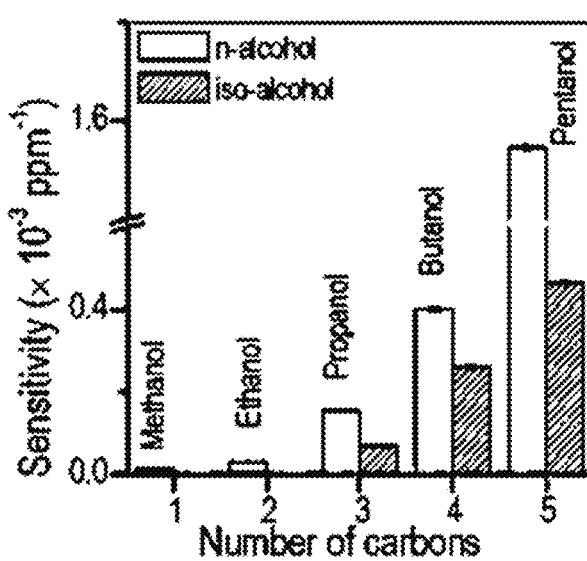
Figure 10C:
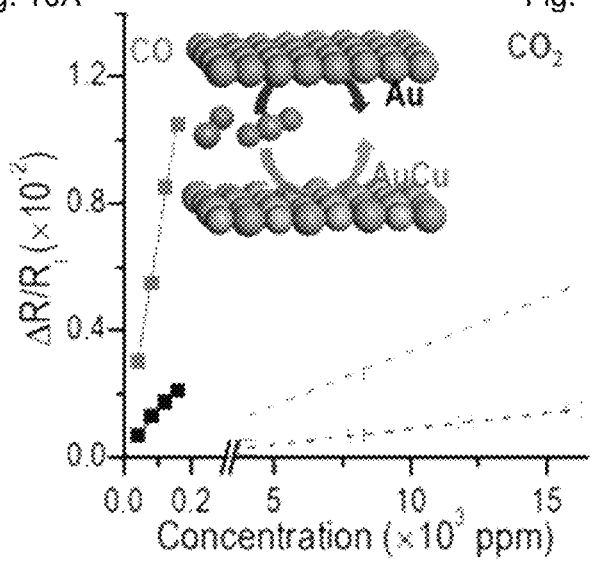

FIGS. 10A-10C show chemiresistive responses profiles and sensitivities for hexane, acetone and ethanol (FIG. 10A), alcohols with different chain lengths and isomer structures (FIG. 10B), and CO and $CO_2$ (FIG. 10C). (vapor/gas concentrations in ppm (M)). The paper sensor with the ligand/linker nanostructure as sensing interface (MUA/Au NPs) exhibits responses to volatile organic compounds such as hexane, acetone and ethanol (FIG. 10A) with 2-10 times higher sensitivity than those reported for flexible and non-porous substrates 30, substantiating the important role of the porous substrate. For alcohol vapors (FIG. 10B), the response sensitivity depends on the number of carbons and differentiates the isomers. The paper sensors with different surface sites of Au and AuCu NPs (MUA/Au or/AuCu NPs) showed highly site-specific response sensitivity to CO and $CO_2$ (FIG. 10C), as expected for surface adsorption of CO and $CO_2$.

An apparent conformal layering of the metal thin film on the paper substrate is evidenced by AFM image (FIGS. 9A-9F). This conductive characteristic may also be exploited for constructing paper sensor devices, which were demonstrated by chemical sensing in terms of sensitivity and selectivity to various gas/vapor molecules (FIGS. 10A-10C). Moreover, a continuous and mechanically-stable free-standing metal film may be obtained by piranha removal of the paper substrate.

The film showed apparent layer-by-layer structures and multiple sintering interfaces and crystalline facets (111, 100, etc.). The morphology of the film also reveals the effect of the substrate's surface texture on the sintered film, as evidenced by the wrinkle-like atomic textures in the film's layer structure and the atomic alignment textures along the rim of the layer.

Figure 11A:
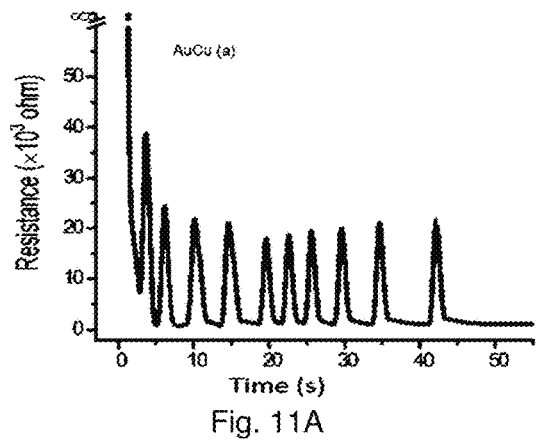
Figure 11B:
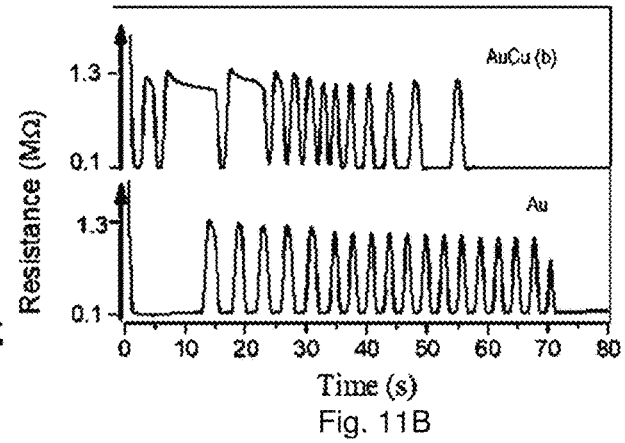
FIG. 11B shows in-situ monitoring of the resistance changes in the sintering process of AuCu (b, pH=7) and Au (pH=7) NPs on NC the substrate.
Figure 11C:
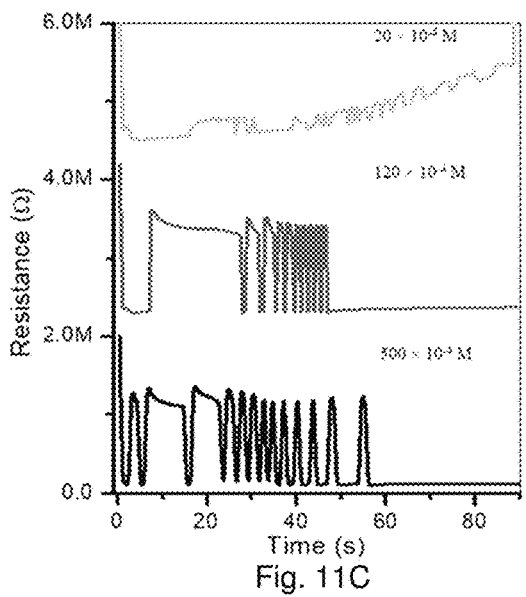
FIG. 11C shows in-situ monitoring of resistance changes during sintering process of AuCu NPs with three different concentrations on NC substrate at room temperature.
Figure 11D:
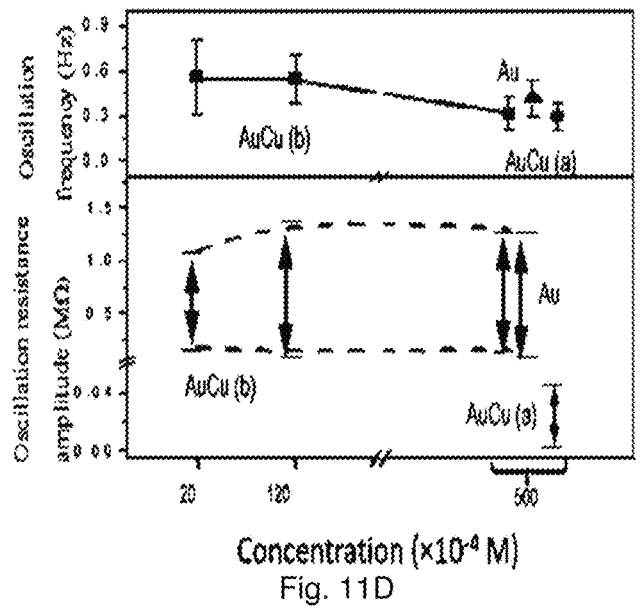
FIG. 11D shows plots of oscillation frequency and amplitude.

FIGS. 11A-11D show in-situ monitoring of resistance changes during sintering process of NPs on NC substrate at room temperature. FIG. 11A shows in-situ monitoring of the resistance changes in the sintering process of AuCu (a, pH=5), along with video snapshots (inserts) during the sintering process. FIG. 11B shows in-situ monitoring of the resistance changes in the sintering process of AuCu (b, pH=7) and Au (pH=7) NPs on NC the substrate. FIG. 11C shows in-situ monitoring of resistance changes during sintering process of AuCu NPs with three different concentrations on NC substrate at room temperature. FIG. 11D shows plots of oscillation frequency and amplitude. The period was in the range of 40-60 s depending on the type of NPs (AuCu or Au) and pH. The magnitude for AuCu NPs at pH=5 falls between 500Ω and 50 kΩ with an average frequency of 0.29 Hz. At pH=7 and lower concentrations, there was a higher frequency and a smaller magnitude ranging from 100 kΩ to 1.4 MΩ, reminiscent of an earlier observation of resistance oscillation between 7 to 39 MΩ for chemical vapor deposition of Au thin film on Si (100). For Au NPs, a similar amplitude was observed with an average frequency of 0.31 Hz.

The possible quantum oscillation as expected from ALD on CAC substrates was further investigated to substantiate SMAB. This was done by in-situ monitoring of the electrical properties upon casting a drop of AuCu NPs on the paper substrate at room temperature. The macroscopic evolution was captured by video. The change of the electrical resistance was monitored using two pre-sintered electrodes of the same NPs on the paper with a gap of ~2 mm, and an oscillation of resistance was discovered at the early stage of sintering (FIGS. 11A-11D). The oscillation period is in the range of 40-60 seconds and the magnitude falls between 500Ω and 50 kΩ with an average frequency of 0.29 Hz in the first 50 seconds. Similar oscillation characteristics with subtle differences have also been observed using different pHs, NP compositions or concentrations (FIGS. 11A-11D).

Figure 12:
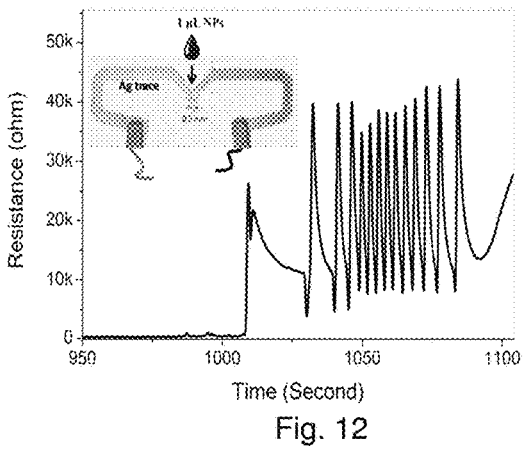
FIG. 12 shows In-situ monitoring of resistance changes in sintering process. A tiny drop of AuCu NPs was placed on a gap of 0.5 mm defined by two silver traces printed on paper, and the resistance was monitored as a function of time.

This type of resistance oscillation was also substantiated by similar measurement using an electrical gap of 0.5 mm defined by two silver traces printed on paper (FIG. 12), demonstrating the character intrinsic of the sintering process. FIG. 12 shows in-situ monitoring of resistance changes in sintering process. A tiny drop of AuCu NPs was placed on a gap of 0.5 mm defined by two silver traces printed on paper, and the resistance was monitored as a function of time. The driving force stems likely from a combination of the exothermic-endothermic processes in the atomic detachments and re-attachments. This was supported by differential scanning Calorimeter (DSC) analysis of the sintering, revealing an apparent thermal oscillation.

Figure 13:
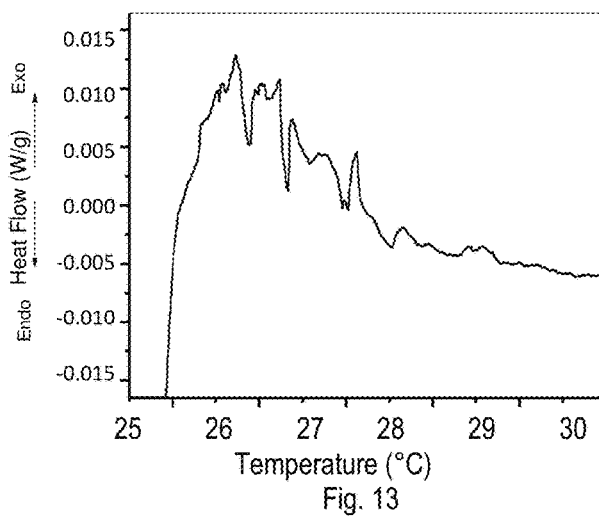
FIG. 13 shows Differential Scanning Calorimeter (DSC) analysis of NPs sintering process on NC substrate. A drop of AuCu NPs was placed on the paper substrate in a DSC sample holder, and then the DSC curve was measured by ramping the temperature from 25 to 30° C. at a rate of 0.2° C./min.

FIG. 13 shows Differential Scanning Calorimeter (DSC) analysis of NPs sintering process on NC substrate. A drop of AuCu NPs was placed on the paper substrate in a DSC sample holder. the DSC curve was measured by ramping the temperature from 25 to 30° C. at a rate of 0.2° C./min.

Figure 14A:
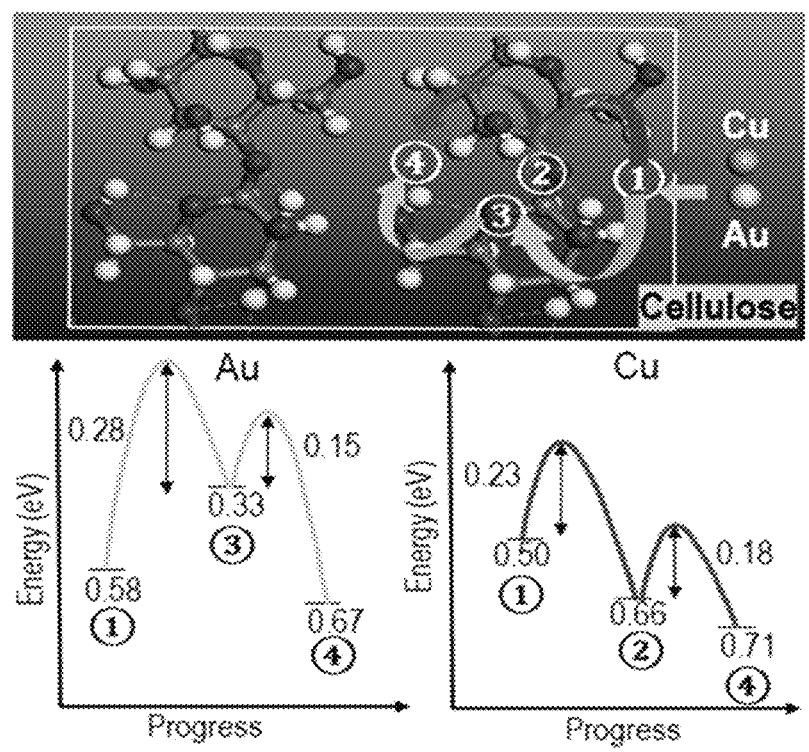
FIG. 14A shows surface sites and surface activation energies ($E_{ads}$ and $E_{diff}$) of Au and Cu atoms.
Figure 14B:
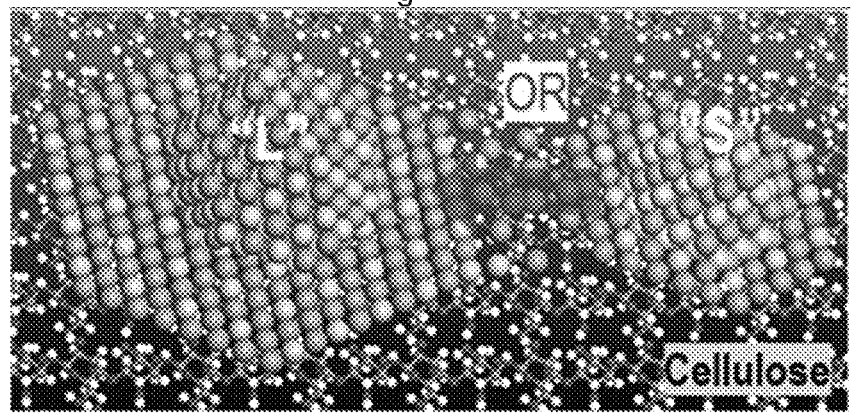
FIG. 14B shows size evolution in surface-mediated OR for growth of large NPs ("L") and disappearance of small NPs ("S") on NC surface.
Figure 14B:
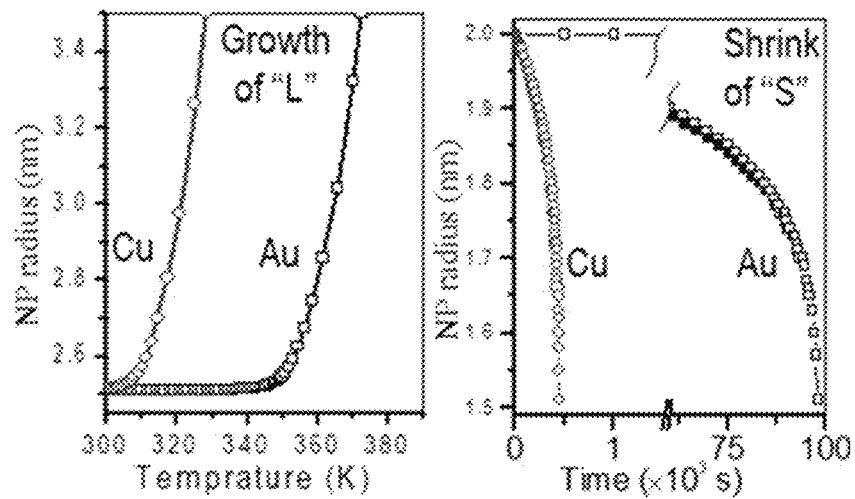

FIGS. 14A-14B show surface-mediated atomic bringing mechanisms. FIG. 14A shows surface sites and surface activation energies ($E_{ads}$ and $E_{diff}$) of Au and Cu atoms. FIG. 14B shows size evolution in surface-mediated OR for growth of large NPs ("L") and disappearance of small NPs ("S") on NC surface.

Figure 15A:
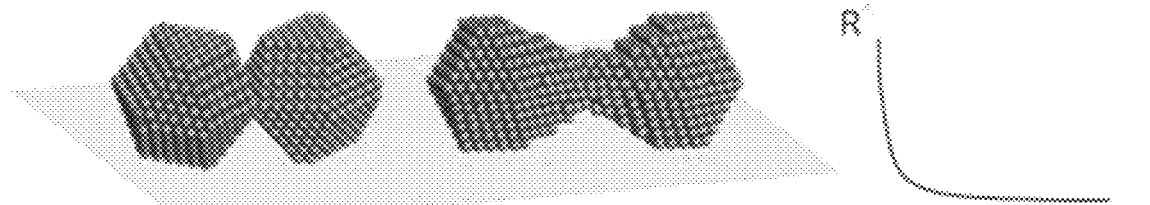
FIGS. 15A-15C show illustrations of two mechanistic pathways for metallic thin film formation.
Figure 15B:
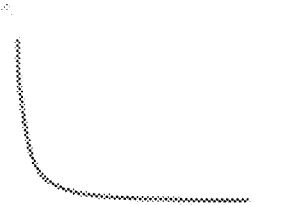
Figure 15C:
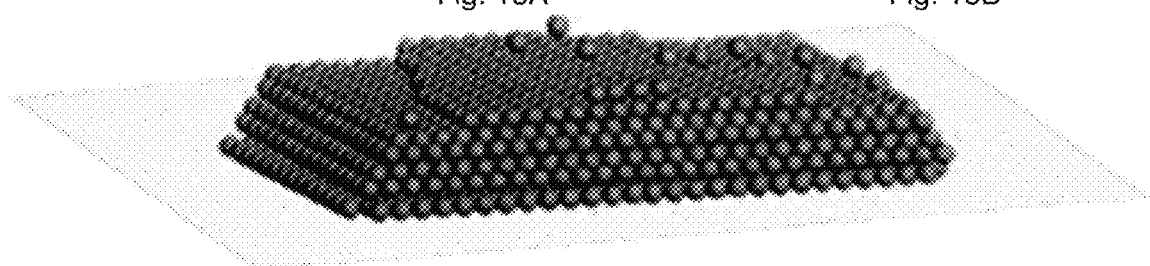
Figure 15D:
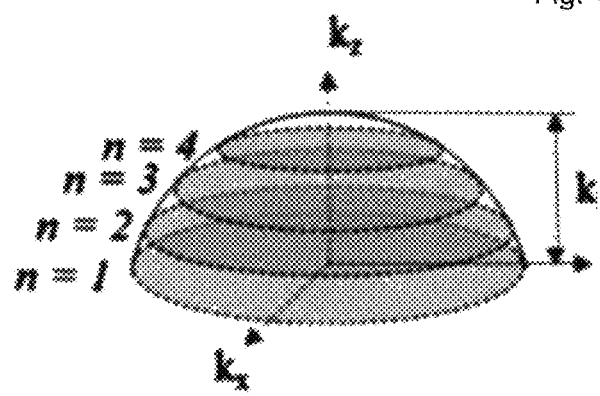
FIG. 15D shows an illustration of the model for the layer-by-layer formation quantum size phenomenon of the electrical resistance.
Figure 15E:
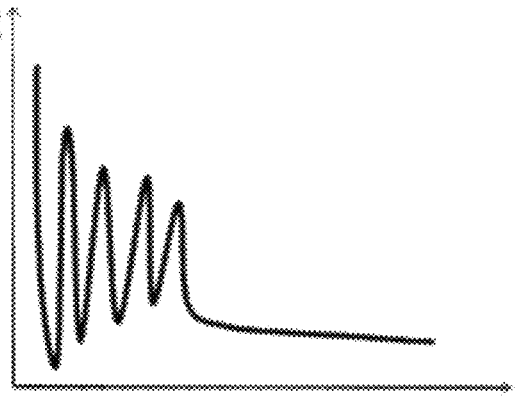
FIG. 15E shows a graph of time-thickness oscillation.
Figure 15F:
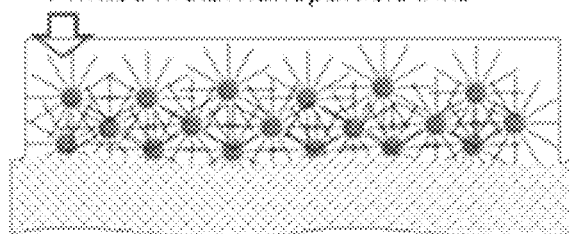
FIG. 15F shows a schematic view of printed metal nanoparticle inks in flexible, stretchable and fibrous substates.

FIGS. 15A-15H illustrate two mechanistic pathways for metallic thin film formation. FIG. 15A illustrates the conventional pathway of interparticle neck connection. FIG. 15B illustrates the model corresponding to resistance change vs. sintering time. FIG. 15C shows the pathway of metallic thin film formation by vacuum evaporation. FIG. 15D illustrates an illustration of the model for the layer-by-layer formation quantum size phenomenon of the electrical resistance. Fermi energy sub-bands reduces to a set of parallel disks of a metallic thin film deposition; electron can only occupy those states within the disk. FIG. 15E shows resistance oscillation as a function of time or thickness during layer-by-layer deposition. FIG. 15F show a layered substrate which is flexible, stretchable, and fibrous.

Figure 15G:
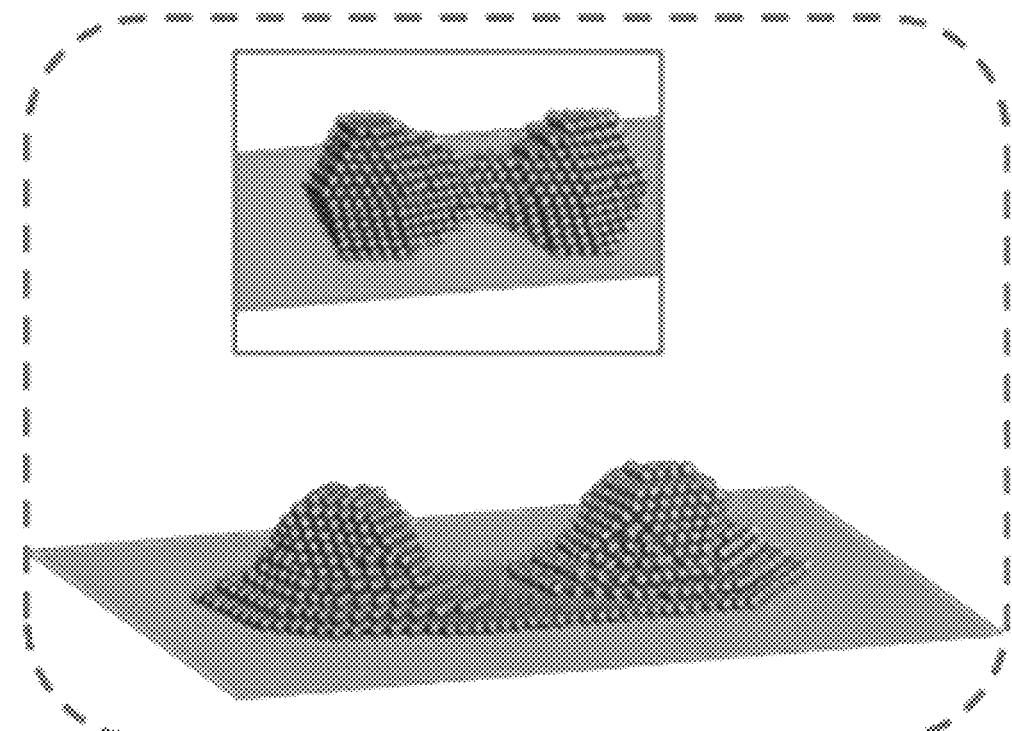
FIGS. 15G-15H illustrate the sintering mechanism via atomic mobility and diffusion around the NPs (FIG. 15G) in comparison with the traditional neck formation (FIG. 15H).
Figure 15H:
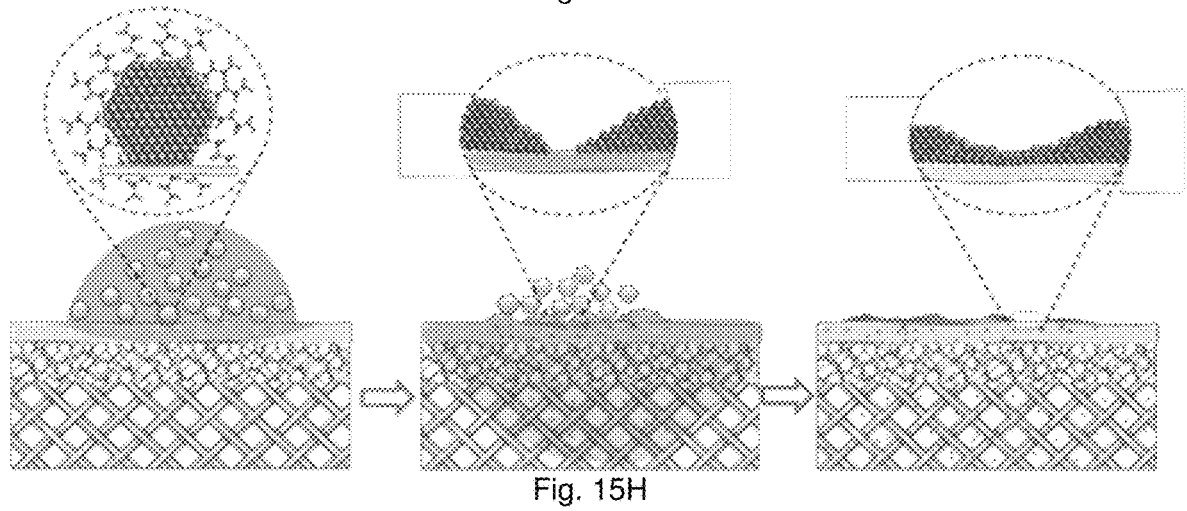

FIG. 15G shows illustrations of the sintering processes for printed nanoink on a layered paper substrate, in contrast to the traditional neck formation by the sintering mechanism via atomic mobility and diffusion around the NPs shown in FIG. 15H.

In contrast to the usual exponential decay of resistance in traditional thin film growth model, the electrical oscillation is reminiscent of a quantum size effect (QSE) for atomic layer-by-layer (LL) metal film growth (FIG. 13). The QSE is further substantiated by density functional theory (DFT) calculation of the surface and Fermi energies related to the electrical conductivity. The LL growth is shown to exhibit an oscillatory feature in terms of surface free energy and Fermi energy. This is the first example demonstrating an observable QSE for NPs on paper substrate at room temperature, paralleling the phenomena known for chemical vapor deposition of metal thin films as a function of the number of atomic layers and Au nanocluster growth as a function of the number of Au atoms.

The understanding of this finding can be further aided by examining how atomic adhesion and mobility play a role in the sintering process in terms of surface-mediated Ostwald ripening (OR) based on Gibbs-Thompson model coupled with modified bond additivity. See methods, infra, for equations and parameter descriptions, including sublimation energy ($\Delta H_{sub}$), adsorption energy ($E_{ads}$) and activation energy for diffusion ($E_{diff}$) of metal atom on the surface. Using typical values for bulk materials, the simulated size evolution for Au and Cu NPs showed no indication of sintering near room temperature (FIGS. 16A-16B).

Figure 16A:
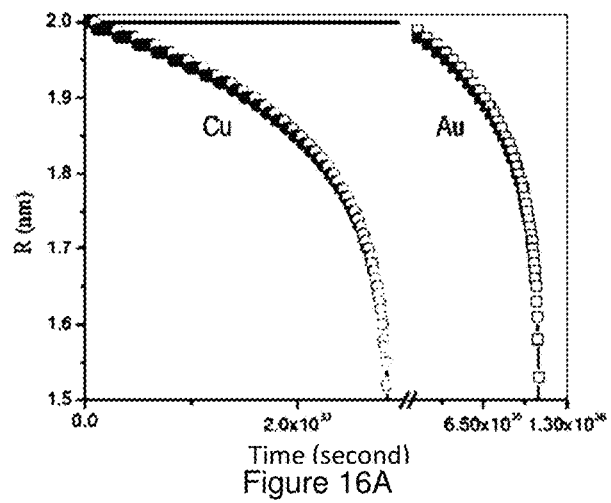
FIGS. 16A-16B show GT-MBA simulated size evolutions in terms of the disappearance and growth of individual nanoparticles in Ostwald Ripening using typical adsorption, diffusion and sublimation energy.
Figure 16B:
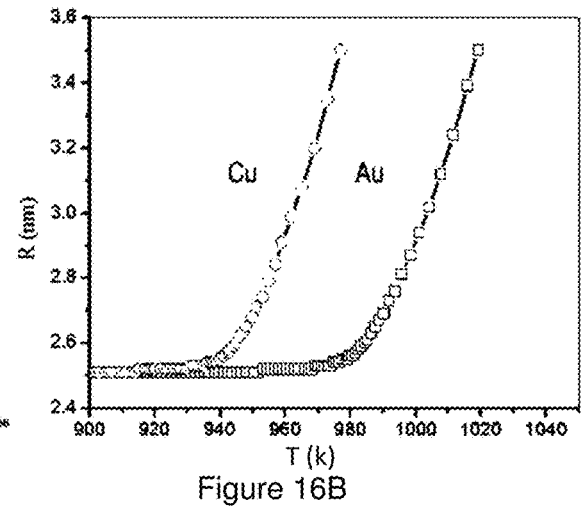

FIGS. 16A-16B show GT-MBA simulated size evolutions in terms of the disappearance and growth of individual nanoparticles in Ostwald Ripening using typical adsorption, diffusion and sublimation energy. FIG. 16A shows size evolutions based on GT-MBA model simulation of surface-mediated Ostwald ripening for disappearance of small-sized NPs at RT ("S") on the cellulose surface with bulk $E_{tot}$ of Au (310.2 kJ/mol) and Cu (290.7 kJ/mol). FIG. 16B shows size evolutions based G-T MBA model simulation of surface-mediated Ostwald ripening for growth of large-sized NPs at RT ("L") with bulk $E_{tot}$ of Au (310.2 kJ/mol) and Cu (290.7 kJ/mol).

Figure 17A:
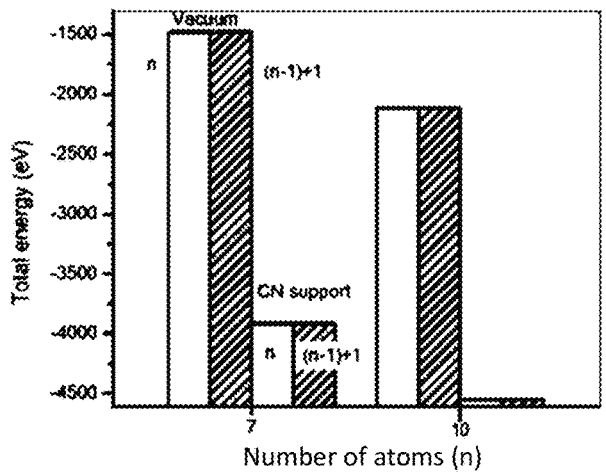
FIGS. 17A-17D show DFT-calculated total energies for models of Au nanoclusters in vacuum and on the surface of cellulose substrate.
Figure 17B:
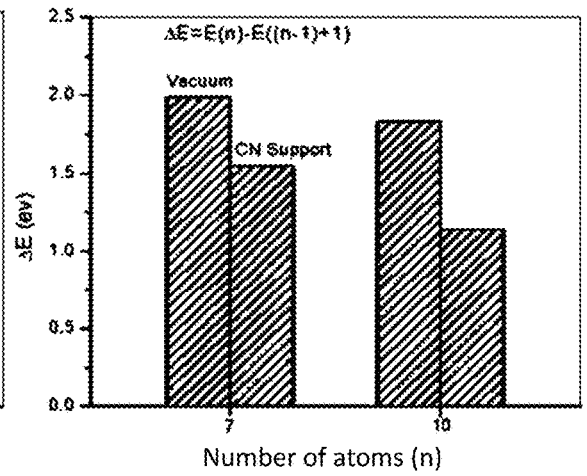
Figure 17C:
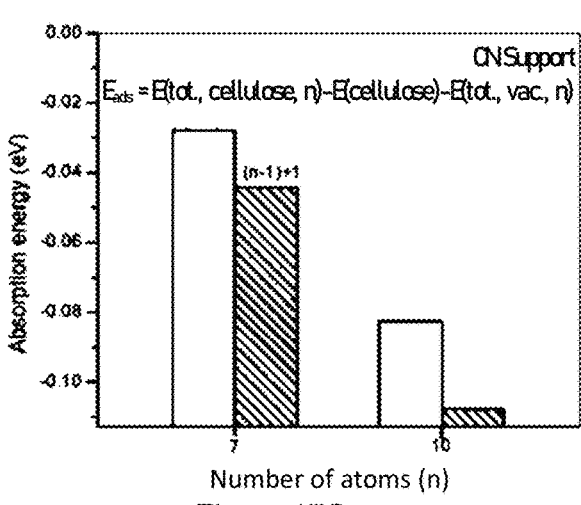
Figure 17D:
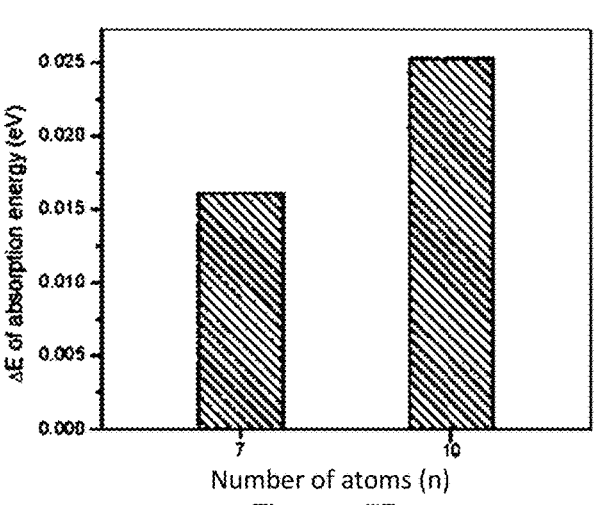

FIGS. 17A-17D show DFT-calculated total energies for models of Au nanoclusters in vacuum and on the surface of cellulose substrate. FIG. 17A shows total energies for clusters with n atoms and clusters with n−1 plus the detached atom 1. FIG. 17B shows the energy difference between n and (n−1)+1. FIG. 17C shows adsorption energies for clusters with n atoms and clusters with n−1 plus the detached atom 1. FIG. 17D shows adsorption energy difference between n and (n−1)+1. Calculations performed for n=7 and n=10.

At the atomic level, the surface-mediated bridging (FIG. 3A) involves atomic detachment, diffusion and re-attachment. The driving force depends on cluster size and atomic diffusion characteristic. The atomic attachment/de-attachment energies and atomic diffusion barriers using nanocluster models with different sizes, e.g., Au clusters with "n" atoms and clusters with "n−1" atoms plus a detached atom "1" in vacuum or on cellulose support revealed subtle differences. Several conclusions can be drawn: (i) atomic detachment is favored for clusters on cellulose (FIG. 17A); the total energy of clusters on cellulose is much smaller; and the difference of total energy between n and (n−1)+1 is less on cellulose than that in vacuum (FIG. 17B), i.e., less energy is needed to remove one atom from cluster on cellulose; (ii) adsorption energy on cellulose support for larger clusters is greater (more negative and stable) than smaller clusters (FIG. 17C); Small cluster is not stable and easier for atomic detachment; (iii) by comparing the adsorption between n and (n−1)+1, the difference is greater for larger sized particles (FIG. 17D). The atomic diffusion for the smaller particles is more favored than larger ones.

However, by taking NPs (or atoms)—NC interactions into consideration and adopting the values for adsorption, diffusion and sublimation corresponding to both nano- and atomic scales, DFT-calculated $E_{ads}$ and $E_{diff}$ revealed subtle differences between Au and Cu atoms on the cellulose surface (FIG. 14A). $E_{ads}$ clearly depends on the adsorption site, differing between Au and Cu atoms, as evidenced by the difference of $E_{ads}$ (e.g., Au ~0.67 eV and Cu ~0.71 eV) at the same adsorption site. $E_{diff}$ for Cu is smaller than that for Au atoms (e.g., Cu ~0.23 eV and Au ~0.28 eV). This difference is responsible for the Cu-rich "flowing skirt" atomic layer and the Au-rich NP, consistent with the finding that Cu atoms have a faster mobility than Au on the surface (FIGS. 3A-3F and 4A-4H). This is also consistent with, which reports the highly-dynamic detachment of Cu atoms from Cu NPs supported on silica. This is supported by the atomic attachment/de-attachment and diffusion barriers calculated with nanocluster models of different sizes (FIGS. 17A-17D). The particle size dependence for Au and Cu (FIG. 18) shows that $\Delta H_{sub}$ for NPs with a radius of 0.7 nm (FIG. 18) is almost two times less than that of the bulk counterpart. A refined simulation (FIG. 14B) show that the size reduction of smaller Cu particles occurs at much shorter time than that for Au, and at a lower temperature approaching room temperature.

Figure 18:
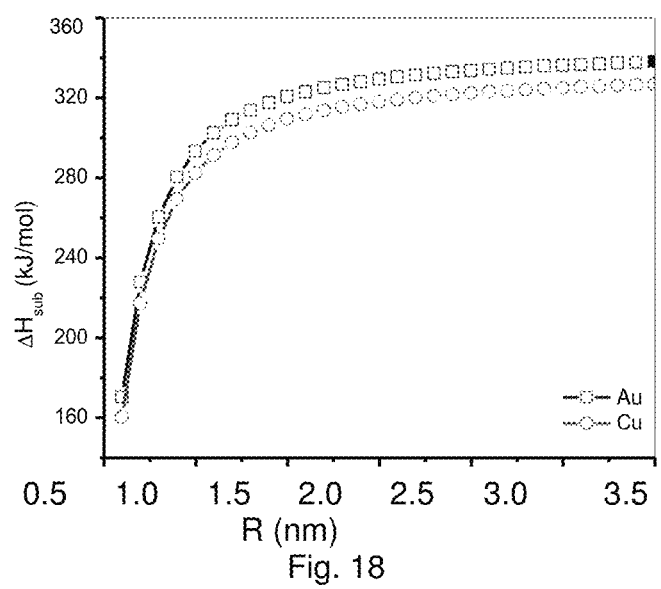
FIG. 18 show plots of calculated sublimation energy as a function of nanoparticle size for Au (upper trace) and Cu (lower trace).

FIG. 18 shows plots of calculated sublimation energy as a function of nanoparticle size for Au (upper trace) and Cu (lower trace). The sublimation of nanoparticles with R=0.7 nm is almost two times less than that of the bulk counterparts. With the calculated size dependent $\Delta H_{sub}$, and cellulose surface mediated $E_{ads}$ and $E_{diff}$, the surface mediated $E_{tot}$ was considered in the GT-MBA simulation. While Etot=310.2 and 290.7 kJ/mol for bulk Au and Cu, respectively, $E_{tot}$=131.8 and 113.7 kJ/mol for 1.4-nm diameter sized Au and Cu nanoparticles, respectively. Moreover, the plot of sublimation energies for Au and Cu as a function of particle sizes shows that the sublimation of the NPs with R=0.7 nm is almost two times less than that of the bulk counterpart.

A surface-mediated atomic bridging pathway is demonstrated to craft 1D/2D atomic structures with bimetallic nanoparticles on amorphous, fibrous or porous substrates at room temperature. This is substantiated by the electrical oscillation and the eventual metallic conductivity on the surface or through the thickness of the paper. This is a conceptual departure from the traditional perception of sintering metal NPs on surfaces, which has many implications for advancing emerging technologies, including wearable sensors as demonstrated by a paper sensor with high sensitivity and selectivity (FIGS. 10A-10C). In addition, this is also useful for enabling atomic-scale controllability of supported nanoparticle catalysts in heterogeneous catalysis.

Methods

Chemicals and materials. Gold chloride hydrate (HAuCl$_4$) were purchased from Alfa Aesar. Copper(II) nitrate trihydrate (Cu(NO$_3$)$_2$·3H$_2$O, 99%), decanethiol (DT, 96%), 11-mer-captoundecanoic acid (MUA, 95%), sodium acrylate (97%) and all kinds of alcohols (99.9%) from Aldrich. Solvents included hexane (Hx, 99.9%) and Acetone (99%) from Fisher, Gases of CO (1 vol % balanced by N$_2$), N2 (99.99 vol %) and CO2 (99%) were obtained from Airgas. 2,2,6,6-Tetramethylpiperidinooxy (TEMPO, 98%) was purchased from Acros. Sodium hypochlorite (NaClO solution, available chlorine 7~410%) was purchased from Sigma-Aldrich. Sodium bromide (NaBr) was obtained from Fisher Scientific Company. Polyacrylonitrile (PAN) having an average molecular weight (Mw) of 150 kDa was purchased from Sigma-Aldrich. Poly (ethylene terephthalate) non-woven substrate (PET microfilter F02413 with an average fiber diameter of about 30 μm) for the membrane support was provided by Freudenberg Nonwovens (Hopkinsville, KY). Water was purified with a Millipore Milli-Q water system.

Nanoparticle synthesis and nanoink formulation. The synthesis of Au and AuCu alloy nanoparticles involved the use of acrylate as both reducing and capping agent in an aqueous solution of HAuCl$_4$. For example, Au nanoparticle were synthesized by reacting an aqueous solution of HAuCl$_4$ ($2.0 \times 10^{-7}$ M) with sodium acrylate ($12.0 \times 10^{-6}$ M) at controlled room temperature. Au nanoinks were formulated by centrifugation at 5000 rpm for a controlled time. For example, Au$_{50}$Cu$_{50}$ nanoparticles were synthesized by chemical reduction of precursors HAuCl$_4$ ($2.0 \times 10^{-4}$ M) and $2.0 \times 10^{-4}$ Cu(NO$_3$)$_2$ with sodium acrylate ($12.0 \times 10^{-3}$ M) at pH 7.5-8.0. Nanoinks were formulated by concentrating the nanoparticle solution by different factors in terms of concentrations and pHs.

Different paper substrates, including commercial papers such as Whatman, Millipore, Fisherbrand papers, and multi-layered nanofibrous cellulose (NC) films cast on electrospun PAN/PET substrates were used as paper substrates. The sintering process was followed by dropping a certain amount of 5% NPs solution on the substrate, allowing sintering to occur under ambient condition. The color change of the sintered thin film was monitored by a camera. The printing was carried with a dispenser printer (Nordson EFD PRO4L) equipped with time/pressure dispensing syringe, diaphragm valve and 27 Ga and 50 μm needles. The NPs was used to print interdigitated microelectrode devices on the substrate at ambient condition.

For printing sensing thin films, gold nanoparticles of 2 nm diameter encapsulated with decanethiolate monolayer were synthesized by two-phase reduction of $HAuCl_4$ 29. DT-Au 2 nm nanoparticles from the synthesis was heated at 150° C. to produce larger sized Au 5.0 nm nanoparticles. Decanethiolate-capped gold nanoparticles or acrylate-capped AuCu nanoparticles were linked using 11-mercaptoundecanoic acid (MUA), redispersed in an ethanol solution forming MUA-Au and MUA-AuCu nanoink and then printed at room temperature on papers with controlled thickness.

Resistance measurement. Electrical resistance was measured upon dropping NPs onto the substrate in between the two pre-sintered gold electrodes. Computer-interfaced multi-channel Keithley (Model 2700) instrument was used to measure the lateral resistance change in the sintering process. Jandel Model RM3000 with four probes and Keithly 2100 digital multimeter were used to determine the electrical conductivity of the sintered thin films.

Characterizations. Transmission electron microscopy (TEM) images were obtained on JEOL JEM-ARM200F instrument operated at 200 kV. High resolution TEM was carried out using the chromatic aberration corrected TEM (ACAT), and the dark field STEM and EDS mapping measurements were performed by FEI Talos F200X at the Electron Microscopy Center at Argonne National Laboratory. The HRTEM images of free-standing thin film images were obtained using FEI Tecnai F20ST and Tecnai F30. The Atomic Force Microscopy (AFM) images were obtained using Dimension 3100, Nanoscope V. Field Emission Scanning electron microscopy (SEM) was carried using SUPRA 55 instrument.

Computational modeling. DFT calculations were carried out using DMol3 package in the Materials Studio Software. The Perdew—Burke—Ernzerhof (PBE) functional with a generalized gradient approximation (GGA) was used to describe the exchange-correlation interaction. The spin unrestricted DFT calculations were performed and a double-numerical basis set with polarization functions (DNP) was used. The (111) facets of fcc structure was used to study the surface energy and fermi energy of the layer-by-layer metallic thin film. The k-points for Au, AuCu and $AuCu_3$ thin film were 3×3×1, 7×7×1 and 7×7×1, respectively, which were carried out to sample the surface Brillouin zone. A 15 Å vacuum along the z-direction was used between the repeated slabs. The adsorption species described here were fully relaxed and $$\Delta E_{ads} = E_{atom} + E_{cellulose\ surface} - E_{atom/cellulose\ surface}$$

was used to calculate the adsorption energies of Au or Cu atom on the surface, where $E_{Au}$ or $Ec_{Cu}$, $E_{cellulose\ surface}$, and $E_{atom/metal}$ surface are the total energy for the isolated Au or Cu atom, the isolated substrate (e.g., cellulose), and the Au or Cu atom adsorption on metal surfaces, respectively. The activation energy of diffusion ($E_{diff}$) is the barrier of the diffusion that was calculated by $\Delta E_a = E_{TS} - E_{IS}$, where the energies of the transition state ($E_{TS}$) and the initial state (EIS) were obtained with ZPE corrections.

Theoretical simulation. Simulations considered Au and Cu atom mobility on the surface in terms of the surface-mediated Ostwald ripening using Gibbs-Thompson (GT) model coupled with modified bond additivity (MBA) model:

$$\frac{dR}{dt} = \frac{K}{R}\left(e^{-\frac{E_{tot}}{kT}}\right)\left(e^{\frac{2\gamma\Omega}{kTR^*}} - e^{\frac{2\gamma\Omega}{kTR}}\right)$$

where R is radius of nanoparticle, t is time, $E_{tot}$ is total energy, k is Boltzmann constant, T is temperature, γ is surface free energy, and Ω is atomic volume of bulk metal. R* represents the critical nanoparticle size at which the size neither increases or decreases. K=(2 sinθ) $V_p$ Ω/a(2-3 cos θ+(cos θ)3), where θ is the contact angle, a is an interatomic distance and $V_p$ is the frequency of thermal vibration of atoms.

$$E_{tot} = (\Delta H_{sub} - (E_{ads}^{support} - E_{diff}^{support})$$

where $\Delta H_{sub}$ is sublimation energy, $E_{ads}^{support}$ the adsorption energy of metal atom on the support substrate surface, and $E_{diff}$ is the activation energy for the diffusion of metal atom on the substrate surface. To realistically assess the total energy, the nanoparticle size effect on the sublimation energy was considered, $$\Delta H_{sub}(R) = \Delta H_{sub}^{\infty} - 2\varepsilon_s/\rho R$$

where $\Delta E_{sub}(R)$ is the sublimation energy at a specific size, $\Delta E_{sub}^{\infty}$ is the sublimation energy of bulk solid Au (348.8 kJ/mol for Au, and 337 kJ/mol for Cu, ρ is the bulk solid phase density, and M is the molar mass. $\varepsilon_s$ is the specific surface energy, $$\varepsilon_s(R) = (1 - 2\delta + A/R^2)\varepsilon_s^{\infty}$$

where δ is Tolman length with a value of 0.3~0.6, A (=2πRL) is area, and $\varepsilon_s^{\infty}$ is the specific surface energy of bulk solid.

REFERENCES

Wang, C. et al. Monolayer atomic crystal molecular superlattices. *Nature* 555, 7695 (2018).
Chen, L. et al. Nanomanufacturing of silicon surface with a single atomic layer precision via mechanochemical reactions. *Nat. Commun.* 9, 1542 (2018).
Gibney, E. 2D or not 2D. *Nature* 522, 274 (2015).
Schliehe, C. et al. Ultrathin PbS sheets by two-dimensional oriented attachment. *Science* 329, 550-553 (2010).
Niu, J. et al. Novel polymer-free iridescent lamellar hydrogel for two-dimensional confined growth of ultrathin gold membranes. *Nat. Commun.* 5, 3313 (2014).
Zhao, J. et al. Free-standing single-atom-thick iron membranes suspended in graphene pores. *Science* 343, 1228-1232 (2014).
Sahoo, P. K. et al. One-pot growth of two-dimensional lateral heterostructures via sequential edge-epitaxy. *Nature* 553,7686 (2018).
Wang, F. et al. Two-dimensional non-layered materials: synthesis, properties and applications. *Adv. Funct. Mater.* 27, 1603254 (2017).
Li, W. et al. Nanogenerator-based dual-functional and self-powered thin patch loudspeaker or microphone for flexible electronics. *Nat. Commun.* 8, 15310 (2017).
Gao, W. et al. Fully integrated wearable sensor arrays for multiplexed in situ perspiration analysis. *Nature,* 529, 509 (2016).
Dai, L. et al. Ultrastable atomic copper nanosheets for selective electrochemical reduction of carbon dioxide. *Sci. Adv.* 3, e1701069 (2017).
Sun, H. et al. Energy harvesting and storage in 1D devices. *Nat. Rev. Mater.* 2, 17023 (2017).

Li, Q. et al. Modulating the hierarchical fibrous assembly of Au nanoparticles with atomic precision. *Nat. Commun.* 9 (2018).

Sun, Y. et al. Quantitative 3D evolution of colloidal nanoparticle oxidation in solution. *Science* 356, 303-307 (2017).

Johnson, R. W., Hultqvist, A. & Bent, S. F. A brief review of atomic layer deposition: from fundamentals to applications. *Mater. Today* 17, 236-246 (2014).

Pobelov, I. V. et al. Dynamic breaking of a single gold bond. *Nat. Commun.* 8, 15931 (2017).

Wong, A. et al. Synthesis of ultrasmall, homogeneously alloyed, bimetallic nanoparticles on silica supports. *Science* 358, 1427-1430 (2017).

Yan, S. et al. Decoration of nanofibrous paper chemiresistors with dendronized nanoparticles toward structurally tunable negative-going response characteristics to human breathing and sweating. *Adv. Mater. Interf.* 4, 1700380 (2017).

Wang, X., Fang, D., Hsiao, B. S. & Chu, B. Nanofiltration membranes based on thin-film nanofibrous composites. *J. Memb. Sci.* 469, 188-197 (2014).

Kang, N. et al. Nanoparticle-nanofibrous membranes as scaffolds for flexible sweat sensors. *ACS Sensors* 1, 1060-1069 (2016).

Grouchko, M. et al. Conductive inks with a "built-in" mechanism that enables sintering at room temperature. *ACS Nano* 5, 3354-3359 (2011).

Wang, D. et al. Band-edge engineering for controlled multimodal nanolasing in plasmonic superlattices. *Nat. Nanotechnol.* 12 889 (2017).

Sedov, E. A., Riikonen, K. & Arutyunov, K. A. Quantum size phenomena in single-crystalline bismuth nanostructures. *npj Quantum Materials* 2, 18 (2017).

Guo, Y. et al. Superconductivity modulated by quantum size effects. *Science* 306 1915-1917 (2004).

Zeng, C., Liu, C., Pei, Y. & Jin, R. Thiol ligand-induced transformation of $Au_{38}(SC_2H_4Ph)_{24}$ to $Au_{36}$(SPh-t-Bu)24. *ACS Nano* 7, 6138-6145 (2013).

Campbell, C. T., Parker, S. C. & Starr, D. E. The effect of size-dependent nanoparticle energetics on catalyst sintering. *Science* 298, 811-814 (2002).

Kim, D., Becknell, N., Yu, Y. & Yang, P. Room-temperature dynamics of vanishing copper nanoparticles supported on silica. *Nano Letters* 17, 2732-2737 (2017).

Dai, Y. Q. et al. The physical chemistry and materials science behind sinter-resistant catalysts. *Chem. Soc. Rev.* 47, 4314-4331 (2018).

Yin, J. et al. Molecularly mediated thin film assembly of nanoparticles on flexible devices: electrical conductivity versus device strains in different gas/vapor environment. *ACS Nano* 5 6516-6526 (2011).

Zhao, W. et al. Nanoalloy printed and pulse-laser sintered flexible sensor devices with enhanced stability and materials compatibility. *ACS Nano* 9, 6168-6177 (2015).

Bembel, A. On the size dependences of the metallic nanoparticle evaporation and sublimation heats: thermodynamics and atomistic modeling. *Russian Phys. J.* 59, 1567-1574 (2017).

Regel, A. & Glazov, V. Periodic law and physical properties of electronic melts. Nauka, Moscow 306 (1978).

Jia, M., Lai, Y., Tian, Z.& Liu, Y. Calculation of the surface free energy of fcc copper nanoparticles. *Modelling and Simulation in Materials Science and Engineering* 17, 015006 (2008).

Samsonov, V. & Chernyshova, A. On the size dependence of the surface energy of metal nanoclusters. *Colloid Journal* 78, 378-385 (2016).

Liu, B., Cao, C. & Jia, Z. The Amount of modified acrylate effects on paper performance for printing electronics. *Advanced Graphic Communications, Packaging Technology and Materials* (Springer, Singapore, 2016), pp. 741-749.

Geng, L. et al. Structure characterization of cellulose nanofiber hydrogel as functions of concentration and ionic strength. *Cellulose*, 24, 5417-5429 (2017).

Kim, D., Resasco, J., Yu, Y., Asiri, A. M. & Yang, P. Synergistic geometric and electronic effects for electrochemical reduction of carbon dioxide using gold-copper bimetallic nanoparticles. *Nat. Commun.* 5, 4948 (2014).

Alonzo-Medina, G. & Oliva A. An in situ technique to measure gold resistance oscillations during the first stages of growth. *Microelectronics J.* 38, 388-391 (2007).

Zhang, Y. et al. Molecular dynamics simulation of electrical resistivity in sintering process of nanoparticle silver inks. *Comput. Mater. Sci.* 125 105-109 (2016).

Li, C., Chen, W., Li, M., Sun, Q. & Jia, Y. Thickness dependent of phase shift between surface energy and work function in Pb ultrathin films. *New J. Phys*, 17, 053006 (2015).

Samsonov, V. et al. Molecular dynamics investigation of the size dependence of the heat of melting of metal nanoclusters. *Phys. Solid State* 56, 2369-2373 (2014).

Example 2

A large-scale and green synthesis route for low-cost production of copper-gold alloy nanoparticles is provided. The particle size is controlled in terms of aggregative nucleation and aggregative growth mechanism under highly concentrated solutions of metal precursors in aqueous solutions. The composition is controlled in terms of the synthetic feeding ratios and post-synthesis processing conditions. High metal-precursor concentration (large-scale synthesis) in aqueous solutions (green synthesis) is a characteristic of the synthesis.

Aggregative nucleation and aggregative growth of alloy NPs in aqueous solutions of either low or very high concentrations of metal precursors differ. For conventional low metal-precursor concentrations (~$10^{-4}$ M), fast nucleation leads to growth of smaller sized particles whereas slow nucleation leads to growth of larger particles. This type of kinetics operates for two pathways for the formation of bimetallic nanoparticles, homogeneous nucleation of an alloy and growth, or stepwise nucleation of one metal and surface nucleation of the second metal on the first followed by alloying and growth.

Figures 19A, 19B:
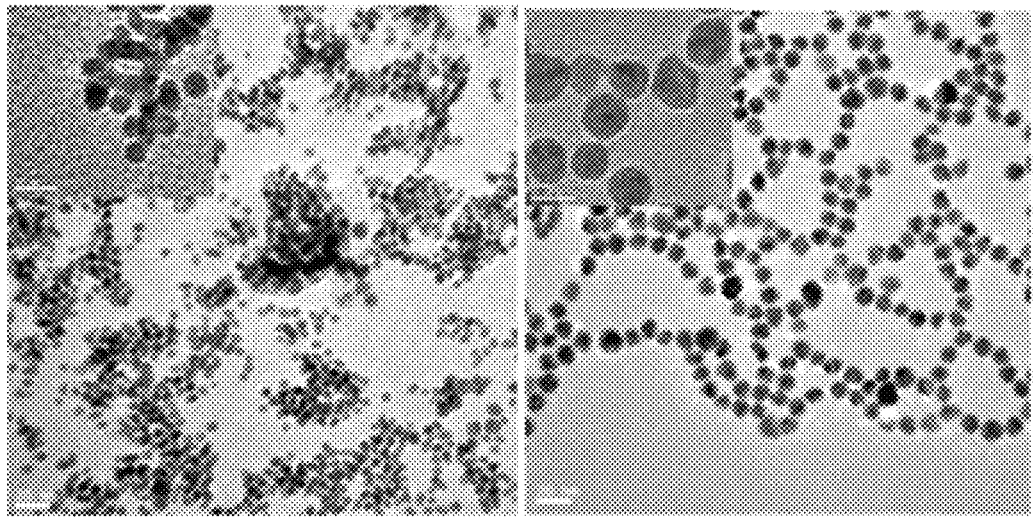
FIGS. 19A and 19B show TEM images for AuCu NPs synthesized by 20× concentration (FIG. 19A, 6.2±0.5 nm) in comparison with 1× (FIG. 19B, 11.4±0.9 nm) in aqueous solutions of the two metal precursors (50:50 ratio) by chemical reduction.

FIGS. 19A-19B show TEM images for AuCu NPs synthesized by 20× concentration (2B, 6.2±0.5 nm) in comparison with 1× (2C, 11.4±0.9 nm) in aqueous solutions of the two metal precursors (50:50 ratio) by chemical reduction. Based on estimates of the NP mass % or the solvent consumption assuming 100% efficiency, range I would consume 50,000 liters of solvent, whereas range III would consume only 50-500 liters of solvent for commercially-viable production of 1 kg. FIGS. 19A-19B show a set of results for synthesis in ranges I and II, demonstrating the viability of controlling size and composition by increasing the concentration of the two metal-precursors by a factor of 20, in comparison with AuCu NPs synthesized under conventional low concentrations in aqueous solution as demonstrated for the synthesis of Au NPs in aqueous solution ($2 \times 10^{-4}$ M).

In addition to monodispersed size feature, the size control is remarkably consistent with the expectation based on the aggregative nucleation and growth kinetics. This result also demonstrated a green pathway to eliminate the consumption of large amount of solvents, as shown previously for the synthesis of AuCu NPs in toluene solution.

The control of the bimetallic composition in the AuCu NPs involves the control of the ratio of the two metal precursors and their corresponding ligands or counterions in the solution. Such controllability was supported by results of ICP-OES analysis, which used a 50:50 feeding ratio, resulting a ratio very close to 50:50. In these two cases, the bimetallic composition remains largely unchanged in the 10× and 20× concentrated solutions. Moreover, the feasibility of controlling the alloying phase structure of the bimetallic NPs is supported by the XRD pattern (FIG. 20), showing the peak positions and shapes consistent with expectation for AuCu alloy in comparison with Cu and Au's XRD patterns.

Table 1 shows the size and composition under different scale up factors for the synthesis of AuCu NPs in aqueous solutions.

TABLE 1

Size and composition under different scale up factors
for the synthesis of AuCu NPs in aqueous solutions.

| Scale-up factor | 1× | 10× | 20× |
|---|---|---|---|
| Au:Cu (Feed) | 50:50 | 50:50 | 50:50 |
| Au:Cu (NPs) | 42:58 | 45:55 | 44:56 |
| Diameter (nm) | 11.4 ± 0.9 | 6.0 ± 0.5 | 6.2 ± 0.5 |

Figure 20:
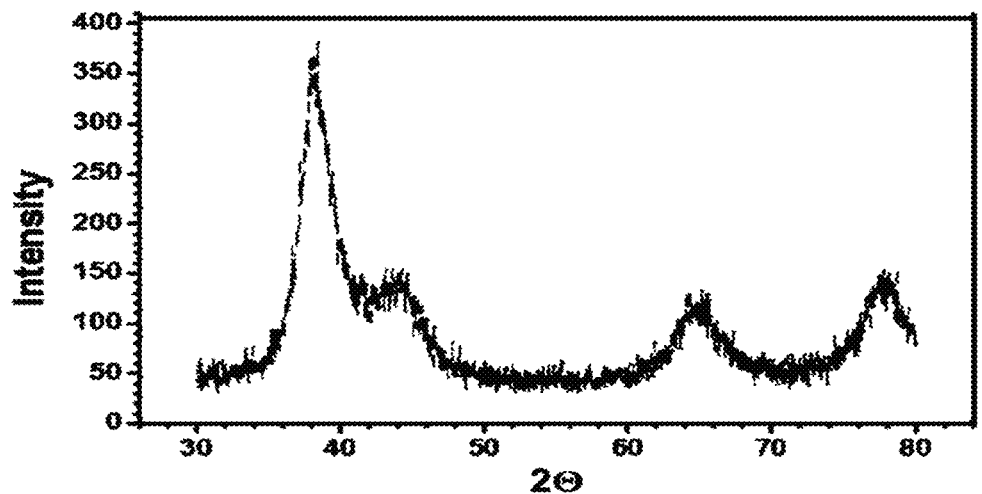
FIG. 20 shows XRD of the AuCu NPs synthesized by a factor of 20×.

FIG. 20 shows XRD of the AuCu NPs synthesized by a factor of 20×. The preparation of gold copper nanoparticles involves mixing an aqueous 1-50 wt % $AuCl_4$ stock solution 1-50 wt % $Cu^{2+}$ stock solution and an aqueous 1-20 wt % sodium acrylate solution in a controlled ratio. After the reaction at room temperature under stirring is completed, the nanoparticles are separated and washed three times with deionized water. The nanoparticle sizes feature 2 to 20 nm in diameter. The nanoparticles are dispersed in an aqueous solution to make an ink with a concentration ranging from 2 to 40 wt % depending on the printing technique to be used.

TABLE 2

| Scale-up factor | 1× | 10× | 20× |
|---|---|---|---|
| Au:Cu (Feed) | 50:50 | 50:50 | 50:50 |
| Au:Cu (NPs) | 42:58 | 45:55 | 44:56 |
| Diameter (nm) | 11.4 ± 0.9 | 6.0 ± 0.5 | 6.2 ± 0.5 |

Figures 21A, 21B, 21C:
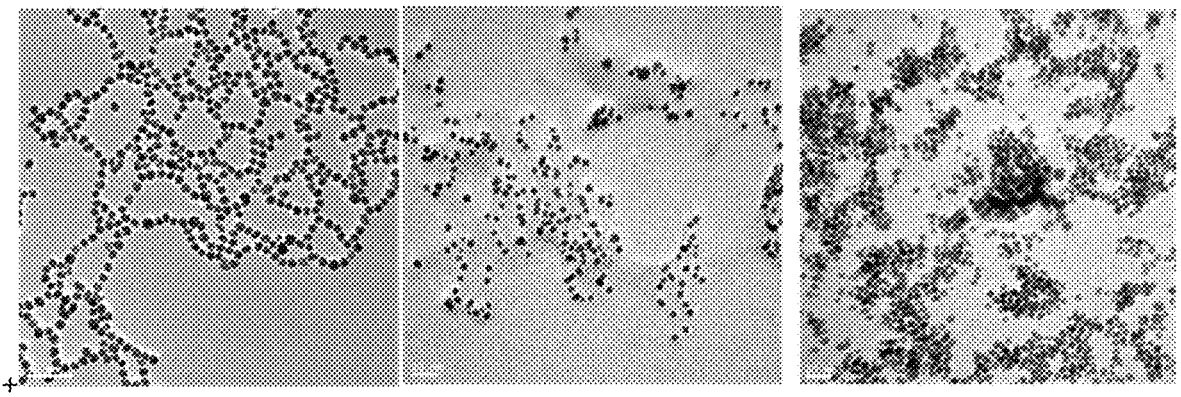
FIGS. 21A-21C show TEM images for $Au_{50}Cu_{50}$ nanoparticles in 1×, 10× and 20× concentrations in the synthesis.

FIGS. 21A-21C show a set of TEM images for $Au_{50}Cu_{50}$ nanoparticles by 1×, 10× and 20× concentrated precursor solutions in the synthesis of $Au_{10}Cu_{90}$ nanoparticles. CuAu alloy nanoparticles of other monodispersed sizes ranging from 2 to 20 nm in diameter have been made. Adjustable compositions featuring $Cu_nAu_{100-n}$ where n=2 to 99, have been synthesized.

Figure 22:
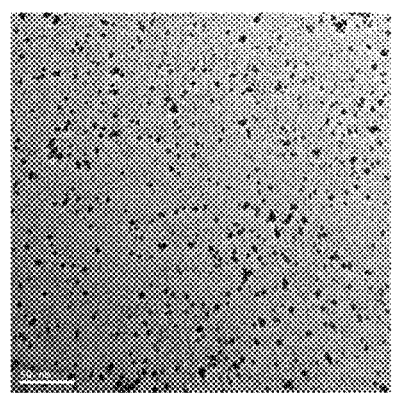
FIG. 22 shows TEM image for $Au_{10}Cu_{90}$ nanoparticles.

FIG. 22 shows a TEM image for $Au_{10}Cu_{90}$ nanoparticles, which feature dominant Cu composition in the nanoparticles.

Figure 23:
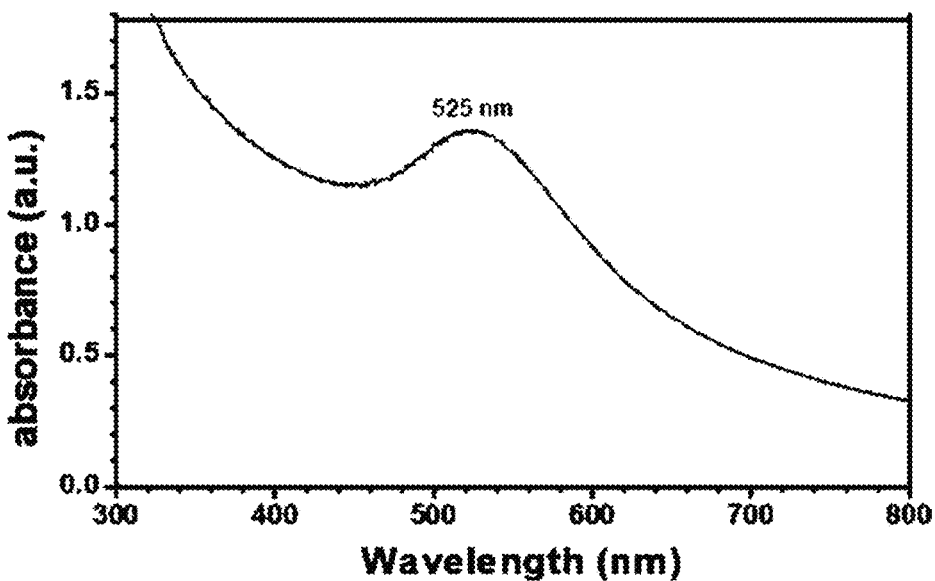
FIG. 23 shows a UV-Vis spectrum for a sample of as-synthesized CuAu nanoparticle in aqueous solution.

FIG. 23 shows a UV-Vis spectrum for a sample of as-synthesized CuAu nanoparticles in aqueous solution.

Depending on the chemical or physical nature of the substrates, some sintered $Cu_{50}Au_{50}$ NPs exhibit golden color. The measured resistivity of a sintered Au NP film of ~2 um was as low as $10^{-7}$ Ωm, which was about 1 order of magnitude lower than bulk Au.

Experimental and Methods
Synthesis of Cu-Based Nanowires with Dendrite-Like Decorations
Synthesis in Organic Solutions
CuNi Nanowires Decorated with Dendrites Step 1: Synthesis of CuNi nanowires as precursor in organic solvent. The synthesis of the CuNi NW precursors used a modified procedure based on Song J. et al. 2014[36]. Example: 0.1~100 mmoles of $CuCl_2$ and 0.1~100 mmoles of Ni(acac)$_2$, and a controlled amount of oleylamine are added into a 3-necked flask. The reaction is kept under a very light flow of in-house $N_2$ and strong magnetic stirring. The solution is heated to 70-100° C. for a controlled period of time and then was heated to 170~200° C. for 4 hours. Dark red solution was observed. Solution was naturally cooled down to room temperature. Hexane was added to resulting solution. Isolate the product via centrifugation (3000 RPM) and discard supernatant (top solution). Re-disperse precipitate in hexane and acetone. Centrifuge again (3000 RPM) and discard supernatant (top solution). The final product was dispersed in hexane for further use.

Step 2: Decoration of pre-synthesized CuNi nanowires with dendrite-like features. The pre-synthesized CuNi nanowires was decorated with dendrite-like features by controlling reaction and annealing time, temperature and air flow. The resulting CuNi NWs were then concentrated to a certain wt %, and with or without additives, for nanoink formulation.

Cu Nanowires Decorated with Dendrites

Step 1: Synthesis of Cu nanowires as precursor. The synthesis of the Cu NW precursors used a modified procedure based on Song J. et al. (2014)[36] Example: 0.1~100 mmoles of $CuCl_2$ a controlled volume of oleyalamine are added into a 3-necked flask. The reaction is kept under a very light flow of in-house $N_2$ and strong magnetic stirring. The solution is heated to 80-120° C. for a controlled period of time and then was heated to 180-200° C. for 4 hours. Dark red solution was observed. Solution was naturally cooled down to room temperature. 30 mL hexane added to resulting solution. Isolate the product via centrifugation (3000 RPM) and discard supernatant (top solution). Re-disperse precipitate in hexane and acetone. Centrifuge again (3000 RPM) and discard supernatant (top solution). The final product was dispersed in hexane for further use.

Step 2: Decoration of pre-synthesized Cu nanowires with dendrite-like features. The pre-synthesized Cu nanowires was decorated with dendrite-like features by controlling reaction and annealing time, temperature and air flow. The resulting Cu NWs were then concentrated to a certain wt %, and with or without additives, for nanoink formulation.

Synthesis in Aqueous Solutions
CuNi Nanowires Decorated with Dendrites

Step 1: Synthesis of CuNi nanowires as precursor in aqueous solution. The synthesis of the CuNi NW precursors used a modified procedure based on Zhang S., et al. (2010)[37]. Briefly, concentrated NaOH, 0.01-1 M Cu$(NO_3)_2$, and 0.001-0.1 M Ni$(NO_3)_2$ were mixed in an aqueous solution containing ethylenediamine (EDA) and hydrazine ($N_2H_4$). The reaction temperature was controlled at 50-90° C. under nitrogen or air. The products were obtained by repetitive centrifugation and redispersion.

Step 2: Decoration of pre-synthesized CuNi nanowires with dendrite-like features. The pre-synthesized CuNi nanowires was decorated with dendrite-like features by controlling reaction and annealing time, temperature and air flow at controlled rate. The resulting CuNi NWs were then concentrated to a certain wt %, and with or without additives, for nanoink formulation.

CuNi Nanowires Decorated with Dendrites

Step 1: Synthesis of Cu nanowires as precursor in aqueous solution. The synthesis of the Cu NW precursors used a modified procedure based on Zhang, S. et al. (2010)[37]. Briefly, concentrated NaOH and 0.01-1 M $Cu(NO_3)_2$ were mixed in an aqueous solution containing ethylenediamine (EDA) and hydrazine ($N_2H_4$). The reaction temperature was controlled at 50-90° C. under nitrogen or air. The products were obtained by repetitive centrifugation and redispersion.

Step 2: Decoration of pre-synthesized Cu nanowires with dendrite-like features. The pre-synthesized Cu nanowires was decorated with dendrite-like features by controlling reaction and annealing time, temperature and air flow at controlled rate. The resulting Cu NWs were then concentrated to a certain wt %, and with or without additives, for nanoink formulation.

Preparation of Flexible Polymeric Substrates

Step 1: Synthesis of the free-standing polymeric thin film. 0.1-10 g chitosan (CS) dissolved in 100 mL distilled water, adjust pH to neutral and stirring overnight as stock solution. 1 g gamma-poly glutamic acid (γ-PGA) from Bacillus licheniforms and 0.1-10 g 1-Ethyl-3-(3-dimethylaminopropyl) carbodiimide (EDC) in the mixture of distilled water and ethanol as stock solution. Add a controlled volume of γ-PGA solution into chitosan solution slowly. After stirring overnight, take a drop of chitosan-PGA on the glass slides, and then thermal treatment in the oven at controlled temperature for half an hour. Soap the glass slides into distilled water, producing the polymeric PGA-Chitosan thin film.

Step 2: Formulation of the polymeric thin film with NPs. Immerse the free-standing PGA-Chitosan thin film into the Au NPs solution at controlled concentration, the Au NPs can be fixed on the thin film, producing the PGA-Chitosan/Au flexible thin film.

Step 3: Formulation of the flexible polymeric substrates. Load the free-standing PGA-Chitosan or PGA-Chitosan/Au thin film onto the Polyethylene terephthalate (PET) substrate by immersing the PET substrate into the solution with the free-standing film, producing the PGA-Chitosan/PET or the PGA-Chitosan/Au/PET.

Results

CuNi Nanowires Decorated with Dendrite-Like Features.

As-Synthesized CuNi NWs Decorated with Dendrite-Like Features $Cu_{51}Ni_{49}$, $Cu_{85}N_{15}$, $Cu_{93}Ni_7$ and $Cu_{98.7}Ni_{1.3}$ and Cu nanowires decorated with dendrite-like features were synthesized. Some examples are described below.

$Cu98.7Ni_{1.3}$ NWs as precursor. The hexane dispersible CuNi NWs, were synthesized by heating an oleylamine solution of $CuCl_2$ and $Ni(acac)_2$ with a molar ratio of 2:1 at a controlled temperature). The UV-vis spectrum of $Cu_{98.7}Ni_{1.3}$ NWs shows a 580 nm characteristic peak of the plasmonic resonance of Cu NPs. CuNi alloy NWs showed a composition of >90% Cu, i.e., $Cu_{98.7}Ni_{1.3}$ and diameters of 10~60 nm. The CuNi NWs are decorated with dendrite-like features, which was prepared from the $Cu_{98.7}Ni_{1.3}$ NWs precursor by controlling reaction and annealing time and temperature.

Characterization of $Cu_{98.7}Ni_{1.3}$ NWs Sintering at Room Temperature Condition The CuNi NWs decorated with dendrite-like features and printed trace on the paper substrate could be sintered as conductive trace. The CuNi-printed and self-sintered traces on the paper are reasonably conductive.

$Cu_{98.7}Ni_{1.3}$ NWs with dendrite-like decoration printed on a paper substrate, and room-temperature sintering on the paper substrate at room-temperature, showed a conductivity of $1.29 \times 10^7$ S/m, e.g., an example of the sintering test, thus demonstrating a clear change after sintering. A later thickness of about 1.05 µm was obtained.

Determination of the Electrical Properties of CuNi NWs with Dendrite-Like Decoration Sintered at Room-Temperature Condition The resistance was measured by two- and four-probe methods showed a reasonably good electrical conductivity.

Figure 24:
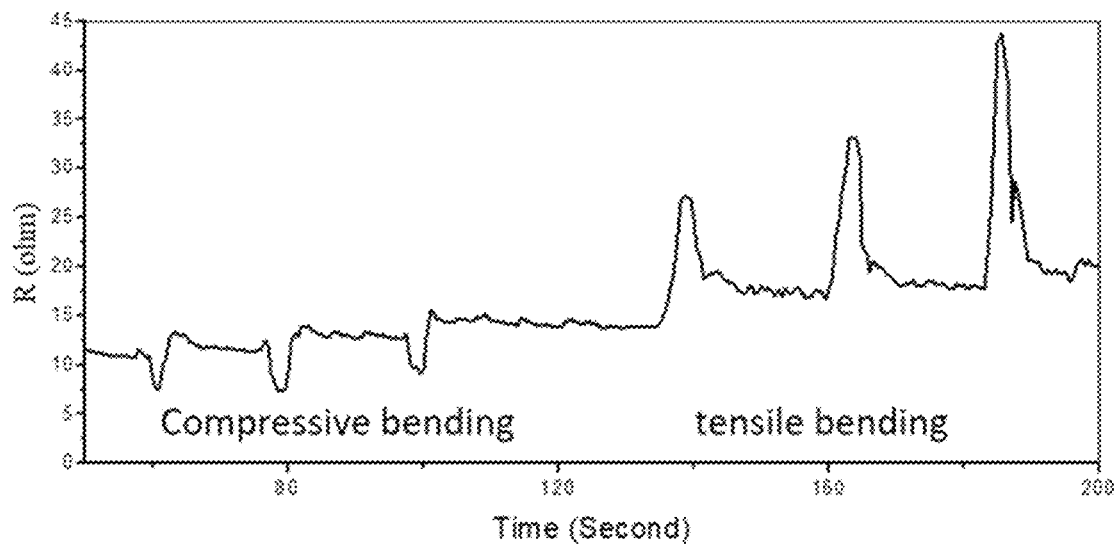
FIG. 24 shows the resistance response for the compressive bending and tensile bending of an example of $Cu_{98.7}Ni_{1.3}$ NWs with dendrite-like decoration printed and room-temperature sintered on a paper substrate as a trace and the measurement of the electrical resistance in response to the compressive bending and tensile bending shows that the trace's conductivity change is reversible to the banding cycle.
Figure 25A:
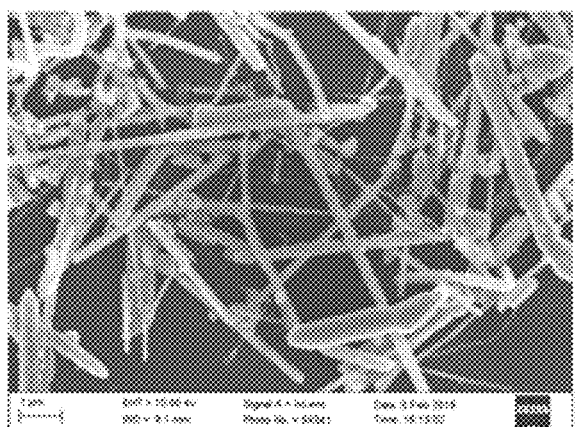
FIGS. 25A-25D show SEM images for a sample of as-synthesized Cu NWs decorated with dendrite-like features, with the size of 20-100 nm.
Figure 25B:
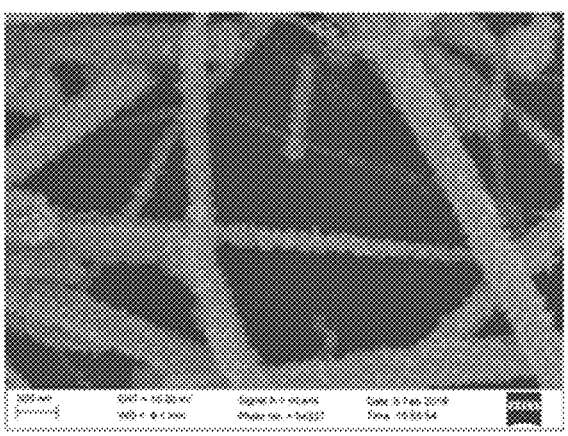
Figure 25C:
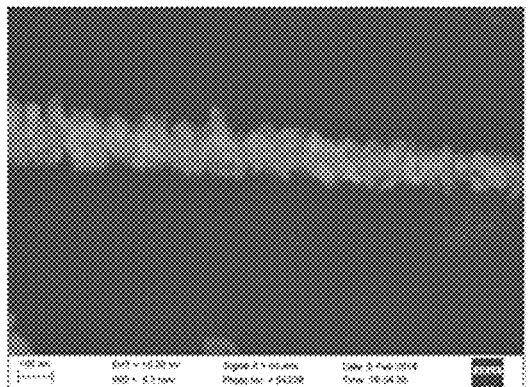
Figure 25D:
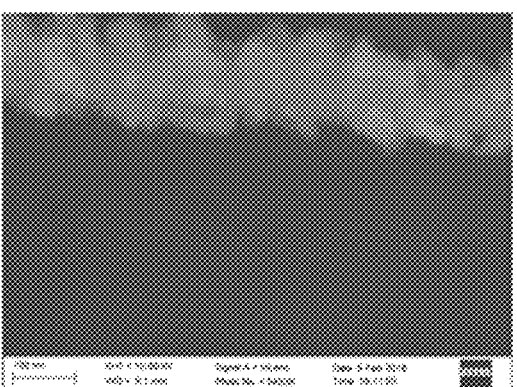
Figure 26A:
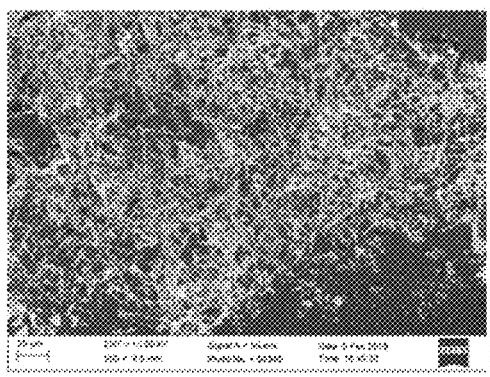
FIGS. 26A-26F show SEM images showing a sample of dendrite-like featured Cu NWs sintered on a substrate at controlled pH.
Figure 26B:
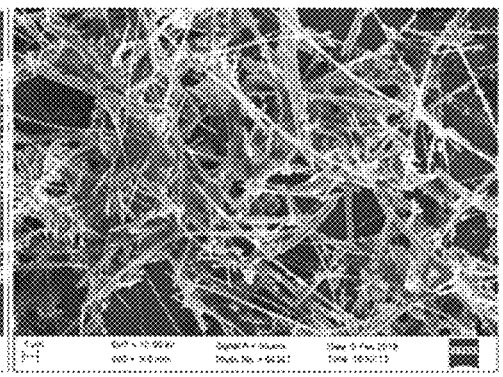
Figure 26C:
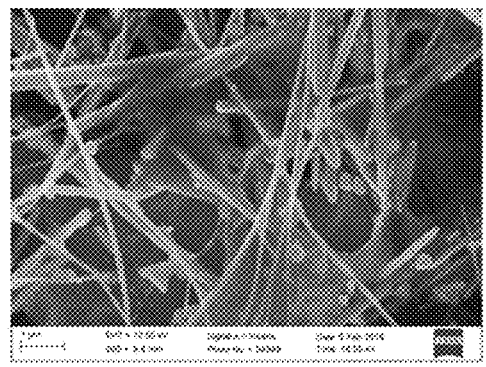
Figure 26D:
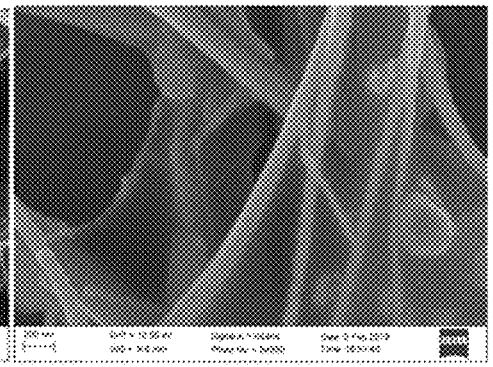
Figure 26E:
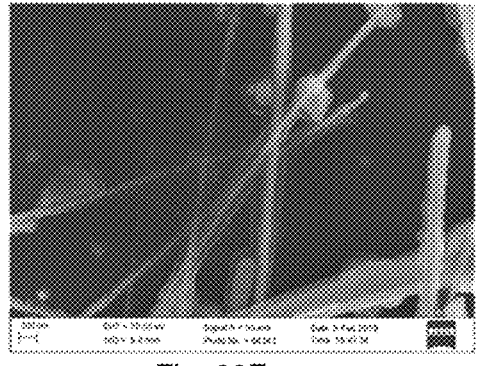
Figure 26F:
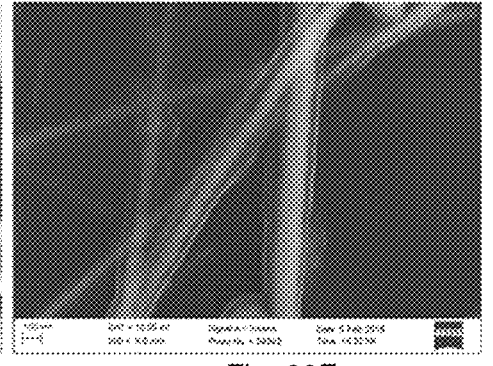

FIG. 24 shows the resistance response for the compressive bending and tensile bending of an example of $Cu_{98.7}Ni_{1.3}$ NWs with dendrite-like decoration printed and room-temperature sintered on a paper substrate as a trace and the measurement of the electrical resistance in response to the compressive bending and tensile bending shows that the trace's conductivity change is reversible to the banding cycle.

Cu Nanowires with Dendrite-Like Decoration.

Characterization of as-Synthesized Cu NWs with Dendrite-Like Decoration

The dendrite-like featured Cu NWs ink, on a paper substrate at room-temperature condition achieved a conductivity of $2.98 \times 10^6$ S/m.

FIGS. 25A-25D show several additional examples of SEM images for the as-synthesized Cu NWs. Cu alloy NWs showed diameters of 20~100 nm, and dendrite decoration on the surface of the nanowires.

2. Characterization of Cu NWs with dendrite-like decoration sintering at room-temperature condition.

The Cu NWs printed trace on the paper substrate could be sintered as conductive trace. The Cu-printed and self-sintered traces on the paper are reasonably conductive.

FIGS. 26A-26F show a set of SEM images of the sintering test for a sample of dendrite-like featured Cu NWs sintered at controlled pH on a silicon waver. The fusion of the NWs is evident.

Figure 27:
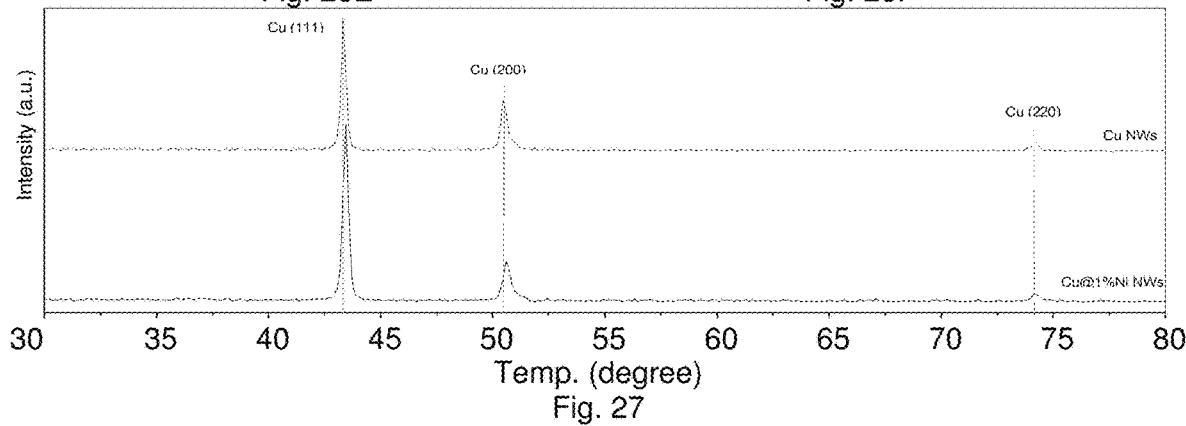
FIG. 27 shows XRD patterns of Cu NWs (upper) and Cu@1% Ni NWs (lower).

FIG. 27 shows the XRD patterns for samples of Cu NWs (upper) and Cu@ 1% Ni (lower) nanowires. The XRD for Cu@1% Ni red shift a little bit at Cu(200) peak. In general, there is no indication of $CuO_x$ being detected for both samples, demonstrating that little oxidation occurred for the as-synthesized Cu NWs and Cu@ 1% Ni nanowires. Note that calculation from the XRD data peak width showed that the domain size of dendrite-like Cu NWs is around 100 nm and dendrite-like Cu NWs is around 60 nm.

Summary of Electrical Properties of CuNi NWs and Cu NWs

The resistance measured by two- and four-probe methods showed a reasonably good electrical conductivity. Table 3 summarizes of the results from the conductivity properties of Cu— based nanowires sintered on paper substrate at room-temperature condition.

TABLE 3

Summary of conductivity properties of dendrite-like featured Cu-based nanowires sintered on paper substrate at room-temperature condition

| $Cu_nM_{100-n}$ | Conductivity (S/m) | Conductivity in terms of % Off $\sigma_{bulk-Cu}$ |
|---|---|---|
| Cu | $2.98 \times 10^6$ | 5 |
| Cu@1% Ni | $1.29 \times 10^7$ | 20 |

Note:
(in comparison with bulk copper conductivity: $5.96 \times 10^7$ S/m, resistivity: $1.68 \times 10^{-8}$ μm)

Polymer and Paper Substrates Tested:

Commercial paper substrates. The viability of the nanoink sintering on commercially-available papers including Whatman® filter paper, which is a standard grade filter paper with medium retention and flow rate, ion-exchange cellulose papers which are chemically modified cellulose fibers, glossy paper which involves of cellulose fiber blended with an inorganic filler was tested. The hydrophilicity and porosity of the cellulose network could allow maneuvering of molecular species involved in the sintering process.

Cellulose layered substrate. The structure of the paper substrate represents a unique way to highlight this element, which is a three-layered porous paper fabricated by cellulose nanofiber (CN) top layer (fiber diameter 5 nm, and thickness <2 μm), electrospun polyacrylonitrile (PAN) nanofibrous mid-layer (fiber diameter 150 nm, thickness ~40 μm) and nonwoven polethyleneterephthalate (PET) fibrous support (fiber diameter 20 μm, thickness ~100 μm). The hydroxyl groups at the $C_6$ position of cellulose chains are converted into carboxylate groups, enabling opportunities of surface modifications.

Biodegradable thin film layered substrate. PGA/CS freestanding thin films were synthesized and cast such thin films on PET substrate. The PGA/CS films are biodegradable, and stretchable. PGA from Bacillus licheniformis, was employed, and grafted on a PET substrate.

REFERENCES

Ning K. et al. Nanoparticle—Nanofibrous Membranes as Scaffolds for Flexible Sweat Sensors. *ACS Sensors* 2016, 1, 1060-1069.
Shan Y. et al. Decoration of Nanofibrous Paper Chemiresistors with Dendronized
Nanoparticles toward Structurally Tunable Negative-Going Response Characteristics to Human Breathing and Sweating. *Advanced Materials Interfaces* 2017, 4.
Jason N. et al. Copper nanowires as conductive ink for low-cost draw-on electronics. *ACS applied materials & interfaces* 2015 7(30):16760-6.
Rathmell A et al. Synthesis of oxidation-resistant cupronickel nanowires for transparent conducting nanowire networks. *Nano letters* 2012, 12(6):3193-9.
Song J. et al. Superstable transparent conductive Cu@Cu$_4$Ni nanowire elastomer composites against oxidation, bending, stretching, and twisting for flexible and stretchable optoelectronics. *Nano letters* 2014, 14 (11), 6298-305.
Yin Z. et al. Facile synthesis of oxidation-resistant copper nanowires toward solution-processable, flexible, foldable, and free-standing electrodes. *Small.* 2014 10 (24):5047-52.
Cullity, B. D and Graham, C. D. Introduction to Magnetic Materials, 2nd Ed.; Wiley-IEEE: New York, 2008).
Zhang S and Zeng HC. Solution-based epitaxial growth of magnetically responsive Cu@Ni nanowires. *Chemistry of Materials.* 2010 22(4):1282-4.

Example 3

From a nanomanufacturing perspective by inkjet, screen, or roll-to-roll printing technologies to fabricate electrically-conductive patterns on paper substrates, RT- and self-sintering promises a transformative alternative to current vacuum deposition and photolithography processes. However, the lack of understanding of RT- or self-sintering mechanism in relation to the nanoink formulation and the substrate structure represents a clear knowledge gap. This gap is linked to two important aspects of the sintering process that has been largely ignored. The control of particle-substrate interaction, i.e., adhesion, which is complex because many factors, in addition to van der Waals forces, contribute to the adhesion.

Work in pulsed laser sintering of CuAu nanoinks on both rigid and flexible substrates suggests that the adhesion to different substrates depends on a synergistic combination of substrate parameters (hardness, surface free energy, roughness, functionality, etc.) and ink formulation (solvent, concentration, composition, surface capping, etc.).

The organic stabilizing or capping molecules must be desorbed from the surface to initiate sintering. This is not a typical issue with laser or heat sintered particles, as the capping agents thermally desorb or decompose under those conditions. In a self-sintering process of copper-alloy nanoinks printed on paper substrates at RT, the initiation of self-sintering generally depends the interaction between the capping molecules (adsorbed or desorbed), which act as a quasi-liquid for NPs or NWs to move, and the solvent-filled porous structures, which act as a buffering surface or interface for the solvent and the desorbed molecules to move away from the sintering areas and the atomic detachment, surface diffusion and re-attachment to occur (FIGS. 3A-3F). In contrast to traditional sintering mechanism, i.e., interparticle neck formation, the particle-substrate interaction controls the detachment/re-attachment, mobility or diffusion of the atoms on the substrate. Surface melting of smaller-sized particles could play an important role in starting the surface diffusion. The sintering kinetics of most metal nanoinks are rather sluggish under low temperature. Acrylate-modified paper is an example which has strong capability to adsorb conductive ink, facilitate diffusion, and impact on the conductivity. The structure of the paper substrate highlights interparticle atomic bridging on the cellulose substrate (see FIGS. 5A-5F).

A simulation based on Ostwald ripening with Gibbs-Thompson (GT) model coupled with a modified bond additivity (MBA) model demonstrates the thermodynamics of the sintering process. Using the typical values for adsorption, diffusion and sublimation corresponding to bulk materials, the simulated size evolution for Au and Cu NPs did not show any indication of sintering at low temperatures. By taking the interaction between the NPs or metal atoms and the substrate into consideration using the calculated values for adsorption, diffusion and sublimation at both nano and atomic scales, results demonstrated the feasibility of sintering near RT.

In comparison with traditional manufacturing methods such as vapor deposition, drop-on-demand printing such as inkjet-printing and dispenser printing offers design flexibility in terms of materials and scalability towards R2R and additive manufacturing processes, and benefits in terms of manufacturing speed and high throughput. The development of a printable nanoalloy ink capable of self-sintering in a manufacturing environment greatly accelerates additive manufacturing of electronic packaging structures.

Cu-alloy NPs and NWs were synthesized using wet-chemical methods by controlling metal-precursor compositions (e.g., $Cu_{68}Pt_{32}$ NWs were synthesized by reacting $H_2PtC_{16}$ and $CuCl_2$ in ethylene glycol in the presence of DMF in an autoclave at 170° C.).

Water-dispersible CuAu NPs (synthesized by acrylate-reduction and capping of AuCl and $Cu^{2+}$ in aqueous solution) were printed on paper substrate, and the result demonstrated the viability of RT sintering to produce a conductive trace or interdigitated microelectrode pattern. The resistance measured by two- and four-probe methods showed a reasonably good electrical conductivity, up to 30-50% of bulk copper conductivity.

Hexane-dispersible CuNi NWs (e.g., $Cu_{90}Ni_{10}$ NWs were synthesized in an oleylamine solution of $CuCl_2$ and Ni(acac)$_2$ with a controlled molar ratio at a controlled temperature) were also printed on paper substrate. The result showed that CuNi alloy NWs (with a composition of >90% Cu and with diameters of 10~40 nm) could be sintered at RT to produce a conductive trace with a reasonable conductivity.

Analysis of AFM image of CuAu-sintered film on the CN/PAN/PET paper showed that the surface roughness (($R_a$=42 nm, $R_q$=32 nm) was largely comparable to that of the CN/PAN/PET substrate ($R_a$=42 nm, $R_q$=56 nm), demonstrating that the morphology of the sintered NPs was in a conformal fashion over the paper substrate surface.

Figure 28A:
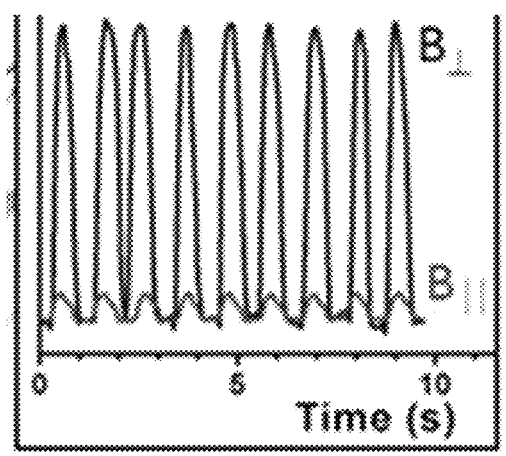
FIG. 28A shows a gauge sensor response to bending cycles.

FIG. 28A shows a gauge sensor response to bending cycles. Using laser sintered CuAu nanoink printed PET substrate coated with MUA-linked Au nanoparticles, the thin films were shown to function as a gauge sensor. The g-factor of the gauge sensor was much greater for bending in parallel to the current flow direction ($B_\parallel$) than that perpendicular to the current flow direction ($B\perp$). This type of bending response could endure repetitive bending cycles, as evidenced by the reversible response profiles using the fatigue tester.

Figure 28B:
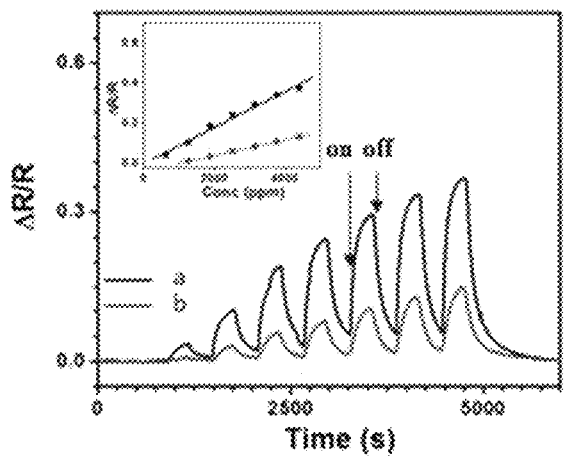
FIG. 28B shows a sensor response to acetone vapor.

FIG. 28B shows a sensor response to acetone vapor.

Figure 28C:
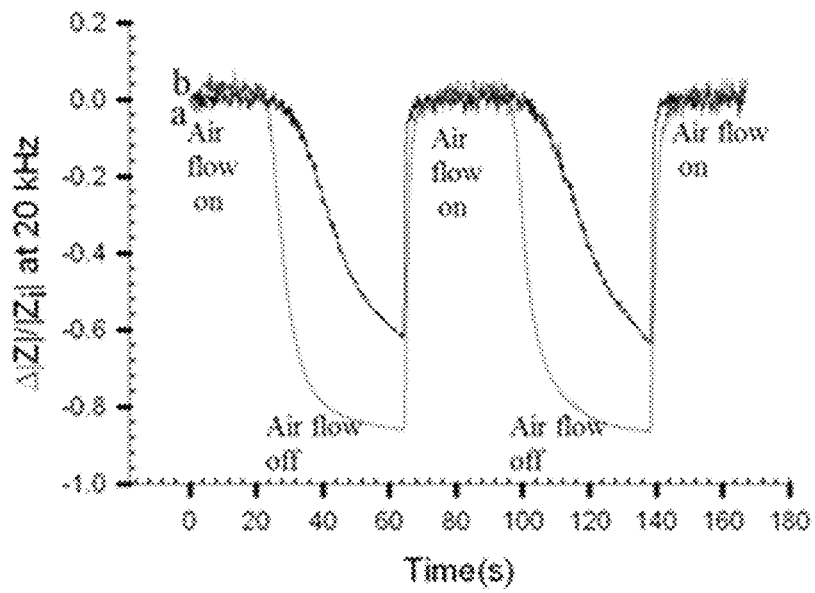
FIG. 28C shows a paper sweat sensor response to perspiration in a stop-air-flow measurement before (a) and after (b) exercise.

FIG. 28C shows a paper sweat sensor response to perspiration in a stop-air-flow measurement before (a) and after (b) exercise.

Figure 28D:
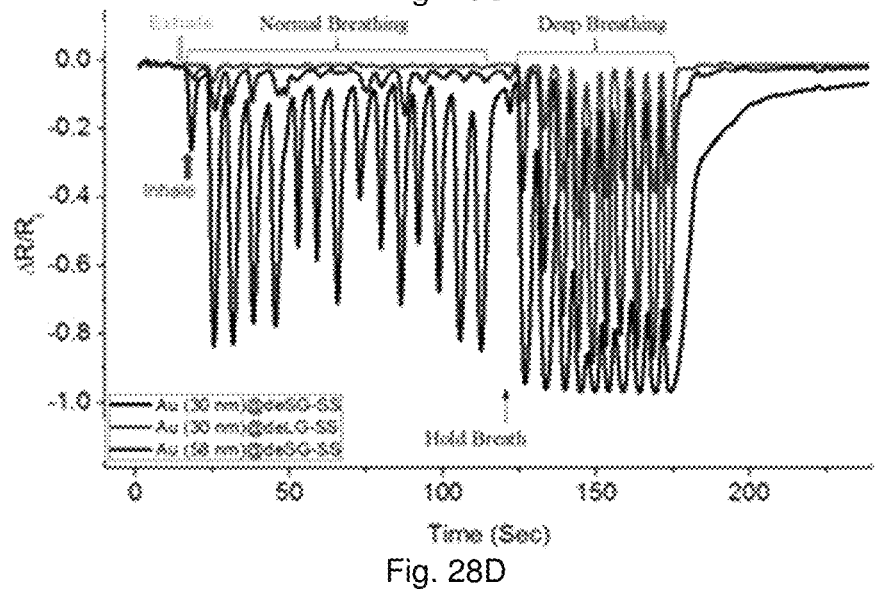
FIG. 28D shows paper breath sensor responses to an individual's breathing pattern: normal breathing, holding breath, and then deep breathing.

FIG. 28D shows paper breath sensor responses to an individual's breathing pattern: normal breathing, holding breath, and then deep breathing. The sensor was also shown to be responsive to different VOCs with high sensitivity.

The device could function as a sweat sensor with responses to perspiration in a stop-air-flow measurement of an individual before and after exercise (FIG. 28C), and as a breath sensor with responses to the individual's inhale and exhale cycles under normal breathing condition (FIG. 28D). The coupling of the sensing nanomaterials to the nanofibrous porosity played a significant role in the interactions between the adsorbed volatile molecules and the sensing film, leading to changes in interparticle distance and dielectric properties responsible for the electrical signals.

A two-phase protocol involves using thiols as capping molecules for composition-controllable $Cu_nAu_{100-n}$ (n>75%) with 2-3 nm and thermal aggregative growth for size control (3-10 nm). Aqueous dispersible $Cu_nAu_{100-n}$ (n>75%) NPs involves controlling the concentration ratios of AuCl— and $Cu^{2+}$ using acrylates as reducing and capping agents, seeks to achieve the desired nanoink formulation.

The synthesis of $Cu_nNi_{100-n}$ (with n>75) alloy NWs in terms of size, composition and surface properties employs techniques corresponding to those for $Cu_nAu_{100-n}$ nanoalloys and $Cu_nPt_{100-n}$ alloy NWs. These routes are different from existing approaches to CuNi NPs using microemulsion route, flame-driven aerosol synthesis, and core-shell type Cu@Cu—Ni NWs.

An aggregative nucleation and aggregative growth pathway favors 1D growth and scale up in an increase of metal precursor concentrations, e.g., Ni(II) and Cu(II). The as-synthesized CuNi alloy NWs could be easily dispersed in common organic solvents, and a hydrophilic capping agent is introduced via exchange and phase extraction methods so that the NWs are compatible to mixed solvents.

To achieve stable and homogenous nanoink formulations, the addition of different additives such as glycerol in different ratios is one way to adjust the viscosity and surface tension for optimal printing, depending on printing methods including screen printing (viscosity: 0.5-50 Pas) and inkjet printing (0.001-0.04 Pas). One example involves NPs or NWs in different concentrations (20~60 wt %) using different solvents, e.g., ethylene glycol plus water or ethanol in various mixing ratios, which adjusts the viscosity. Different organic dispersing agents or their combinations may be used to manipulate the viscosity, including sodium carboxymethylcellulose, sodium alginate solution, chloroform, toluene, tetradecane, dodecane, α-terpineol, ethanol, etc. Glycerol or other additives may also be used, in different ratios, as a way to adjust the viscosity and surface tension of the nanoink.

Figure 29A:
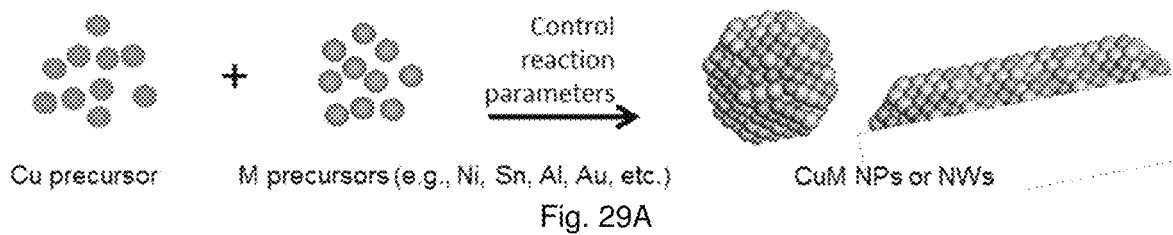
FIGS. 29A-29C illustrate synthesis of CuM NPs or NWs (FIG. 29A) and exploration of the two sintering routes (FIGS. 29B-29C).
Figures 29B, 29C:
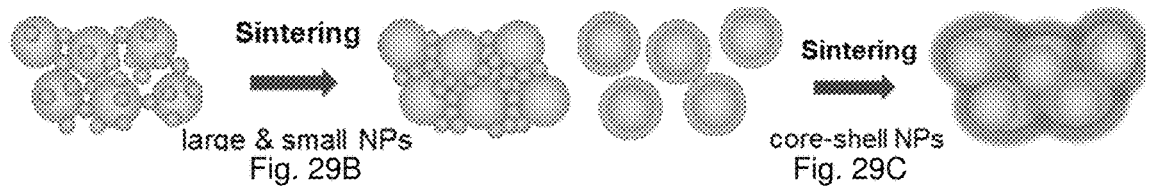

FIG. 29A shows an illustration of CuM NPs or NWs. To achieve sintering at low temperature and produce good electrical conductivity and adhesion, one additional modification to the formulation of the NPs or NWs involves a combination of smaller sized and larger-sized particles under different ratios (see FIG. 29B), the smaller-sized particles sintering at higher rate and so can "glue" the larger-sized particles better to favor high electrical conductivity. Another modification involves introducing a low-melting point component such as Sn into the alloy or core-shell NPs or NWs. Binary and ternary Sn-based solders such as Zn, Bi, Ag, Cu, etc. have been applied in the electronic packaging industry as promising solder due to its good physical and mechanical properties, superior solderability and good general compatibility. Nano Sn with 3~6 nm sizes are shown to exhibit melting points as low as 100-130° C. in comparison with bulk tin. Sn component may be introduced into nano Cu in two ways: mixing NPs of Cu-alloy and Sn and forming Cu—Sn alloy, which are aimed at achieving low-temperature melting and easy to flow metals in inks and addressing problems associated with oxidation of Cu. CuSn alloy NPs may be synthesized either in random or core-shell types of alloy. CuSn alloy NPs may be synthesized by reduction-decomposition methods, as demonstrated for $Cu_3Sn$ alloy NPs capped with oleic acid and oleylamine. The alloy NPs exhibit good oxidation-resistance for the fabrication of electrodes, and resistivity (in pressed format) similar to that of the conventional conductive electrodes fabricated using pure copper or silver nanoparticle ink. Core-shell CuSn NPs can be synthesized where the shell facilitates melting and gluing of NPs (see FIG. 29C), as demonstrated recently for CuSn core-shell NPs. The NPs showed an enhanced stability toward oxidation because the thin Sn shell prevents the Cu core from oxidation, and a high stability was observed over a long period of storage when the ink was prepared using a mixed solvent comprised of ethylene glycol, isopropyl alcohol and glycerin (ratio 75:20:5 vol %).

A typical nanoink would consist of NPs or NWs dispersed in aqueous or organic or mixed solution with metal loadings of 20-70% in which the NPs or NWs are stabilized by ligands with anchoring or functional groups such as carboxylate, amine or thiols. Depending on the printing method, ink formulations may be optimized in terms of particle size, particle composition, particle surface properties, solvent and dispersion compositions through extensive synthesis, preparation and characterizations. The as-synthesized NWs may be present in different concentrations (10~60 wt %) in different solvents, e.g., ethylene glycol plus water or ethanol, to form the ink. The stability of the homogenized ink, important for ready flow through the nozzles, relates to ink viscosity (e.g., density of 1-2 mg/mL and viscosity in the range of 1-20 CP for ink-jet printing), can be regulated by addition of water or ethylene glycol.

Printing equipment may include: Optomec Aerosol Jet 300; Optomec Aerosol Jet 5× (5 axis printer as part of NextFlex DoD program); Dimatix Ink-Jet Materials Printer DMP-2850; and Nordson EFD Pro 4 L dispenser.

The sensors produced may be used as lithographically-printed chemiresistors on flexible PET substrates, force or strain-sensing elements, or other types of physical, chemical, or mechanical sensors. For example, the sintered film may have a low concentration of nanoparticle sensors, which may interact with each other or the substrate through quantum, electrical, plasmon, optical, fluorescent, or other effects.

Additives can affect the sintering process in terms of inducing desorption of the capping molecules. Alcohols (methanol, ethanol, propanol, isopropanol, butanol, etc.) and weak acids/bases, which can desorb typical capping agent such as dodecylamine, oleylamine, etc. in controllable ways, may be used.

In the printing industry, alumina is often used as an ink receiving layer for paper substrates to accelerate the drying process. It is believed that, if silanol moieties are present in the coating of the paper, the hydrophobicity of the substrate is increased, water uptake of the substrate under high humidity is enhanced and, therefore, dissolving the water-soluble stabilizer (e.g., PVP) is enabled. The surface structure of a paper substrate may be modified at the cellulose layer by functionalization through controllable binding chemistry to create structures to the —$CO_2H/CO_2$ groups at the $C_6$ position of cellulose chains, including covalent amide or electrostatic binding with hydrophobic/hydrophilic groups. Such a surface modification tunes the surface hydrophobicity/hydrophilicity to manipulate the surface adhesion, atomic mobility and diffusion. Both aerosol jet and ultrasonic ink-jet printers may be used to print the nanoinks on the paper substrate or other substrate (e.g., PET, polyimide, flexible glass).

van der Waals interactions may play a significant role through physical adsorption in the adhesive adhesion theory, or interparticle interaction in the particle adhesion theory. Electrostatic or chemical bonds (ionic, covalent, hydrogen bonding) can also play important roles depending on the chemical nature in the adhesion boundary. These effects may be exploited as well.

Contact angle measurement may be used to assess the physical and chemical properties and the sintering process on the paper substrates. In a recent study of thermal sintering of silver NPs on polyimide, the pressure of the menisci between NPs and polyimide surface defined by $FS=4\pi R (\gamma LV \cos\theta + \gamma SL)$ ($\gamma LV$ is the liquid-vapor interfacial tension, $\theta$ is the particle-substrate contact angle, and $\gamma SL$ is the solid-vapor interfacial tension) was believed to force particles to sink into the surface layer. For the porous paper substrate, the contact angle could be different since the spreading of a liquid drop over dry porous paper substrate has three parts to be considered, including (1) spherical drop, (2) wetted region inside the porous substrate, (3) dry part of the porous substrate. There are two contact angles that must be considered, including the dynamic contact angle of the spreading drop and the effective contact angle inside the porous substrate. The total duration of the spreading process involves two stages, a first stage when the drop base expands until its maximum value is reached, and a subsequent stage when the drop base shrinks. The drop spreading on such porous substrate would influence the particle sintering, different from on non-porous substrate. Smaller pores favor capillary pressure generation but larger pores are needed for liquid suction and vapor venting. A three layer-structure of a paper substrate with different porosity can be used as a model substrate for understanding the capillary pressure generation, liquid suction and vapor venting, which can then be examined by varying the layer configuration and structure.

The nanostructured materials may be printed as sensing films onto the array for sensor application. Flexible/fibrous paper devices may be fabricated by printing arrays of interdigitated microelectrodes (IME) using the different printers (Optomec Aerosol Jet, Dimatix Ink-Jet, etc.). The thickness and resolution of the printing process control properties of the sintered nanoink microelectrodes on the surface of the substrates and the electrical resistance in relation to the nanoink structure and composition. This deposition may be used in roll-to-roll manufacturing (R2R) ink-jet printing of the microelectrode arrays on the paper or other fibrous substrates, and on other substrates.

The electrical and sensing performances of array devices coated with nanostructured chemiresistive sensing films may be evaluated. Once the individual or chemiresistor arrays on paper substrates are prepared, molecularly-mediated thin film assemblies of nanoparticles are coated onto the device and evaluated in sensor testing (FIGS. 28A-28D). In addition to chemical coupling and molecularly-mediated assembly, contact printing and noncontact aerosol or inkjet printing may be used, and the results may have application for use of the arrays as chemiresistor sensor arrays in sweat and breath, and gauge sensing.

The chemiresistor or chemisensor may be used to monitor the moisture-dominated breathing and sweating processes. The nano-manufactured sensor arrays may address the moisture-dominated breath or sweat sensing situations by using nanoparticle-nanofibrous sensing architectures featuring decorations of the porous structures with dendronized nanoparticles that are structurally tunable and exhibit both positive and negative-going responses to breathing and sweating processes. Macromolecules such as fullerene- and dendron-mediated assemblies of gold nanoparticles may be used as sensing films with controlled sizes, shapes and structures by, for examples, the immobilization of poly(ether-ester) dendrons with oligoethylene glycol spacers on gold nanoparticles and the combination of hydrogen bonding and van der Waals interactions between partially interpenetrating dendrons, leading to tunable response characteristics. To impart electrically-responsible function to the 3D paper substrates such as the nanofibrous membrane towards chemical sensing, molecularly-mediated nanoparticles assembly thin film offer highly-tunable molecular interactions and electrical properties. The structural and spatial characteristics defined by the multiple hydrogen-bonding and van der Waals interactions between the functionalized nanoparticles may be incorporated into the fibrous paper with the nanoink printed microelectrodes as an electrically-responsive sensing scaffold. The change in electrical properties because of the adsorption of volatile organic compounds (VOCs) may be detected by the printed microelectrodes on paper, which is linked to VOC pollution in air and VOC biomarkers in human breath (e.g., acetone as breath biomarker associated with diabetes). The changes in interparticle distances and dielectric properties upon exposure to VOCs such as acetone, ethanol, water vapor, etc., translate to changes in electrical conductivity with its sensitivity and selectivity depending on the molecular interactions in sensing film.

The nanocomposite structured sensing film and the nanoink manufactured sensor device may also be used in highly-moisturized environments, to sense the presence of salts dissolved in water (K+, Na+, Cl-, etc.) relevant to sweat sensing. The nanocomposite membrane functions as an ion-sensitive interfacial scaffold on the interdigitated microelectrode, which is consistent with the cation exchange membrane character of NPs embedded in the nanofibrous paper. The correlation of the sensor response to the relative humidity changes in air provide information for assessing the balance of hydrophobicity and hydrophilicity in the sensing film-porous paper scaffold. The nano-manufactured devices on paper substrates with different ratios of hydrophobic and hydrophilic components may be optimized.

Gauge sensing characteristics of nanoparticle-printed microelectrode devices are tunable by the nanostructure parameters in terms of particle size, interparticle spacing, and bending orientations. Mechanistically, the electronic tunneling or hopping mechanism undergo changes under different strains. The resistivity for the laser-sintered CuAu lines on PET are about one order of magnitude higher than the bulk counterparts. The electrical properties of the nanoink-sintered lines on the flexible substrates are related to the theoretical aspects of electron conduction and percolation, and include 1) critical range of resistivity where a very small change in strain or strain orientation impacts the percolation pathway in terms of anisotropic gauge factors, and 2) molecular and nanoscale fine tuning of interparticle properties of molecularly-linked nanoparticle assembly on flexible microelectrodes on curved surfaces such as wearable electronics and skin sensors.

In contrast to the assembly on flat and rigid glass substrates, the thin film assembly on the fibrous and flexible paper substrates involves the nanoparticle assembly around the nanofiber which is a highly-curved surface and interparticle strain could be operative at the sensing interfaces. The strain characteristic is operative as a result of the nanofibrous structure for the paper sensor. The electrical conductivity of the nanoparticle thin films on chemiresistor sensor varies in dependence on the curvature of the nano-manufactured paper sensors.

Example 4

Cellulosic fibrous sensors in three dimensions with the microelectrodes fabricated by surface-mediated interconnection (SMI) of nanoparticles (NPs) and the sensing film being embedded by surface-mediated assembly (SMA) of NPs. A key element of this approach is the creation of conductive traces or interconnects on or cross fibrous and porous materials, which is often difficult due to high temperature sensitivity of the materials in traditional approaches. This simple SMI nanofabrication strategy features interconnection of metal nanoclusters (NCs) and NPs as building blocks at ambient conditions toward the desired microelectrode for sensor substrates and devices. The demonstration used bimodal-distributed gold and gold-copper alloy NCs and NPs as a model system. The bimodally distributed gold or gold-copper NCs (1-2 nm) and NPs (a few to tens of nm), upon being placed as a nanoink on the surface of a substrate, the surface-mediated process, driven by minimization of surface free energy, is operative to enable atomic diffusion along the surface forming atomic chains and layers interconnecting the NCs/NPs. This consequence of this process is the transition of the NCs/NPs from semiconductive to metallic conductivity. Since this process is also accompanied by the drying process of the nanoink, a quantized capacitive charging characteristic is observable in support of its origin from the NCs. This process enables the creation of the fibrous sensor substrates where the surface chemistry is exploited to facilitate the surface mediation. The fibrous sensor substrates fabricated by this SMI-SMA strategy are further shown to enhance the detection of volatile organic compounds and small gas molecules with high sensitivity and selectivity. In contrast, conventional random interparticle necking pathways (e.g., high-temperature sintering or cold welding) which have poor adhesion to fibrous materials, the SMI pathway involves the surface atomic layers that interconnect the NPs on the surface with a good adhesion and potential patternability to the fibrous materials.

A bimetallic gold-copper (AuCu) NC/NP formulation (e.g., a bimodal distribution of 1.4 nm (NC) and 7.0 nm (NP) in diameters and a paper-like substrate with fibrous structures were used to demonstrate the viability of the SMI strategy. With the fibrous substrate, a rapid solvent removal from the ink could occur effectively, leading to surface-mediated interparticle sintering. The formation of the interconnects of NPs at ambient condition (e.g., room temperature and in air) that starts from the NCs via surface-mediated mobility of the atoms was hypothesized to be controlled by atom—substrate interactions creates an SMI pathway toward a conductive network of the atomically connected NPs. The choice of AuCu NCs and NPs, on the one hand, exploits the bimetallic difference, e.g., Au atoms having larger binding strength than Cu atoms,[15] and the surface mobility difference of the two atoms, and on the other hand, takes advantage of the difference of surface-mediated Ostwald Ripening (OR) propensity of the two differently sized particles, e.g., NCs having great solubility (involving detachment, diffusion, and reattachment processes) than larger NPs on the surface. The concept of SMI could also be expanded to other types of bimetallic NCs/NPs on surfaces. It is important to note that this concept is entirely different from the conventional interparticle necking as known for cold welding of gold NPs.[16] The pathway for interconnections of NPs in conventional cold welding pathway is interparticle necking, which is largely random and exhibits no dependence on the interaction with the substrate's surface. Such a sintered layer often exhibits a poor adhesion to the substrate. In contrast, SMI of NPs involves the surface atomic layers that interconnect the NPs on the surface of the substrate, which strongly depends on the interaction with the substrate surface and atomic mobility on it. The formation of such a sintered layer could be directed by the surface energy of the substrate, and thus could exhibit a good adhesion to the substrate. In comparison with the randomness of interparticle necking in the cold welding process, the potential to achieve patterning of the sintered layer is apparent in the SMI process, especially for porous or fibrous substrates.

In addition to the fibrous/porous structure, another key element of the paper-like substrates, such as commercially available Whatman, Millipore, or Fisherbrand papers, and the laboratory-prepared cellulosic nanofibrous/polymeric fiber membrane, is the rich functional groups from cellulose (e.g., —OH) allowing an antioxidation capability.[17] The presence of —OH groups on the cellulosic nanofibrous surface could suppress Cu atoms from oxidation. The cellulosic nanofibrous membrane[18] is prepared by a cellulosic nanofiber layer (fiber diameter 5 nm) on an electrospun polyacrylonitrile layer (fiber diameter 150 nm) which is deposited on polyethylene terephthalate (PET) substrate (fiber diameter 20 μm).

After placing a drop of the NCs/NPs solution on cellulosic nanofibrous surface under ambient condition, high-resolution transmission electron microscopic (HRTEM) analysis revealed that NPs are largely surrounded by an atomically ordered layer of $AuCu_3$. The "skirting"-like feature in the 2D atomic connection is evident by the ordered atoms between and around the NPs. The lattice spacing of 2.21 Å in NPs matches with the (111) spacing of AuCu, while the lattice spacing of 2.63 Å for the "skirting" atomic layers corresponds to $AuCu_3$. This finding is confirmed by dark-field imaging, energy-dispersive X-ray spectroscopy (EDS) mapping, and line profile analysis. The mapping data appear to indicate a slightly rich Au in the NP, but clearly Cu rich along the skirt with a composition gradient. Both Cu and Au atoms detach from bimetallic NPs to the substrate surface where Cu atoms diffuse faster than Au, creating a Cu-rich interconnecting pathway to facilitate an effective sintering. The sintering is also confirmed by X-ray diffraction characterization, showing that the as-prepared AuCu NPs and the as-sintered film are largely characteristic of the alloy NPs. The bulk thin film featured clearly metallic copper in the alloy state, and no peaks characteristic of $Cu_2O$ and CuO were detected. This metallic state is responsible for the conductivity and stability. This was evidenced by the average lattice constants estimated from the diffraction peaks (0.406 nm on porous PET, 0.406 nm on glass, and 0.407 nm on cellulosic nanofibrous), which fall in between the lattice constants for Au (0.408 nm) and Cu (0.360 nm). The growth of the sintered AuCu NCs/NPs is also supported by the increase of the average grain sizes on different substrate as estimated based on the peak width by Scherrer equation.

The resulting stable and metallic thin film showed a strong adhesion to the substrate under the ambient condition. Apparently conformal layering of the thin film on the substrate is evidenced by atomic force microscopy (AFM) imaging. The measured surface roughness of the sintered nanoink film ($R_a$=24 and $R_q$=32 nm) is in fact comparable to that of the substrate ($R_a$=42, $R_q$=56 nm).[18] Piranha is powerful to etch away or decompose any organic species including the substrate. A free-standing metallic thin film was obtained after the piranha decomposition of the organic matrix. The metallic film was shown to be free of unremoved residuals. The exposed surface of the continuous and free-standing metal film was examined using HRTEM, revealing clearly atomic-scale morphologies. It is remarkable that the film also reveals the effect of the substrate's cellulosic nanofibrous texture on the morphology of the sintered film, as evidenced by the wrinkle-like atomic textures. In agreement with the surface atomic "skirting" on the cellulose surface as shown by HRTEM, this finding strongly supports the effectiveness of the surface-mediated sintering process for the formation of the metallic thin film.

To further substantiate the surface mediation concept, a similar study was performed with a smooth carbon thin film. Indeed, the result also revealed that the interconnection starts from the surface atoms around the NP "skirting" in atomic chains or layers and forms a microscale conductive network of NPs on the surface. 1D atomic-scale connection of NPs and apparent atomic "skirting" feature on the surface around NPs are observed on the carbon film under ambient condition. While the bimetallic composition in the NPs remains unchanged, the composition along the skirt features a higher percentage of Cu than that of Au, characteristic of $AuCu_3$. Atomic layers are evident further down to the edge of the skirt with a lattice spacing of 0.30 Å, characteristic of $Cu_2O$. This was substantiated by EDS mapping and line profiling, showing slightly rich Au in the core, Cu rich along the skirt, and Cu only down to the skirt edge, which is consistent with HRTEM data. The skirt edge layer shows a clear propensity of air oxidation of Cu atoms on the carbon surface. These observations were representative and reproducible.

In contrast to observation of sintering or coalescence between metal NPs on flat and solid substrates, the SMI of NCs/NPs on a fibrous substrate toward a conformal metallic thin film is the first example. The possible contribution of any residual ionic components in the NCs/NPs to the observed features was ruled out by control experiments using nanoinks with only Au NCs/NPs and relevant blank solutions. The interconnecting morphology and the bimetallic composition are strongly evidenced by the HRTEM lattice and EDS elemental mapping data. Ideally, in situ HRTEM observation of the layer growth is preferred, but the time scale of the entire sintering process (<60 s) makes it difficult to stop for the sintering process to be captured. The possibility of e-beam-induced coalescence of NCs/NPs was ruled out for two reasons, the first being based on a recent study of the conditions needed for e-beam-induced coalescence of NPs,[19] and the second being the fact that there has been no evidence showing the possibility of electron beam-induced NP coalescence under the imaging condition (200 kV, Cs 0.003 mm, and 0.5 s exposure time with FEI Titan 80-300).[20]

The SMI-based process differs from conventional sintering of metal NPs (e.g., Ag),[21] which is kinetically sluggish under low temperature and does not produce ultrathin conductive traces or interconnects. It also differs from traditional photolithographic patterning which bears high cost with limited materials options.[22] The sintering process was monitored by in situ measurement of the electrical properties upon placing a drop of the NCs/NPs on the cellulosic nanofibrous substrate at room temperature. In this process, there was a solvent-filled porous structure with liquid penetration and molecular or ionic diffusion. By monitoring the change of the electrical resistance using two presintered electrodes of the same NPs on the substrate with a gap of 0.5-2 mm, an intriguing oscillation of resistance was discovered at the early stage of sintering followed by a sharp rise of the resistance before decreasing within≈100 s to 10-100 Ohms. By four-point probe measurement, this final film exhibits≈0.1 Ohm, which translates to more than 50% of bulk Cu conductivity. The oscillation period is in the range of 40-60 s and the magnitude falls between 500Ω and 50 kΩ with an average frequency of 0.29 Hz in the first 50 s. Similar oscillation characteristics with subtle differences have also been observed using different pHs, NCs/NPs compositions, or concentrations. The period was in the range of 40-60 s depending on AuCu or Au NCs/NPs and pH. The magnitude for AuCu NCs/NPs at pH=5 falls between 500Ω and 50 kΩ with an average frequency of 0.29 Hz. At pH=7 and lower concentrations, there was a higher frequency and a smaller magnitude ranging from 100 kΩ to 1.4 MΩ. This was reminiscent of the earlier observation of resistance oscillation between 7 and 39 MΩ for CVD of Au thin film on Si (100).[23] Control experiments with Au NCs/NPs provided evidence to exclude any possible noise signal due to Cu migration in the oscillatory characteristic of the electrical resistance. The result revealed consistent oscillatory patterns of similar amplitudes with an average frequency of 0.31 Hz. This type of resistance oscillation was also substantiated by similar measurement using single pair of conductive silver electrodes printed on paper substrate with an electrical gap (e.g., 500 µm), and multipair of electrodes as in an IC mount with variable gaps, demonstrating that the basic electrical character is intrinsic of the SMI process. Oscillations with a less intensity were also observed from impedance and voltage measurements at different currents. Note that the as-synthesized NCs/NPs were washed multiple times with deionized water to remove residual ions from the synthesis solution. Controlled experiments with the solvent without NCs/NPs did not show any indication of oscillation.

While quantum size effect is known for atomic layer-by-layer metal thin film growth,[24] its operation was ruled out to account for the electrical oscillation phenomenon because of the wet state in the sintering process. Interestingly, for NPs and assemblies in solutions, the electrical oscillation is reminiscent of quantized capacitive charging (QCC). QCC was reported for isolated gold NPs (1.1-1.9 nm in diameter) and 3D array of gold NPs (2.2 and 1.6 nm in diameter) isolated from one another by insulating ligands.[25-27] Given the constant current (I, 10-100 µA) and the oscillatory R–t curve, the QCC was then estimated by integration of the charges under the V–t curve ($C_{QCC}=Q/V=I\Delta t/V$). For example, the average $C_{QCC}=1.0\times10^{-4}$ F. By further considering the single particle's theoretical capacitive charging (see the Experimental Section for details of the theoretical equations and parameter descriptions), the particle radius responsible for the QCC was estimated to be 0.6-0.9 nm is in a close agreement with the experimentally determined radius for the NCs (0.7 nm) in the bimodal distribution. Note that nanoink was a concentrated solution, in which NPs and NCs were co-present and difficult to be separated. Even when NPs were synthesized with high monodispersity in a diluted solution, the concentrated NPs by a factor of $10^2$-$10^3$ showed the presence of NCs. The NCs appear to be formed as a result of reverse OR at the expense of part of the NPs,[28] leading to a bimodal distribution of NCs/NPs. In the latter case, the same oscillation of resistance during sintering process was observed.

This is the first example demonstrating an observable QCC for NPs on a substrate at room temperature. The thin film morphology evolution in initial stage of the sintering process is also recorded by in situ captured color change. The fact that the QCC is observed at the initial stage is a clear indication that the initial alignment and sintering of the NCs played an important role in the sintering process. QCC disappears upon complete drying of the NC—NP thin film domains, which is followed by the display of a high electrical resistance, indicating that the sintered domains are not yet continuous. Further sintering among the interconnected NPs leads to a gradual decrease of the resistance to a value characteristic of the transition from semiconductive characteristic to metallic conductivity. While the precise determination of the interparticle distance to form a continuous film requires in situ imaging of the sintering process at sub-monolayer coverages, the ex situ experimental results are supportive of a continuous film with conductivities from semiconductive to metallic range depending on the coverage of NCs/NPs above a monolayer level. At the monolayer level, the interparticle distance is defined by the capping molecules (sub- to a few nm in length). A transition was observable from a semiconductive to metallic conductive film after removing the capping molecules.

Figure 31:
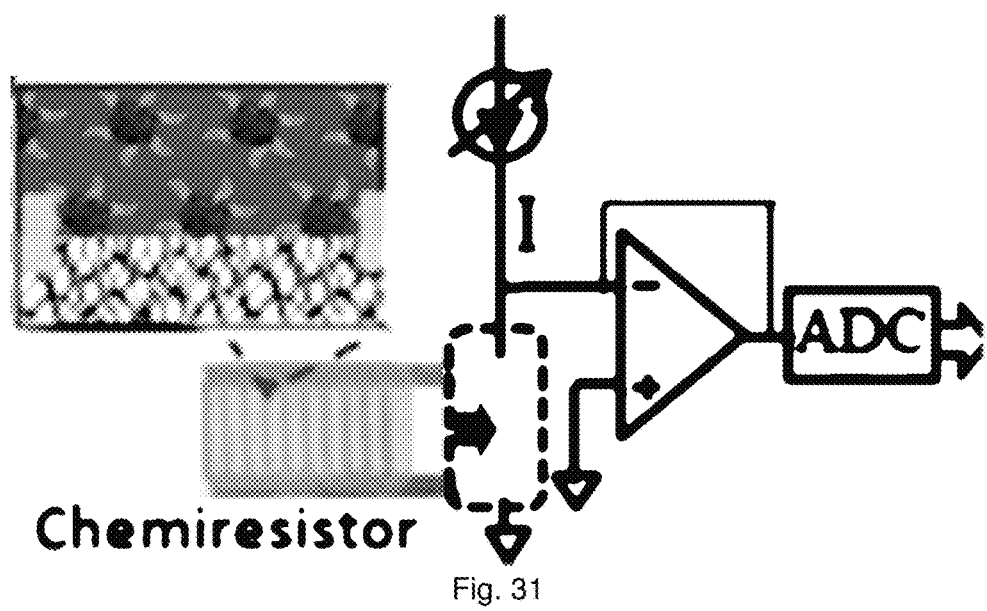
FIG. 31 shows an exemplary circuit for reading the chemiresistive sensor signal.

FIG. 31 shows an exemplary circuit for reading the impedance of the chemiresistor sensor.

With the SMI process to pave a simple pathway for sintering, metallic conductivity was expected on the surface or through the thickness of the substrate depending on its porosity. For a substrate with a low porosity, this process would be favored by the interconnecting process on the cellulose surface due to little penetration of NPs through the substrate. By increasing the porosity to a critical point where NP penetration occurs, sintering through the substrate would happen, leading to porosity-dependent anisotropy of electrical conductivity. Indeed, with a very low-porosity cellulosic nanofibrous substrate (particle retention <55 nm), a high electrical conductivity was achieved on the surface ($\sigma_{on}$ or $\sigma_\parallel$) upon casting a drop of AuCu NCs/NPs. In the best case, the conductive film showed an electrical conductivity of $3.2\times10^7$ S m$^{-1}$ (~100 nm of thickness), which corresponds to 53% of bulk Cu conductivity. The thickness of the sintered thin film was measured by AFM and cross-section analysis over the relatively smooth nanofibrous layer of the substrate, yielding ≈100 nm. Multiple bending cycles of such a thin film on a fibrous substrate of relatively large size with a resistance value of about five times higher than the best conductive film in this work showed changes of the of the resistance in response to compressive or tensile strains, reflecting the impact of the substrate strain on the intergrain (or domain) connectivity. However, the resistance of the thin film remained unchanged after the bending cycles, demonstrating the maintenance of the intergrain (or domain) connectivity in the thin film.

The morphology and electrical conductivity of the thin films formed by the SMI pathway are strongly dependent on the surface properties of the substrate. This aspect is evidenced by the results from measurements of the electrical and physical properties of thin films of the NCs/NPs on different substrates, including fibrous substrates, e.g., paper with different porosities, and nonfibrous substrates, e.g., glass, PET, alumina-grafted paper. For example, with a high porosity (e.g., Waltman filtration Grade 41 paper with a particle retention of 20 J. Lm), both "on-substrate-surface" and "through-substrate-thickness" electrical conductivities ($\sigma_{through}$, and $\sigma^\perp$) were achieved, with $\sigma_\perp$ being smaller than $\sigma_\parallel$ by a factor of 5-10 depending on its porosity. The pathway to the creation of this type of electrical anisotropic conductivity is in sharp contrast to those used in traditional through-hole fabrication by drilling-hole of multilayered microelectronics. The partial or full electrical anisotropy, depending on the substrate's porosity, could be exploited in drill-less through-hole connections in multilayer-printed electronics, and is expected to find applications in conductive traces in printed paper electronics.

The understanding of the findings is aided by examining how adhesion and mobility of the two types of atoms play a role in the sintering process. Theoretically, surface-mediated OR based on Gibbs—Thompson model coupled with modified bond additivity was considered (see equations and parameters in the Experimental Section, including sublimation energy ($\Delta H_{sub}$), adsorption energy ($E_{ads}$), and activation energy for diffusion ($E_{diff}$) of metal atom on the surface).[29] Using typical values for bulk materials, the simulated size evolution for Au and Cu NPs showed no indication of sintering near room temperature. However, by taking the nanoscale interactions into consideration and adopting the values for adsorption, diffusion, and sublimation, DFT-calculated $E_{ads}$ and $E_{diff}$ revealed subtle differences between Au and Cu atoms on the cellulose surface. $E_{ads}$ clearly depends on the adsorption site, differing between Au and Cu atoms, as evidenced by the difference of $E_{ads}$ (e.g., Au≈0.67 eV and Cu≈0.71 eV) at the same adsorption site. $E_{diff}$ for Cu is smaller than that for Au atoms (e.g., Cu≈0.23 eV and Au≈0.28 eV).

The clear differences in adsorption and diffusion energies are responsible for the Cu-rich "skirting" atomic layer, consistent with the finding that Cu atoms have a faster mobility than Au on the surface and the recent report on the highly dynamic detachment of Cu atoms from Cu NPs supported on silica.[30] The particle size dependence for Au and Cu shows that $\Delta H_{sub}$ for NPs with a radius of 0.7 nm is almost two times less than that of the bulk counterpart. With the calculated size-dependent $\Delta H_{sub}$ and cellulose surface-mediated $E_{ads}$ and $E_{diff}$, the surface-mediated $E_{tot}$ was considered in the GT-MBA simulation. $E_{tot}$=310.2 and 290.7 kJ mol$^{-1}$ for bulk Au and Cu, respectively. In contrast, $E_{tot}$=131.8 and 113.7 kJ mol$^{-1}$ for 1.4 nm diameter sized Au and Cu NPs/NCs, respectively. Moreover, the plot of sublimation energies for Au and Cu as a function of particle sizes shows that the sublimation of the NPs with R=0.7 nm is almost two times less than that of the bulk counterpart, which is consistent with the report in literature.[31] A refined simulation (FIG. 14B) shows that the size reduction of smaller Cu particles occurs at much shorter time than that for Au, and at a lower temperature approaching room temperature.

The fibrous sensor substrates are further demonstrated to function as a chemiresistive platform by coupling to SMA of the NPs in fibrous materials as chemically sensitive interfaces for sensing gas/vapor molecules. The SMI-based printing (using dispenser printer) and sintering (at room temperature and in air) of the NCs/NPs on a cellulosic nanofibrous substrate were first used to produce a pattern of interdigitated microelectrode. A sensing interface was then created by SMA of the same Au or AuCu NCs or NPs as a thin film in the fibrous three dimensions. As a proof-of-concept demonstration, decanethiolate-capped Au or acrylate-capped AuCu NPs were linked by interparticle hydrogen-bonding of carboxylic acid groups of 11-mercaptoundecanoic acid (MUA) through place-exchange reaction, producing a thin film over the IME device. For example, the molecularly linked AuCu NPs in the cellulosic nanofibrous structure shows a continuous morphology, which is the assembly of NPs in the 3D fibrous structure.

Figure 30A:
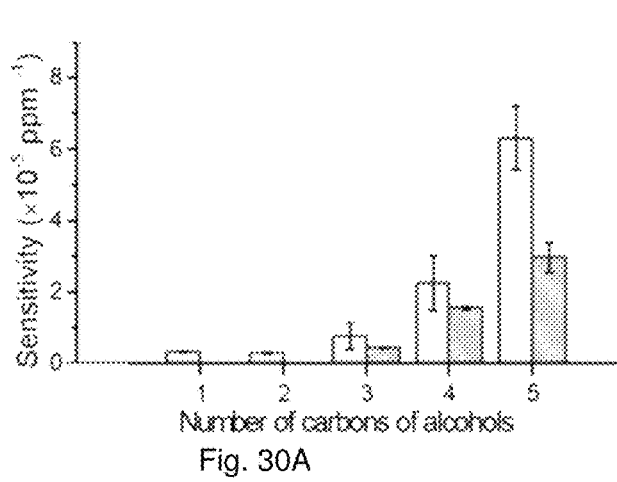
FIGS. 30A-30B show results from use of the fibrous sensor fabricated by SMI and SMA of the NCs/NPs and the sensing characteristics.
Figure 30B:
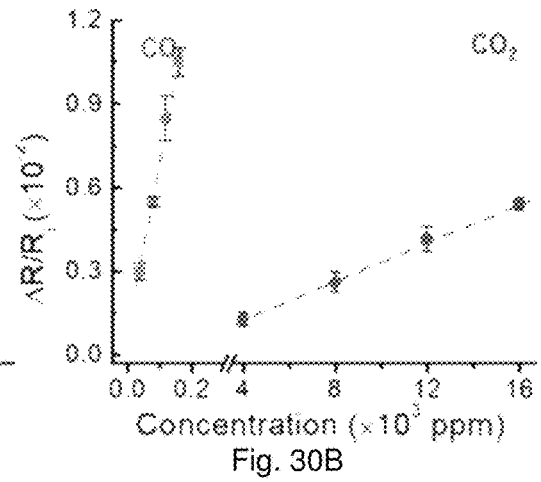

The sensor substrate, upon coupling to the sensing interface, functions as a chemiresistor, which is responsive to volatile organic compounds (VOCs) adsorbed at the interparticle linkage sites, and small gas molecules such as CO and $CO_2$ adsorbed at the NP surface sites. The chemiresistive responses to VOCs such as hexane, acetone, and ethanol were shown to display two to ten times higher sensitivity than those reported for IME on flexible and nonporous substrates,[32] substantiating the important role of the porous substrate. For alcohol vapor molecules which mainly interact with interparticle linkage sites (FIG. 30A), the response sensitivity is shown to scale with the number of carbons and differentiates the isomers, demonstrating that a combination of hydrophobic and hydrophilic (including hydrogen-bonding) interactions is operative in the interparticle capping/linking structure. The origin of the sensing sites from the interparticle linking structure was further substantiated by the fact that the MUA linked and decanethiolate-capped Au or acrylate-capped AuCu NPs showed similar sensing characteristics in terms of the response versus the chain length of alcohols. Interestingly, with the surface sites of AuCu NPs (MUA-linked acrylate-capped AuCu NPs) being active for surface adsorption of CO and $CO_2$ in terms of Au and Cu,[33] the sensor is shown to exhibit high response sensitivity to CO and $CO_2$ (FIG. 30B). The structural dissimilarity of the capping (acrylate) and linking (MUA) molecules in the sensing nanostructures is expected to be porous to allow access of the small gas molecules to the bifunctional adsorption sites on the NP surface. The difference of three orders of magnitude in response sensitivities between CO and $CO_2$ originates from higher binding strength CO to Cu sites, leading to a shift of the activation energy for the electrical conductivity. This constitutes the basis for a much higher selectivity of the sensor to CO. In the case, the origin of the sensing sites from the AuCu surfaces is also supported by the fact that the MUA-linked and acrylate-capped AuCu NPs show three to five times higher sensitivity for CO and $CO_2$ than that of MUA-linked decanethiolate-capped Au NPs thin film.

The results have demonstrated a new and promising nanofabrication pathway by SMI of metal or alloy NCs and NPs at ambient condition toward fibrous sensor substrates and platforms. This pathway is applicable to amorphous, fibrous, or porous materials, including temperature-sensitive materials, which is a major pain point for many of the existing fabrication or manufacturing processes. The demonstration of the SMI of gold-copper alloy NCs and NPs to display semiconductive-to-metallic conductivity transition, quantized capacitive charging, and anisotropic conductivity characteristics is unique in comparison with those known for conventional nanofabrication processes. The further demonstration of the unique chemical sensing performances by coupling to the SMA of the same NPs as the sensing interface has highlighted the significance of the fibrous sensor platform to meet the growing demands for flexible, foldable, stretchable, biodegradable, or disposable sensors and the rising desires for higher sensitivity, greater miniaturization, lower cost, and better wearability. Understanding of the universal nature of the surface-mediated processes constitutes an important step in advancing scalable manufacturing of multifunctional and wearable sensor and biosensor platforms.

Experimental Section

Synthesis of NCs/NPs and Nanoink Formulation: The synthesis of Au and AuCu alloy NCs and NPs involved the use of acrylate as both reducing and capping agent in an aqueous solution of $HAuCl_4$ or mixed $HAuCl_4$ and $Cu(NO_3)_2$. Two routes were taken to synthesize NCs/NPs with bimodal distribution where OR or reverse OR could be enabled to occur under controlled conditions. The first route was for the synthesis of monomodal NPs. In this route, monomodal Au NPs or AuCu NPs were first synthesized by reacting an aqueous solution of $HAuCl_4$ ($2.0 \times 10^{-7}$ M), or $HAuCl_4$ ($2.0 \times 10^{-7}$ M)+$Cu(NO_3)_2$ ($2.0 \times 10^{-7}$ M) (pH 7.5), with sodium acrylate ($12.0 \times 10^{-6}$ M) at room temperature. The solution of the resulting monomodal Au or AuCu NPs was subsequently concentrated by a factor of ≈100 by multiple centrifugations at 5000 rpm. At this concentration, reverse OR occurred to produce smaller sized particles (1-2 nm NCs) at the expense of part of the NPs, leading to bimodal distribution of NCs/NPs. In the second route, solutions of the concentrated NCs and NPs with a bimodal distribution were directly synthesized by concentrating the precursor solutions as used in the first route by a factor of 10-100. The bimetallic composition was controlled by the feeding ratio of the two metal precursors. For example, $Au_{50}Cu_{50}$ NCs and NPs were synthesized by chemical reduction of precursors $HAuCl_4$ ($2.0 \times 10^{-5}$ M) and $2.0 \times 10^{-5}$ Cu(NO$_3$)$_2$ with sodium acrylate (12.0×10$^{-4}$ M) at pH 7.5. TEM images of the as-synthesized NCs and NPs (after multiple washing with deionized water) are shown in to show the controllability over the monomodal and bimodal distributions. With the desired NPs or NCs/NPs, nanoinks were formulated by concentrating the as-synthesized solutions of NPs or NCs+NPs by different factors depending on the metal loading, typically 5-20 wt %.

Different paper substrates, including commercial ones (Whatman, Millipore, Fisherbrand, etc.) and multilayered cellulosic nanofibrous films cast on electrospun PAN (poly (acrylonitrile))/PET substrates, were used. The sintering process was followed by placing a certain amount of NCs/NPs solution on the substrate, allowing sintering to occur under ambient condition. The color change of the sintered thin film was monitored by a camera. The printing was carried with a dispenser printer (Nordson EFD PRO4L) equipped with time/pressure dispensing syringe, diaphragm valve, and 27 Ga and 50 μm needles. The NPs was used to print interdigitated microelectrode devices on the substrate at ambient condition.

For printing sensing thin films, gold NPs of 2 nm diameter encapsulated with decanethiolate monolayer were synthesized by two-phase reduction of HAuCl$_4$ (41). DT-Au 2 nm NPs from the synthesis was heated at 150° C. to produce larger sized Au NPs 5.0 nm produced were used in this work. Decanethiolate-capped gold NPs or acrylate-capped AuCu NPs were linked using 11-MUA,[32] redispersed in an ethanol solution forming MUA-Au and MUA-AuCu nanoink and then printed at room temperature on cellulosic nanofibrous substrates with controlled thickness.

Electrical Measurement: Electrical resistance was measured upon placing the nanoink in between single-pair or multipair of pre-sintered gold electrode traces or patterns on the substrate. Computer-interfaced multichannel Keithley (Model 2700) instrument was used to measure the lateral resistance change in the sintering process. Jandel Model RM3000 with four probes and Keithley 2100 digital multimeter were used to determine the electrical conductivity of the sintered thin films.

Characterizations: TEM images were obtained on JEOL JEM-ARM200F instrument operated at 200 kV. HRTEM was carried out using the chromatic aberration-corrected TEM (ACAT), and the dark-field scanning transmission electron microscope and EDS mapping measurements were performed by FEI Talos F200X at the Electron Microscopy Center at Argonne National Laboratory. The HRTEM images of free-standing thin film images were obtained using FEI Tecnai F20ST and Tecnai F30. The AFM images were obtained using Dimension 3100, Nanoscope V. Field emission SEM was carried using SUPRA 55 instruments.

Sensor Measurement: A computer-interfaced multichannel electrical multimeter (Keithley) was used to measure the resistance of the nanostructured coating on IME device in a Teflon chamber (2×2×2 cm$^3$) with vapor-tubing connections. The electrical conductivity (a) of the NP thin film can be described by a thermally activated conduction path[34]

$$\sigma = \sigma_0 \exp(-\beta d)\exp\left[-\frac{0.5e^2}{4\pi\varepsilon\varepsilon_0 RT}\left(\frac{1}{r} - \frac{1}{r+d}\right)\right]$$

where r is the particle core radius, E is the dielectric constant of interparticle medium, d is the interparticle distance, and other parameters e=1.6×10$^{-19}$ C, E$_0$=8.854×10$^{-12}$ F m$^{-1}$, R=1.38×10$^{-23}$ J K$^{-1}$, T=300 K, and β (4-10 nm$^{-1}$) is the electron coupling term dependent on particle size and relatively independent of distance of the interparticle linkages, respectively. The resistance (R), reciprocal to electric conductivity (a) is reported as relative differential resistance change, i.e., ΔR/R$_i$, where AR represents the resistance response and R$_i$ represents the initial resistance. The vapor generation was carried by a standard protocol with flowmeters controlling the flow rates and the mixing ratios. The vapor/gas concentrations in the unit of ppm (V) were controlled by the partial vapor pressures and vapor mixing ratios.

[1] L. Wang, X. Fu, J. He, X. Shi, T. Chen, P. Chen, B. Wang, H. Peng, *Adv. Mater.* 2019, 32, 1901971.

[2] E. Song, C.-H. Chiang, R. Li, X. Jin, J. Zhao, M. Hill, Y. Xia, L. Li, Y. Huang, S. M. Won, *Proc. Natl. Acad. Sci. U.S.A.* 2019, 116, 15398.

[3] A. Yamamura, S. Watanabe, M. Uno, M. Mitani, C. Mitsui, J. Tsurumi, N. Isahaya, Y. Kanaoka, T. Okamoto, J. Takeya, *Sci. Adv.* 2018, 4, eaao5758.

[4] W. Wu, *Nanoscale* 2017, 9, 7342.

[5] A. Kamyshny, S. Magdassi, *Small* 2014, 10, 3515.

[6] H. U. Chung, B. H. Kim, J. Y. Lee, J. Lee, Z. Xie, E. M. Ibler, K. Lee, A. Banks, J. Y. Jeong, J. Kim, C. Ogle, D. Grande, Y. Yu, H. Jang, P. Assem, D. Ryu, J. W. Kwak, M. Namkoong, J. B. Park, Y. Lee, D. H. Kim, A. Ryu, J. Jeong, K. You, B. Ji, Z. Liu, Q. Huo, X. Feng, Y. Deng, Y. Xu, K.-I. Jang, J. Kim, Y. Zhang, R. Ghaffari, C. M. Rand, M. Schau, A. Hamvas, D. E. Weese-Mayer, Y. Huang, S. M. Lee, C. H. Lee, N. R. Shanbhag, A. S. Paller, S. Xu, J. A. Rogers, *Science* 2019, 363, eaau0780.

[7] J. Zhou, R. N. Miles, *Proc. Natl. Acad. Sci. U.S.A.* 2017, 114, 12120.

[8] Y. Khan, A. Thielens, S. Muin, J. Ting, C. Baumbauer, A. C. Arias, *Adv. Mater.* 2019, 32, 1905279.

[9] F. Guo, W. He, S. Qiu, C. Wang, X. Liu, K. Forberich, C. J. Brabec, Y. Mai, *Adv. Funct. Mater.* 2019, 29, 1900964.

[10] M. Koch, J. G. Keizer, P. Pakkiam, D. Keith, M. G. House, E. Peretz, M. Y. Simmons, *Nat. Nanotechnol.* 2019, 14, 137.

[11] J. Park, J. Kim, S.-Y. Kim, W. H. Cheong, J. Jang, Y.-G. Park, K. Na, Y.-T. Kim, J. H. Heo, C. Y. Lee, J. H. Lee, F. Bien, J.-U. Park, *Sci. Adv.* 2018, 4, eaap9841.

[12] C. Joachim, in *Nanopackaging: From Nanomaterials to the Atomic Scale*, Springer, New York 2015, p. 59.

[13] J. E. Morris, in *Nanopackaging*, Springer, New York 2018, p. 1.

[14] C. Wang, Q. He, U. Halim, Y. Liu, E. Zhu, Z. Lin, H. Xiao, X. Duan, Z. Feng, R. Cheng, *Nature* 2018, 555, 231.

[15] I. V. Pobelov, K. P. Lauritzen, K. Yoshida, A. Jensen, G. Mészáros, K. W. Jacobsen, M. Strange, T. Wandlowski, G. C. Solomon, *Nat. Commun.* 2017, 8, 15931.

[16] S.-H. Cha, S.-H. Kang, Y. J. Lee, J.-H. Kim, E.-Y. Ahn, Y. Park, S. Cho, *Sci. Rep.* 2019, 9, 3629.

[17] M. Kaushik, A. Moores, *Green Chem.* 2016, 18, 622.

[18] L. Geng, X. Peng, C. Zhan, A. Naderi, P. R. Sharma, Y. Mao, B. S. Hsiao, *Cellulose* 2017, 24, 5417.

[19] H. W. Cheng, J. Wang, Y. J. Li, J. Li, S. Yan, S. Shan, L. Wang, Z. Skeete, C. J. Zhong, *Small* 2018, 14, 1800598.

[20] L. Chong, J. Wen, J. Kubal, F. G. Sen, J. Zou, J. Greeley, M. Chan, H. Barkholtz, W. Ding, D.-J. Liu, *Science* 2018, 362, 1276.

[21] M. Grouchko, A. Kamyshny, C. F. Mihailescu, D. F. Anghel, S. Magdassi, *ACS Nano* 2011, 5, 3354.

[22] C. Hsu, Z. Xu, C. Liao, X. Wang, *Adv. Opt. Mater* 2019, 7, 1900846.
[23] G. Alonzo-Medina, A. Oliva, *Microelectron. J.* 2007, 38, 388.
[24] L. Gioia, M. Christie, U. Zulicke, M. Governale, A. Sneyd, *Phys. Rev. B* 2019, 100, 205417.
[25] S. Chen, *J. Mater. Chem.* 2007,17, 4115.
[26] S. W. Boettcher, N. C. Strandwitz, M. Schierhorn, N. Lock, M. C. Lonergan, G. D. Stucky, *Nat. Mater.* 2007, 6, 592.
[27] F. P. Zamborini, J. F. Hicks, R. W. Murray, *J. Am. Chem. Soc.* 2000, 122, 4514.
[28] M. Sakar, S. Balakumar, *J. Photochem. Photobiol., A* 2018, 356, 150.
[29] C. T. Campbell, S. C. Parker, D. E. Starr, *Science* 2002, 298, 811.
[30] D. Kim, N. Becknell, Y. Yu, P. Yang, *Nano Lett.* 2017,17, 2732.
[31] V. Samsonov, S. Vasilyev, A. Bembel, T. Samsonov, V. Skopich, *Phys. Solid State* 2014, 56, 2369.
[32] W. Zhao, T. Rovere, D. Weerawarne, G. Osterhoudt, N. Kang, P. Joseph, J. Luo, B.
[33] Shim, M. Poliks, C.-J. Zhong, *ACS Nano* 2015, 9, 6168.
[34] D. Kim, J. Resasco, Y. Yu, A. M. Asiri, P. Yang, *Nat. Commun.* 2014, 5, 4948.
[35] W. Zhao, J. Luo, S. Shan, J. P. Lombardi, Y. Xu, K. Cartwright, S. Lu, M. Poliks, C. J. Zhong, *Small* 2015, 11, 4509.
[36] Song, Jizhong, Jianhai Li, Jiayue Xu, and Haibo Zeng. "Superstable transparent conductive Cu@ Cu4Ni nanowire elastomer composites against oxidation, bending, stretching, and twisting for flexible and stretchable optoelectronics." *Nano letters* 14, no. 11 (2014): 6298-6305.
[37] Zhang S and Zeng HC. Solution-based epitaxial growth of magnetically responsive Cu@ Ni nanowires. Chemistry of Materials. 2010 22(4):1282-4.

It will be understood that the configurations and/or approaches described herein are exemplary in nature, and that these specific embodiments or examples are not to be considered in a limiting sense, because numerous variations are possible. As such, various acts illustrated and/or described may be performed in the sequence illustrated and/or described, in other sequences, in parallel, or omitted. Likewise, the order of the above-described processes may be changed. The subject matter of the present disclosure includes all combinations, sub-combinations and permutations of the various processes, systems and configurations, and other features, functions, acts, and/or properties disclosed herein, as well as any and all equivalents thereof.

The invention claimed is:

1. A sinterable conductive coating composition, comprising:
nanowires decorated with capped nanoparticles, each capped nanoparticle comprising an alloy of at least 1% copper and at least 1% gold, nickel, aluminum, zinc or tin, capped with a capping agent comprising at least one of an amine, a thiolate and an acrylate
the decorated nanowires being configured to sinter in a buffer solution on a substrate that desorbs the capping agent at a temperature below 100° C.

2. The sinterable conductive coating composition according to claim 1, wherein the capped nanoparticles have a diameter between 2 to 20 nm, and comprise an alloy of at least 50% copper and at least 1% gold, nickel, aluminum, zinc, or tin.

3. The sinterable conductive coating composition according to claim 1, wherein the capped nanoparticles comprise copper-gold alloy nanoparticles comprising at least 50% copper, having a bimodal distribution of diameter having a first peak between 1-2 nanometers and a second peak between 5-10 nanometers.

4. The sinterable conductive coating composition according to claim 1, wherein the decorated nanowires are sinterable at a temperature below 30° C.

5. The sinterable conductive coating composition according to claim 1, wherein the nanowires comprise at least one of copper and a copper-nickel alloy, and the nanoparticles comprise a copper-gold alloy.

6. The sinterable conductive coating composition according to claim 1, wherein the decorated nanowires are suspended in the buffer solution which preserves the capping agent on the capped nanoparticles.

7. The sinterable conductive coating composition according to claim 1, wherein the decorated nanowires sinter by surface-mediated Ostwald ripening.

8. A sinterable composition, comprising:
a plurality of nanowires;
a plurality of nanoparticles having a diameter between 2 to 20 nm, comprising an alloy of at least 1% copper and at least 1% of gold, zinc, nickel, aluminum, or tin, the nanoparticles being capped with a capping agent, wherein the plurality of nanoparticles decorate the plurality of nanowires, and
a buffer solution in which the decorated nanowires are suspended and free to move,
wherein the sinterable composition is adapted to initiate sintering to form a conductive layer of sintered overlapping nanowires by desorption of the capping agent from the plurality of nanoparticles by contact with a substrate in the buffer solution at a sintering temperature below 100° C.

9. The sinterable composition according to claim 8, wherein the plurality of nanowires comprise at least 50% copper.

10. The sinterable composition according to claim 9, wherein the plurality of nanowires comprise between 1-10% nickel.

11. The sinterable composition according to claim 9, wherein the plurality of nanowires comprise a copper-gold alloy.

12. The sinterable composition according to claim 8, wherein the decoration of the nanowires by the nanoparticles is in dendritic pattern.

13. The sinterable composition according to claim 8, wherein the capping agent comprises at least one of an amine, a thiolate and an acrylate.

14. A sinterable conductive coating composition, comprising:
a plurality of nanowires;
a plurality of nanoparticles adherent to the plurality of nanowires, the plurality of nanoparticles comprising at least 1% metallic copper and at least 1% of metallic gold, zinc, nickel, aluminum, or tin, capped with a capping agent; and
a buffer solution;
the plurality of nanoparticles being configured to form a sintered coating bridging the nanowires in an overlapping array to form a conductive path between respective overlapping nanowires on a substrate which desorbs the capping agent in the buffer solution to initiate sintering, wherein the capping agent is configured to:
- maintain the plurality of nanowires in a freely suspended state in the buffer solution before deposition on the substrate, and
- permit sintering of the plurality of nanoparticles at a temperature of less than 100° C. after deposition of the plurality of nanowires in the freely suspended state in the buffer solution on the substrate, and desorption of the capping agent from the nanoparticles to initiate sintering, to form the overlapping array.

15. The sinterable conductive coating composition according to claim 14, wherein the plurality of nanoparticles are configured to form the sintered coating with the plurality of nanowires through surface-mediated Ostwald ripening after the desorption of the capping agent.

16. The sinterable conductive coating composition according to claim 14, wherein:
- the plurality of nanowires comprise at least 50% copper and have a diameter between 2 to 20 nm; and
- the plurality of nanoparticles comprise at least 50% copper.

17. The sinterable conductive coating composition according to claim 14, wherein the sintered coating has a conductivity which reversibly varies by at least 2% in dependence on an external condition.

18. The sinterable conductive coating composition according to claim 14, wherein the capping agent comprises at least one of an amine, a thiolate and an acrylate.

19. The sinterable conductive coating composition according to claim 14, wherein the nanowires comprise at least one of copper and a copper-nickel alloy, and the nanoparticles comprise a copper-gold alloy.

20. The sinterable conductive coating composition according to claim 14, wherein the plurality of nanoparticles comprise at least 50% copper and the plurality of nanowires comprise at least 50% copper and between 1-10% nickel.

* * * * *